United States Patent
Tsai et al.

(10) Patent No.: US 11,461,123 B1
(45) Date of Patent: Oct. 4, 2022

(54) DYNAMIC PRE-COPY AND POST-COPY DETERMINATION FOR LIVE MIGRATION BETWEEN CLOUD REGIONS AND EDGE LOCATIONS

(71) Applicant: Amazon Technologies, Inc., Seattle, WA (US)

(72) Inventors: Oleksii Tsai, Kenmore, WA (US); Nikolay Krasilnikov, Seattle, WA (US); Anton Valter, Bellevue, WA (US); Alexey Gadalin, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 333 days.

(21) Appl. No.: 16/691,184

(22) Filed: Nov. 21, 2019

(51) Int. Cl.
*G06F 9/455* (2018.01)
*H04L 9/40* (2022.01)
(Continued)

(52) U.S. Cl.
CPC ........ *G06F 9/45558* (2013.01); *G06F 3/0604* (2013.01); *G06F 3/067* (2013.01);
(Continued)

(58) Field of Classification Search
CPC .. G06F 9/45558; G06F 3/0604; G06F 3/0647; G06F 3/0665; G06F 3/067; H04L 12/4633; H04L 63/029
See application file for complete search history.

(56) References Cited

U.S. PATENT DOCUMENTS 8,615,579 B1    12/2013    Vincent et al.
8,832,683 B2 *    9/2014    Heim .................. G06F 9/45558
                                                                                             718/1
(Continued)

OTHER PUBLICATIONS

Duggan, et al., "A network aware approach for the scheduling of virtual machine migration during peak loads," Cluster Computing, vol. 20, Issue 3, Sep. 2017, pp. 2083-2094.
(Continued)

*Primary Examiner* — Jorge A Chu Joy-Davila
(74) *Attorney, Agent, or Firm* — Lee & Hayes, P.C.

(57) ABSTRACT

This disclosure describes systems, devices, and techniques for live migrating virtualized resources between the main region and edge locations. Live migration enables virtualized resources to remain operational during migration. Edge locations are typically separated from secure data centers via the Internet, a direct connection, or some other intermediate network. Accordingly, to place virtualized resources within an edge location, the virtualized resources must be migrated over a secure communication tunnel that can protect virtualized resource data during transmission over the intermediate network. The secure communication tunnel may have limited data throughput. To efficiently utilize resources of the secure communication tunnel, virtualized resource data may be transferred over the tunnel in a two-stage process. The disclosed technology provides various techniques for dynamically selecting which virtualized resource data, and how much virtualized resource data, is transferred over each of the pre-copy and post-copy stages.

20 Claims, 21 Drawing Sheets

(51) Int. Cl.
*G06F 3/06* (2006.01)
*H04L 12/46* (2006.01)
*H04L 67/10* (2022.01)

(52) U.S. Cl.
CPC .......... *G06F 3/0647* (2013.01); *G06F 3/0665* (2013.01); *H04L 12/4633* (2013.01); *H04L 63/029* (2013.01); *G06F 2009/4557* (2013.01); *G06F 2009/45583* (2013.01); *G06F 2009/45595* (2013.01); *H04L 67/10* (2013.01)

(56) References Cited

U.S. PATENT DOCUMENTS

| | | | |
|---|---|---|---|
| 10,965,737 | B1 | 3/2021 | Parulkar et al. |
| 10,979,534 | B1 | 4/2021 | Parulkar et al. |
| 11,044,162 | B2 | 6/2021 | Byers et al. |
| 2006/0069761 | A1 | 3/2006 | Singh et al. |
| 2009/0064136 | A1* | 3/2009 | Dow ............ G06F 9/5077 718/1 |
| 2013/0081013 | A1* | 3/2013 | Plondke ............ G06F 9/4856 718/1 |
| 2013/0283364 | A1* | 10/2013 | Chang ............ H04L 12/4641 726/12 |
| 2014/0101279 | A1 | 4/2014 | Nagami et al. |
| 2014/0115164 | A1* | 4/2014 | Kalyanaraman ...... H04L 45/302 709/226 |
| 2014/0157259 | A1 | 6/2014 | Dow et al. |
| 2015/0052517 | A1 | 2/2015 | Raghu et al. |
| 2015/0052521 | A1 | 2/2015 | Raghu |
| 2015/0052524 | A1 | 2/2015 | Raghu |
| 2015/0188780 | A1 | 7/2015 | Spieser |
| 2015/0277779 | A1 | 10/2015 | Devarapalli et al. |
| 2015/0288592 | A1 | 10/2015 | Baughman et al. |
| 2015/0331635 | A1 | 11/2015 | Ben-Shaul et al. |
| 2015/0339156 | A1 | 11/2015 | Vincent et al. |
| 2015/0381589 | A1* | 12/2015 | Tarasuk-Levin .... G06F 9/45558 713/193 |
| 2016/0043910 | A1 | 2/2016 | Khosrowpour et al. |
| 2016/0378532 | A1 | 12/2016 | Vincent et al. |
| 2017/0063667 | A1 | 3/2017 | Maskalik et al. |
| 2017/0070581 | A1 | 3/2017 | Thomas et al. |
| 2017/0139637 | A1* | 5/2017 | Roozbeh .................. G06F 9/46 |
| 2017/0147399 | A1 | 5/2017 | Cropper et al. |
| 2017/0235659 | A1 | 8/2017 | Matsuki |
| 2017/0269951 | A1 | 9/2017 | Gupta et al. |
| 2017/0324582 | A1 | 11/2017 | Yang et al. |
| 2018/0024854 | A1 | 1/2018 | Wang et al. |
| 2018/0097874 | A1 | 4/2018 | Sampathkumar et al. |
| 2018/0115522 | A1 | 4/2018 | Gleichauf |
| 2018/0121233 | A1 | 5/2018 | Lu et al. |
| 2018/0150240 | A1 | 5/2018 | Bernat et al. |
| 2018/0307512 | A1 | 10/2018 | Balma et al. |
| 2018/0368053 | A1 | 12/2018 | Wei et al. |
| 2018/0373553 | A1 | 12/2018 | Connor et al. |
| 2019/0034112 | A1* | 1/2019 | Tsirkin ................ G06F 12/1009 |
| 2019/0095232 | A1 | 3/2019 | Okuno et al. |
| 2019/0095233 | A1 | 3/2019 | Iikura et al. |
| 2019/0098474 | A1 | 3/2019 | Zhu et al. |
| 2019/0129745 | A1 | 5/2019 | Wang |
| 2019/0200271 | A1 | 6/2019 | Agrawal et al. |
| 2020/0012517 | A1* | 1/2020 | Bruderek ............. G06F 9/4856 |
| 2020/0117494 | A1 | 4/2020 | Cortez et al. |
| 2020/0183703 | A1 | 6/2020 | Kumar et al. |
| 2020/0183722 | A1 | 6/2020 | Kumar et al. |
| 2020/0249039 | A1 | 8/2020 | Lassoued et al. |
| 2020/0280986 | A1 | 9/2020 | Peterson et al. |
| 2020/0293352 | A1 | 9/2020 | Foley |
| 2020/0326876 | A1* | 10/2020 | Tian ..................... G06F 3/0683 |
| 2021/0014331 | A1 | 1/2021 | Takano et al. |
| 2021/0103481 | A1 | 4/2021 | Bernat et al. |
| 2021/0211479 | A1 | 7/2021 | Trim et al. |
| 2022/0006756 | A1 | 1/2022 | Ramaswamy et al. |

OTHER PUBLICATIONS

Office Action for U.S. Appl. No. 16/691,212, dated Jan. 27, 2022, Tsai, "Dynamic Scheduling for Live Migration Between Cloud Regions and Edge Locations", 22 pages.

* cited by examiner

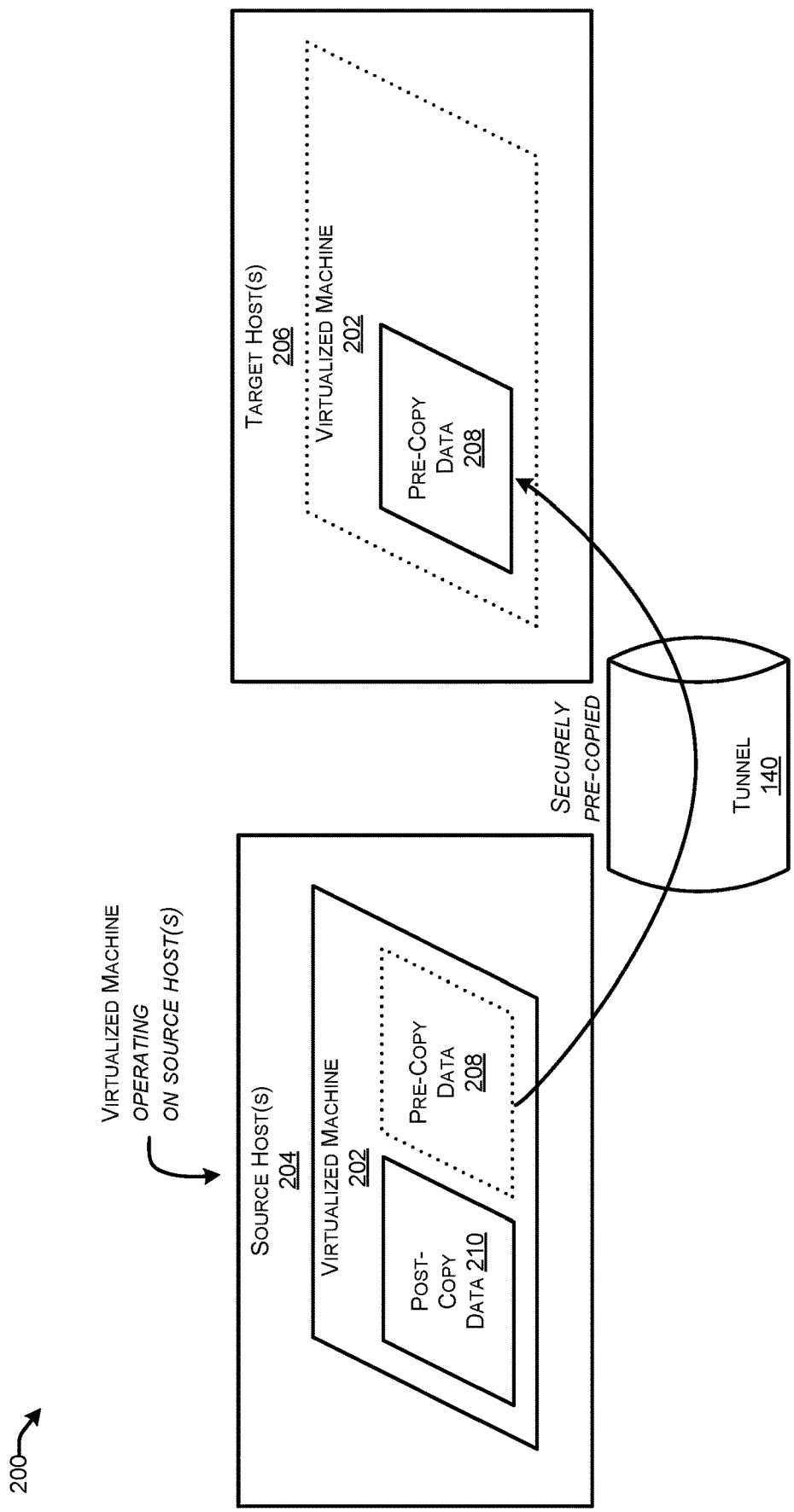

DYNAMIC PRE-COPY AND POST-COPY DETERMINATION FOR LIVE MIGRATION BETWEEN CLOUD REGIONS AND EDGE LOCATIONS

BACKGROUND

Various cloud-based network can provide virtualized computing resources to various users. A cloud-based network may be arranged into multiple availability zones. An availability zone may include at least one data center comprising a fleet of hosts (e.g., devices, servers, or the like). Within the availability zone, hosts can be interconnected by one or more internal communication networks. In various implementations, the internal communication network(s) may be capable of performing high speed data transfer between devices in the fleet. Further, the internal communication network(s) may be isolated from public communication networks, such as the Internet. For instance, the internal communication network(s) may be protected from external data traffic by firewalls and other network security measures.

The hosts in the fleet may host various virtualized resources. In some cases, a virtualized resource may be a Virtual Machine (VM) that utilizes various computing resources of the hosts in the fleet. For instance, an example virtualized machine may utilize a processor of an example host to perform various operations. In some cases, the example virtualized machine may store data in memory of the example host. Various virtualized resources, managed by a variety of different users, may occupy the hosts in the availability zone. The virtualized resources can be controlled by users from devices outside of the data center or an availability zone in which the virtualized resources are hosted. The users can therefore utilize various computing resources of the fleet of hosts even while located remotely from the fleet.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 2A to 2C illustrate examples of live migration. FIG. 2A illustrates an example environment of a pre-copy process. FIG. 2B illustrates an example environment of a post-copy process. FIG. 2C illustrates an example environment for accessing the post-copy data during the post-copy process.

FIG. 3 illustrates an example environment for allocating virtualized resource data into pre-copy data and post-copy data based on utilization levels of the virtualized resource data.

FIG. 4 illustrates an example of the access data, which can be used to identify one or more memory pages of a virtualized resource as pre-copy data.

FIG. 5 illustrates an example process for selecting pre-copy data according to access levels.

FIGS. 6 to 10 illustrate various example techniques for scheduling live migrations of virtualized resources to and/or from edge locations.

FIG. 6 illustrates an example environment for scheduling migrations of virtualized resources over one or more external networks.

FIG. 7A illustrates an example of utilization data of a first virtualized resource. FIG. 7B illustrates an example of utilization data of a second virtualized resource. FIG. 7C illustrates an example of utilization data of a third virtualized resource.

FIG. 8 illustrates an example of the migration schedule based on utilization trends of various virtualized resources.

FIG. 9A illustrates an example process for scheduling migrations of virtualized resources based on network conditions of the secure tunnel. FIG. 9B illustrates an example process for scheduling migrations of virtualized resources based on utilization trends of the virtualized resources.

FIG. 10 illustrates an example process for scheduling a virtualized resource migration.

DETAILED DESCRIPTION

Figure 1:
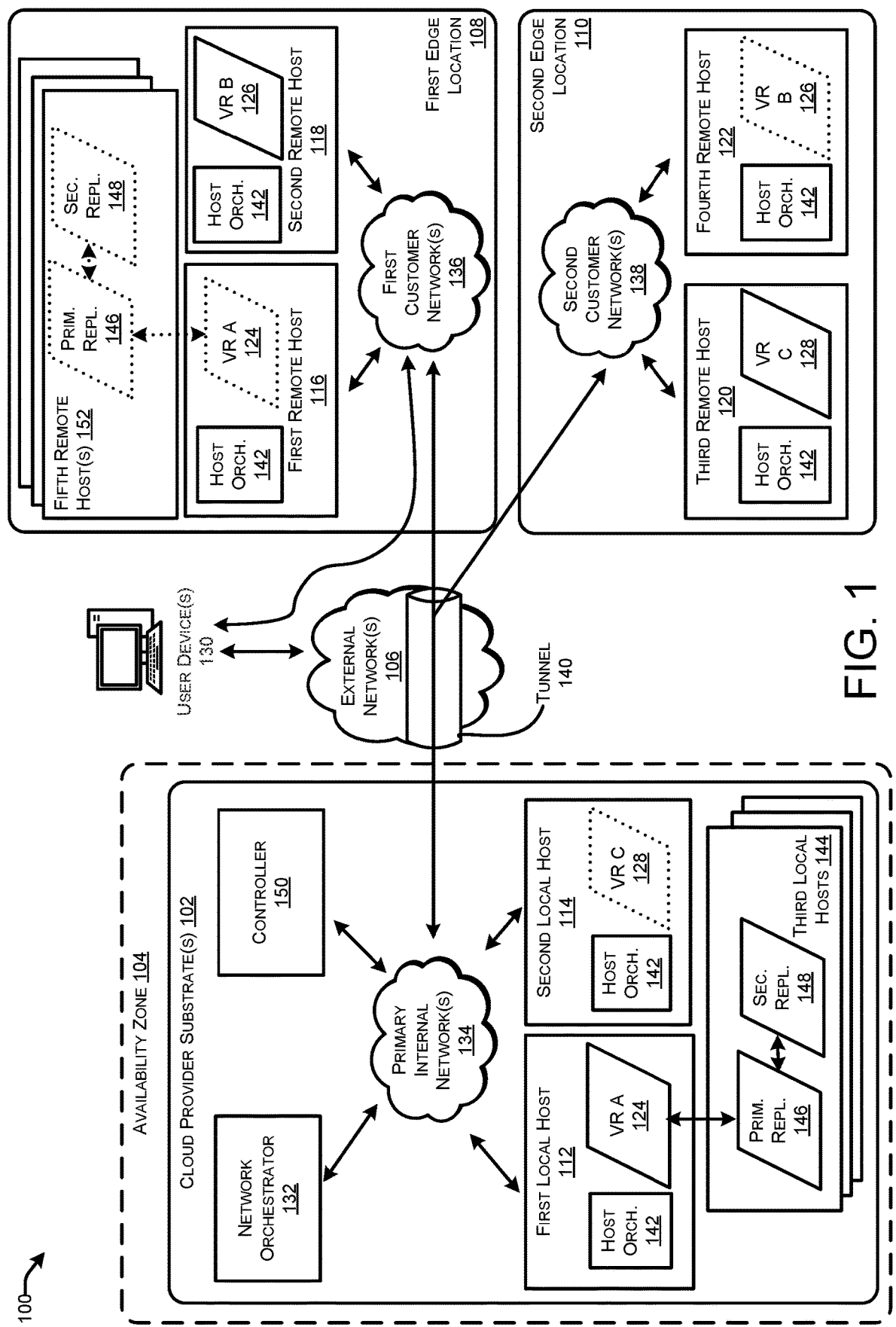
FIG. 1 illustrates an example environment supporting the migration of virtualized resources to and/or from edge locations.

This disclosure describes systems, devices, and techniques for utilizing network resources located at edge locations. Various techniques described herein can be utilized to migrate virtualized resources between a cloud provider network availability zone including one or more data centers and an edge location. In some cases, virtualized resources can be migrated between edge locations. Further, various techniques can be used to "live migrate" the virtualized resources, wherein the virtualized resources continue to perform operations as they are migrated between hosts.

It may be advantageous to expand the fleet, in order to adequately provide cloud-based services to the users of the virtualized resources, as well as to accommodate additional virtualized resources. However, there may be scenarios when it can be beneficial to add hosts to the fleet outside of the protected data centers of the cloud provider network. For instance, customers may desire to have the functionality of the cloud provider network present on their premises. As another example, a communications network partner of the cloud provider may desire to have the functionality of the cloud provider network present within their own network, in order to serve their clients with lower latency. As another example, the cloud provider may wish to extend the cloud functionality to a new geographic area, but may not determine to build an entire new region. Accordingly, it may be advantageous to expand the fleet by utilizing hosts located outside of the protected internal communication network of the cloud provider.

There may be other scenarios in which it might be advantageous to introduce hosts that are located outside of the availability zone. In some scenarios, a physical distance, or a particular type of network connectivity, between a particular user and a virtualized resource of the particular user may introduce an undesirable amount of latency into the apparent operations of the virtualized resource to the particular user. For example, a virtualized resource corresponding to a gaming application may receive, from a user device operated by the user, manipulation data for moving a video game character throughout a virtual environment. Further, the gaming application may transmit, to the user device, feedback data that is responsive to the control data and that visually depicts the video game character moving through the virtual environment. The manipulation data and the feedback data may physically traverse a public communication network, such as the Internet, as well as the internal communication network(s). The traversal of the manipulation data and the feedback data over the networks may introduce latency, which may be detrimental to the user's experience of the video game application. For example, the user may become frustrated with her experience of a delay between a time at which she directs the video game character to move in a particular way and when she sees the video game character moving through the virtual environment. Thus, it may be advantageous to run applications and other services on hosts that are physically close to end users. Further, it may be advantageous to run applications and other services on hosts that are connected to end users via an internal network that does not include the Internet.

Edge locations can be used to upscale fleet resources and/or to provide network resources that are geographically close to end users. An edge location may include multiple additional hosts that can accommodate virtualized resources. However, rather than integrating the edge location into the internal network(s) of the availability zone, the edge location may be connected to the availability zone over at least one public network, such as the Internet, a mobile core network, or the like. The hosts of the edge location may therefore be located in virtually any geographical area connected to the Internet. The edge location can be connected to the availability zone with minimal up-front infrastructure costs.

However, because data transmitted between the availability zone and the edge location traverses the public network(s), the data can be encoded and protected before it is transmitted. A secure data tunnel may carry data and/or control traffic between the availability zone and the edge location and/or between edge locations. However, the secure data tunnel may have limited bandwidth. Accordingly, transmissions over the communication tunnel may be carefully scheduled in advance.

Virtualized resources can be migrated between the availability zone and an edge location, or between edge locations, using the secure communication tunnel. In various implementations described herein, virtualized resources can be migrated between an availability zone and an edge location over tunnel that traverses at least one public and/or third-party communication network, such as the Internet, a mobile network, or the like. The virtualized resources can be migrated by transmitting data associated with the virtualized resources over the secure communication tunnel.

Various techniques described herein relate to live migration of virtualized resources. During a live migration process, an initial portion of data associated with a virtualized resource may be pre-copied from a source host to a target host, while the virtualized resource is operating on the source host. Subsequently, the virtualized resource can transfer its operations to the target host. A remaining portion of the data may be post-copied from the source host to the target host as the virtualized resource is operating on the target host. As the remaining portion of the data is post-copied, any access requests (e.g., read and/or write requests) for the remaining portion of the data may be routed from the virtualized resource on the target host to the source host. Once the data is fully transferred to the target host, the virtualized resource may be fully migrated to the target host and the data on the source host can be discarded. Accordingly, the virtualized resource may operate continuously throughout the live migration process.

Various implementations disclosed herein relate to selecting a portion of virtualized resource data that is pre-copied and a portion of virtualized resource data that is post-copied. The virtualized resource data may include multiple memory pages accessed at different frequencies and in different amounts. In various examples, the pre-copied virtualized resource data may include memory pages that have historically been accessed relatively frequently by the virtualized resource, and the post-copied data may include memory pages that have historically been accessed relatively infrequently by the virtualized resource. Accordingly, the amount of access requests that have to be routed from the target host to the source host for memory pages that remain on the source host during the post-copy process can be reduced.

In various implementations, an amount of data that is pre-copied and post-copied may be identified based on the activity level of the virtualized resource. For instance, a greater proportion of data associated with a virtualized resource that regularly utilizes a large amount of processing resources (or some other type of computing resource) on its respective source host may be pre-copied, as compared to a proportion of data associated with a virtualized resource that regularly utilizes a small amount of processing resources on its respective source host.

Due at least in part to limited bandwidth over the secure communication tunnel, migration of virtualized resources over the secure communication tunnel can be scheduled according to various factors. For instance, a virtualized resource may be scheduled for migration during a time interval in which the virtualized resource is, or is expected to be, relatively idle. Accordingly, the migration of the virtualized resource can be scheduled to limit the impact of the migration on virtualized resource operations.

In some cases, the migration of the virtualized resource can be scheduled according to limited communication resources within the designated communication tunnel, as well as the functional limitations of the hosts in the availability zone and/or the edge location. For instance, a single host in the edge location may only be able to handle a limited number (e.g., one) migration at a given time.

Various implementations described herein also relate to techniques for recovering data associated with a virtualized resource whose migration has been interrupted. According to some implementations, a virtualized resource associated with a block storage volume may be migrated to and/or from an edge location. The block storage volume may be physically stored on at least one different host than the source host and may be virtualized to the virtualized resource via a client on the source host. Due at least in part on the fact that the block storage volume is physically located on different host(s) than the source host, the block storage volume may persist even when the virtualized resource and/or the source host is not operational (e.g., temporarily during restart). Thus, the virtualized resource may use the block storage volume like a computer might use a flash drive, a portable hard drive, or the like.

To ensure that the block storage volume is maintained in the event of various network interruptions, at least two replicas of the block storage volume may be stored within the fleet. A "primary" replica of the block storage volume may directly receive and serve access requests from the client. A "secondary" replica of the block storage volume may receive, from the primary copy, duplicated write requests among the access requests. Accordingly, the virtualized resource may actively read data from the primary replica of the block storage volume, but both the primary replica and the secondary replica may be updated according to the write requests from the virtualized resource. Furthermore, even if the primary replica fails or is disconnected from the client, the client may access the block storage volume using the secondary replica. For instance, when the primary replica fails or is disconnected from the client, the client may initiate a failover process by which the secondary replica is defined as a new primary replica. Once the secondary replica is defined as the new primary replica, the client can access the new primary replica. In addition, a new secondary replica may be defined. For instance, the failed and/or disconnected primary replica may be defined as the new secondary replica, provided it is accessible by the new primary replica. In some cases, data in the new primary replica may be copied into a new secondary replica.

According to various implementations herein, a primary replica and a secondary replica may be stored in a source data center as a virtualized resource is being migrated from the source data center to a target data center over a public network (e.g., the Internet). The virtualized resource in the source data center may have a source client that can virtualize the block storage volume for the virtualized resource as the virtualized resource is operating in the source data center. After operations of the virtualized resource switch to the target data center, the virtualized resource may have a target client that can virtualize the block storage volume for the virtualized resource as the virtualized resource is operating in the target data center. In some cases, the primary and secondary replicas may be copied to the target data center as the virtualized resource is operating in the target data center. While the block storage volume is being transferred to the target data center, both the source client and the target client may be attached to the primary replica that remains in the source data center simultaneously, such that both clients may be configured to access (e.g., read, write, and/or modify) the block storage volume. Thus, if there is an outage in the public network as the block storage volume is being transferred to the target data center, the source client may be used to immediately access the block storage volume due to its ongoing connection to the primary replica.

Various implementations of the present disclosure can be used to improve the technological field of cloud-based networking by enabling secure upscaling of cloud-based resources using edge locations. In addition, by enabling the use of edge locations near user devices to host cloud-based services, communication latency between user devices and hosted services can be reduced and possibly eliminated. Further, various techniques described herein specifically address problems related to virtualized resource migration to and/or from edge locations, by enabling efficient selection of the type of data to be migrated, the amount of data to be migrated, and the time at which the data should be migrated over secure communication tunnels. In some implementations, techniques disclosed herein can further improve cloud-based networking by enabling the recovery of block storage after network interruptions during migration.

Some example implementations of the present disclosure will now be described with reference to the accompanying drawings. Various elements of the drawings may be labeled according to reference numerals. The first digit in each reference numeral may refer to the first figure in which the corresponding element appears.

FIG. 1 illustrates an example environment 100 supporting the migration of virtualized resources to and/or from edge locations. As illustrated, the environment 100 includes at least one cloud provider substrate 102 within a single availability zone 104. As used herein, the term "availability zone," and its equivalents, can refer to an isolated failure domain including one or more data center facilities with separate power, separate networking, and separate cooling from those in another availability zone.

According to various implementations, the cloud provider substrate(s) 102 in the availability zone 104 may be connected to various edge locations (also referred to herein as "provider substrate extensions" (PSEs)) via one or more external networks 106. As used herein, the term "edge location," described in further detail with respect to FIG. 16, refers to a collection of one or more hosts that provide at least some of the functionality provided by the virtualized services of the cloud provider network, but are separated from the cloud provider network by at least one network (e.g., a VPN or other secure connection over a public network such as the Internet, or in some scenarios via a direct connection such as a private fiber network). The edge location may not have the full functionality of a typical cloud provider availability zone, for example it may extend data plane functionality of the cloud provider network while relying on control plane functionality from a nearby availability zone. As illustrated in FIG. 1, the external network(s) 106 interconnect the cloud provider substrate(s) 102 with a first edge location 108 and a second edge location 110.

In various implementations, the external network(s) 106 may include at least one public network. As used herein, the term "public network" can refer to any data communication network that can be used to convey the transmission of data between unverified entities. Accordingly, data transmitted over the public network may be vulnerable to interception and/or attacks by nefarious entities connected to the public network. Some examples of a public network include the Internet, a mobile core network (e.g., a $3^{rd}$ Generation (3G) core network, an Evolved Packet Core (EPC), a $5^{th}$ Generation (5G) core network, etc.), a Radio Access Network (RAN), or the like.

The various data centers within the environment 100 can include multiple hosts. As used herein, the term "host" can refer to one or more physical servers. For instance, the cloud provider substrate(s) 102 may include multiple hosts, such as a first local host 112 and a second local host 114, the first edge location 108 includes a first remote host 116 and a second remote host 118, and the second edge location 110 includes a third remote host 120 and a fourth remote host 122.

The hosts within the environment may be configured to accommodate virtualized resources. As used herein, the term "virtualized resource" can refer to software and/or data that can be hosted by a host device, such as a server. In various examples, a single virtualized resource may be associated with a single user or entity (e.g., a corporation, a business, a government agency, a non-profit, etc.), a single user or entity account, or group of users or entities. For the purposes of this discussion, the terms "user" and "entity" can be used interchangeably throughout this disclosure. In some cases, a virtualized resource can be hosted by multiple physical servers, simultaneously. In some cases, a host can be a "shared server," which may be a single physical server configured to run multiple virtualized resources, simultaneously. In some cases, a host can be a "bare-metal server," which may be a single physical server configured to run a single virtualized resource at a particular time. For example, the first local host 112 may accommodate a virtualized resource (illustrated as "VR") A 124, the second remote host 118 may be configured to accommodate a virtualized resource B 126, and the third remote host 120 may be configured to host a virtualized resource C 128.

Each of the hosts in the environment 100 (e.g., the first local host 112, the second local host 114, the first remote host 116, the second remote host 118, the third remote host 120, and the fourth remote host 122) may include various resources by which to host virtualized resources. As used herein, the terms "resources," "computing resources," and their equivalents can refer to at least one of processing resources, memory resources, cache resources, service resources, or the like, of one or more devices. The term "processing resource," and its equivalents, may refer to the availability of at least a portion of one or more physical processors (e.g., Central Processing Units (CPUs)) to process data. The terms "memory resource," "storage resource, and their equivalents, may refer to the availability of at least a portion of one or more physical memory systems (e.g., Random Access Memory (RAM)) to store data. The term "cache resource," and its equivalents, can refer to the availability of a capacity in a RAM and/or in-memory engine to cache data at least temporarily. The term "service resource," and its equivalents, may refer to the availability of one or more services hosted by a physical server to perform requested operations. In various implementations described herein, the term "capacity" can refer to an amount of one or more resources in a host and/or communication network (e.g., a communication tunnel). For instance, a capacity of a processing resource can be in units of Gigahertz (GHz), a capacity of a memory resource can be in units of Megabytes (MB), Gigabytes (GB), or the like. In some multitenancy examples, a first capacity of a resource (e.g., a memory resource) may be allocated to a first virtualized resource and a second capacity of the resource may be allocated to a second virtualized resource, wherein a total capacity of the resource may be at least as large as a combination (e.g., a sum) of the first capacity and the second capacity. The term "available capacity," and its equivalents, may refer to an amount of unused or available resources within a particular host or communication network.

One or more user devices 130 can connect to the external network(s) 106. In various examples, the user device(s) 130 may enable end users to control virtualized resources occupying various hosts within the environment 100. For instance, a user, entity, enterprise, or the like may be associated with an account for controlling and/or managing various virtualized resources in the environment 100. In some cases, a user may input, via a user interface, a request to migrate a particular virtualized resource to one of the edge locations 108 or 110, which may be located geographically close to the user device(s) 130. Once the virtualized resource is hosted in the requested edge location 108 or 110, communication latency between the virtualized resource and the user device(s) 130 may be reduced.

According to various implementations of the present disclosure, a network orchestrator 132 may be configured to orchestrate migrations of virtualized resources between hosts located throughout the cloud provider substrate(s) 102, the first edge location 108, and the second edge location 110. For example, the network orchestrator 132 may orchestrate migrations in response to receiving a command from the user device(s) 130 to migrate various virtualized resources to different data centers. In various implementations, the network orchestrator 132 may be a Virtual Machine (VM) implemented by one or more devices (e.g., servers) located in the cloud provider substrate(s) 102.

According to some implementations, the network orchestrator 132 may track various metrics about the hosts and/or virtualized resources within the environment 100. The network orchestrator 132 may be configured to track the utilization of various computing resources of hosts in the cloud provider substrate(s) 102, the first edge location 108, and the second edge location 110. For example, the network orchestrator 132 may track an amount of computing resources of the first local host 112 that are utilized by the virtualized resource A 124, over a time period. In some cases, the network manager 130 may be configured to track available capacity in computing resources of the hosts in the cloud provider substrate(s) 102, the first edge location 108, and the second edge location 110. For example, the network manager may identify an available capacity of computing resources of the first remote host 116. In some examples, the network orchestrator 132 may track the metrics about hosts and/or virtualized resources via control plane signaling.

In some implementations, the network orchestrator 132 may determine that a virtualized resource should be migrated from a source host to a target host. Initiation of the migration of the virtualized resource and an optimized placement of the virtualized resource may be based on network use patterns. A request to initiate the migration may be from a specific geographic location and, as a result, the virtualized resource may be migrated to a host in proximity to that geographic location. In some embodiments, a request to initialize migration of the virtualized resource may be initiated internally by the system, as opposed to by a customer. However, in some embodiments, the migration may be initialized based on a request from a customer. Or, initiation of the migration may be based on both the system and the customer, such as being based on customer-defined rules. In some examples, the network orchestrator 132 may determine to migrate a virtualized resource from a source with a relatively low level of available capacity to a target host with a relatively high level of available capacity. Thus, the network orchestrator 132 may migrate virtualized resources throughout the environment 100 in order to balance a load of virtualized resources across various hosts within the environment 100, which may be in the cloud provider substrate(s) 102, the first edge location 108, or the second edge location 110.

According to some implementations, the network orchestrator 132 may determine to migrate virtualized resources in order to move the virtualized resources to geographic locations that are closer to their respective end users. For example, the network orchestrator 132 may determine that one of the user device(s) 130 associated with virtualized resource A 124 is geographically closer to the first edge location 108 than the cloud provider substrate(s) 102. In some cases, the network orchestrator 132 may estimate the geographical proximity of various network elements (e.g., the user device(s) 130, hosts in the cloud provider substrate(s) 102, hosts in the first edge location 108, or the like) proximity based on communication latency between the network elements. The network orchestrator 132 may automatically migrate virtualized resource A 124 from the cloud provider substrate(s) 102 to the first edge location 108, in order to lower the geographical distance between the host in which virtualized resource A 124 operates and the user device 130 associated with virtualized resource A 124.

In some examples, the network orchestrator 132 may receive a request to migrate the virtualized resource from a source host. For example, the network orchestrator 132 may receive a request from the one or more user device(s) 130 associated with the virtualized resource A 124 to move virtualized resource A 124 to a new host (e.g., the first remote host 116) in the first edge location 108. In some cases, communications between the user device(s) 130 and the hosts in the first edge location 108 may be associated with a lower latency than communications between the user device(s) 130 and the hosts in the cloud provider substrate(s) 102, due at least in part to the geographic proximity between the user device(s) 130 and the first edge location 108. In some cases, user device(s) 130 may be connected directly to at least one first customer network 136 in the first edge location 108, such that communications between the edge location 108 and the user device(s) 130 do not need to traverse the external network(s) 106. The connection between the user device(s) 130 and the first customer network 136 may, in some case, improve security of the communications between the user device(s) 130 and the first customer network 136 (e.g., due to the fact that the communications may not have to traverse a public network) as well as improve the latency of the communications between the user device(s) 130 and the first customer network 136 (e.g., due to the fact that the communications may not necessarily have to be encoded and/or encrypted). Thus, the user device(s) 130 may request the network orchestrator 132 to initiate the migration for various reasons.

In some cases, a user of the user device(s) 130 can specify one or more rules by which migration should be initiated. For example, the user device(s) 130 may transmit, to the network orchestrator 132, an indication that a virtualized resource associated with the user should be within a particular geographic distance of the user device(s) 130 (or, e.g., that communications between the virtualized resource and the user device(s) 130 should have no more than a particular latency). If the network orchestrator 132 determines that the virtualized resource is outside of the geographic distance, the network orchestrator 132 may migrate the virtualized resource to a data center within the geographic distance.

The network orchestrator 132 may cause the source host to migrate the virtualized resource to the target host. In some cases, the network orchestrator 132 may instruct the source host to transfer data associated with the virtualized resource to the target host. Further, in some cases, the network orchestrator 132 may receive a confirmation, from the target host, that the virtualized resource has been successfully migrated. Thus, the network orchestrator 132 may orchestrate the movement of virtualized resources throughout the environment 100.

As illustrated in FIG. 1, elements of the cloud provider substrate(s) 102 may be interconnected via at least one primary internal network 134. Similarly, elements of the first edge location 108 may be interconnected via at least one first customer network 136, and elements of the second edge location 110 may be interconnected by at least one second customer network 138. Like the primary internal network(s) 134, the first customer network(s) 136 and the second customer network(s) 138 may each be internal to their respective data centers. For instance, at least one of the primary internal network(s) 134, the first customer network(s) 136, or the second customer network(s) 138 may be secured from the external network(s) 106 via at least one security policy and/or firewall. In some cases, at least one of the primary internal network(s) 134, the first customer network(s) 136, or the second customer network(s) 138 may include an optical fiber network configured to provide high-speed data communication between various entities (e.g., devices, routers, switches, and the like).

Due to the isolation of the internal networks (e.g., at least one of the primary internal network(s) 134, the first customer network(s) 136, or the second customer network(s) 138) from the external network(s) 106, data can be freely transmitted with the internal networks. For instance, virtualized resource data can be securely transmitted between the first local host 112 and the second local host 114 without encoding and/or encryption, due to security policies enforced within the primary internal network(s) 134 as well as the isolation between the primary internal network(s) 134 and the external network(s) 106.

However, specific challenges can arise when a virtualized resource is migrated over the external network(s) 106. For instance, virtualized resource A 124 may be migrated from the first local host 112 to the first remote host 116; virtualized resource B may be migrated from the second remote host 118 to the fourth remote host 122; and virtualized resource C 128 can be migrated from the third remote host 120 to the second local host 114. In each of these scenarios, virtualized resource data may be transferred over the external network(s) 106.

In order to ensure that the virtualized resource data is transferred safely and securely during migration, the virtualized resource data may be encapsulated and transferred through a secure tunnel 140 that traverses the external network(s) 106. The tunnel 140 may be specifically designated for communications (e.g., data plane traffic and/or control plane traffic) between the availability zone 104, the first edge location 108, and/or the second edge location 110. In some cases, communications through the tunnel 140 may be encoded prior to transfer through the external network(s) 106. For example, the communications can be encoded via a key-based encoding method, such as symmetric key encryption, public key encryption, handshake encryption, Rivest-Shamir-Adleman (RSA) encryption, or the like. In some cases, the key can be at least 256 bits long. In some cases, the communications can be encoded via a Secure Hash Algorithm (SHA). According to some implementations, the tunnel 140 can include a reserved data tunnel, through which data traffic (e.g., virtualized resource data) can be transferred, and a reserved control tunnel, through which control plane data can be transferred. According to some examples, the tunnel 140 may include at least one Virtual Private Network (VPN) that provides a secure connection over the external network(s) 106. For instance, the tunnel 140 can utilize and/or include a Secure Socket Tunneling Protocol (SSTP), a virtual Local Area Network (LAN), a Virtual Private LAN Service (VPLS), a Pseudo Wire (PW), or the like. In various implementations, communications (e.g., virtualized resource data, control plane data, or the like) may be encoded at one endpoint of the tunnel 140, transmitted through the external network(s) 106 in accordance with the tunneling protocol, and may be decoded at another endpoint of the tunnel 140. For instance, the communications can be encoded by a source host and may be decoded by a target host. In some cases, an entity (e.g., a software instance hosted by at least one server) in a source data center may intercept communications flagged for transmission over the tunnel 140, may encode the communications before they are transmitted over the external network(s) 106.

In some implementations, the network orchestrator 132 can store and manage various keys that can be used to encode and decode data transmitted over the tunnel 140. When the network orchestrator 132 initiates migration of a virtualized resource from a source host to a target host, the network orchestrator 132 may transmit a key (e.g., an RSA key) to both the source host (on which the virtualized resource may be operating) and the target host. The key may be transmitted over the control plane, in some cases. The source host may encode data using the key and transmit the encoded data over the tunnel 140. The target host may decode the encoded data, which may be received over the tunnel 140, using the key. Accordingly, the data may be protected during transmission over the external network(s) 106, but may be usable by the target host. In some cases, the network orchestrator 132 can distribute different keys for different migrations throughout the environment 100.

According to various implementations, the tunnel 140 may have limited bandwidth and/or network resources by which data can be transferred over the external network(s) 106. Thus, various techniques can be used to migrate virtualized resources efficiently over the limited network resources of the tunnel 140. In some examples, the network orchestrator 132 may schedule migrations of virtualized resources over the tunnel 140 according to various conditions of the virtualized resources, the target hosts to which the virtualized resources are migrated, and/or the tunnel 140 itself.

In some examples, the network orchestrator 132 may schedule to migrate a virtualized resource when the virtualized resource is relatively idle. A controller 150 may indicate, to the network orchestrator 132, utilization data associated with various virtualized resources. The utilization data may track Central Processing Unit (CPU) usage, Input/Output (I/O) request rates, or the like, of various virtualized resources in the environment 100. For example, the network orchestrator 132 may identify utilization data indicating daily usage trends by virtualized resource A 124 of at least one CPU of the first local host 112. The network orchestrator 132 may use the utilization data to determine a time-of-day at which virtualized resource A 124 has historically had a relatively low CPU usage of the first local host 112. The network orchestrator 132 may schedule the migration of virtualized resource A 124 from the first local host 112 to the first remote host 116 during a time interval corresponding to the time-of-day at which virtualized resource A 124 has historically had a relatively low CPU usage.

The network orchestrator 132 may selectively cause virtualized resources to migrate over the tunnel 140 when the virtualized resources have relatively low utilization levels. For instance, the network orchestrator 132 may cause the first local host 112 to migrate virtualized resource A 124 to the first remote host 116 during a time interval when a utilization level of virtualized resource A 124 is less than a threshold utilization level. In some cases, the threshold utilization level can be defined according to an average utilization level of virtualized resource A 124 over an extended period of time, can be predefined, or a combination thereof. In some cases, the network orchestrator 132 may prioritize migration of a first virtualized resource during a time interval over a second virtualized resource over a time interval when the first virtualized resource has a lower utilization level during the time interval than the second virtualized resource. For instance, the network orchestrator 132 may cause virtualized resource A 124 to be migrated over the tunnel 140 during a particular time interval, and may refrain from causing virtualized resource C 128 to migrate over the tunnel 140 during the particular time interval, if the utilization level of virtualized resource A 124 is lower than the utilization level of virtualized resource C 128 during the particular time interval.

In various implementations, the network orchestrator 132 may schedule migrations of a first type of virtualized resources before migrations of a second type of virtualized resources. In some cases, the network orchestrator 132 may track (e.g., via a local datastore) and/or identify (e.g., by communicating with some other network element that tracks virtualized resources within the environment 100) the type of each of a group of virtualized resources being migrated. A virtualized resource type (also referred to as an "instance type") may be characterized by the virtualized resource's hardware type, processing or computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. In some cases, the network orchestrator 132 may schedule the migration of virtualized resources that utilize and/or are reserved a greater amount of resources (e.g., processing resources) than virtualized resources that utilize and/or are reserved a smaller amount of resources. Accordingly, the network orchestrator 132 may prioritize the migrations of virtualized resources that are most likely to benefit from migration to a target data center.

In some cases, the utilization data provided by the network orchestrator 132 may be at least slightly out-of-date. For instance, the network orchestrator 132 may receive, from a network manager (not illustrated), metrics associated with control plane data from the first local host 112 about the utilization level of virtualized resource A 124 and generate the utilization data based on the control plane data, which may be at least slightly delayed before the utilization data is provided to the network orchestrator 132. In some cases, the control plane data may comprise periodic health checks of various virtualized resources and/or hosts within the environment 100. The utilization data may therefore provide an estimate of the current utilization level of virtualized resource A 124, and the estimate may be at least slightly out-of-date.

To ensure that virtualized resource migration is scheduled according to current utilization conditions of the virtualized resources in the environment 100, host orchestrators 142 on the source hosts may individually confirm migrations based on real-time conditions of the virtualized resources the hosts are accommodating. In some examples, the network orchestrator 132 may request the second remote host 118 to perform a migration of virtualized resource B 126 at a particular time. The host orchestrator 142 of the second remote host 118 may confirm whether migration is appropriate during the particular time. For instance, the host orchestrator 142 may compare the current utilization level of virtualized resource B 126 to a threshold utilization level (e.g., an average utilization level of virtualized resource B 126, a predetermined utilization level, or the like). In some cases, the host orchestrator 142 can identify the current utilization level of virtualized resource B 126 by querying a resource manager (e.g., a hypervisor) of the second remote host 118. If the host orchestrator 142 determines that the current utilization level is less than the threshold utilization level, the host orchestrator 142 may proceed to migrate virtualized resource B 126 during the particular time as requested by the network orchestrator 132. However, if the host orchestrator 142 determines that the current utilization level is greater than or equal to the threshold utilization level, the host orchestrator 142 may reject the network orchestrator's 132 request to perform migration at the particular time. For instance, the host orchestrator 142 may transmit a rejection message to the network orchestrator 132. Upon receiving the rejection message, the network orchestrator 132 may schedule a migration of a different virtualized resource (e.g., virtualized resource A 124 and/or virtualized resource C 128) over the limited network resources of the tunnel 140 during the particular time and/or may reschedule the migration of virtualized resource B 126 for a different time.

In some cases, a target host may be able to accommodate migrations of a limited number of virtualized resources at one time. For example, the second local host 114 may have a limited amount of available computing resources by which the second local host 114 can use to receive virtualized resources during migrations. In some cases, the second local host 114 may serve as a target host to no more than a threshold number (e.g., one, two, or some other number) of migrating virtualized resources at a single time. Accordingly, the network orchestrator 132 may schedule migrations of no more than the limited number of virtualized resources to the second local host 114 at a particular time. In some examples, the network orchestrator 132 may track (e.g., in a local datastore) and/or otherwise identify (e.g., by communicating with another network element within the environment 100) the threshold numbers of simultaneous virtualized resources that can be migrated for various hosts within the environment 100.

In various examples, the network orchestrator 132 may schedule migrations over the tunnel 140 according to conditions of the tunnel 140. In some cases, the network orchestrator 132 may identify a network condition of the tunnel 140 at a particular time. The network condition could be, for instance, an available bandwidth or capacity of the tunnel 140, a latency of the tunnel 140, a congestion level of the tunnel 140, or the like. In various examples, the "congestion level" of the tunnel 140 can refer to a number between 0 and 1 that can be calculated by dividing an amount of capacity being used in the tunnel 140 (e.g., an amount of occupied bandwidth of the tunnel 140) by the total amount of capacity (e.g., a total amount of bandwidth) of the tunnel. In some cases, the congestion level of the tunnel 140 can be estimated based on the latency of the tunnel 140. During time periods when the tunnel 140 is relatively uncongested, the network orchestrator 132 can increase the number of virtualized resources migrating over the tunnel 140. During time periods when the tunnel 140 is relatively congested, the network orchestrator 132 can refrain from increasing the number of virtualized resources migrating over the tunnel 140.

The tunnel 140 over the external network(s) 106 may be associated with a relatively high data transmission latency, when compared to a transmission latency over any of the internal networks in the environment 100. Thus, in various examples, virtualized resources can be at least partially live migrated over the tunnel 140. During an example live migration process in which virtualized resource C 128 is migrated from the third remote host 120 to the second local host 114, virtualized resource C 128 may initially operate on the third remote host 120. An initial portion of data associated with virtualized resource C 128 may be transferred from the third remote host 120 to the second local host 114 over the tunnel 140. The initial portion of data transferred during a live migration process may be referred to as "pre-copy data," and the transfer of the initial portion of data may be referred to as a "pre-copy process." After the pre-copy data is transferred, virtualized resource C 128 may begin operating on the second local host 114. Subsequently, the remaining portion of the data may be transferred to the second local host 114 over the tunnel 140 as virtualized resource C 128 is operating on the second local host 114. The remaining portion of the data transferred during a live migration process may be referred to as "post-copy data," and the transfer of the remaining portion of the data may be referred to as a "post-copy process." If virtualized resource C 128 receives an access request (e.g., a read request, a write request, or the like) for any part of the post-copy data during the post-copy process, virtualized resource C 128 may forward the access request to the third remote host 120 over the tunnel 140, and the third remote host 120 may provide the requested part of the data to the target host over the tunnel 140 in response to the access request. Once the transfer of the remaining portion of the data is completed, all of the data associated with virtualized resource C 128 may be maintained on the second local host 114, and the copy of data associated with virtualized resource C 128 may be deleted from the third remote host 120.

In general, an amount of the pre-copy data can be optimized based on various conditions. A smaller amount of pre-copy data can reduce the amount of time to complete the pre-copy process. In situations where it is advantageous to prioritize the transfer of virtualized resource operations from the source host to the target host as quickly as possible, a smaller amount of pre-copy data may be beneficial. However, a smaller amount of pre-copy data may correspond to a larger amount of post-copy data, which may result in a longer post-copy process. The transfer of access requests during the post-copy process may require at least some network resources of the tunnel 140. Accordingly, increasing the post-copy data may cause the migration of a virtualized resource to expend a greater amount of network resources of the tunnel 140.

In various implementations of the present disclosure, an amount of pre-copy data and an amount of post-copy data of a particular virtualized resource being migrated may be determined, at least in part, by the network orchestrator 132 and/or the host orchestrator 142. In some implementations, the network orchestrator 132 may set a threshold amount of the pre-copy data. For example, the network orchestrator 132 may determine the threshold amount of the pre-copy data for the migration of virtualized resource B 126, from the second remote host 118 to the fourth remote host 122, based on various network conditions of the tunnel 140. The network orchestrator 132 may transmit, to second remote host 118 serving as the source host, a message indicating the threshold amount of the pre-copy data. The second remote host 118 may subsequently transfer, in the pre-copy process, no more than the threshold amount of data associated with virtualized resource B 126 to the fourth remote host 122, which is serving as the target host. According to some examples, the host orchestrator 142 of the second remote host 118 may identify the threshold amount of the pre-copy data. For instance, the host orchestrator 142 may determine the threshold amount of the pre-copy data based on one or more current usage levels of virtualized resource B 126 (e.g., as tracked by a resource manager of the fourth remote host 122 and/or the controller 150).

In various examples, the host orchestrator 142 may select the pre-copy data of virtualized resource B 126 based on access levels of the data associated with virtualized resource B 126. In some implementations, the virtualized resource data can include multiple memory pages that are accessed at different rates. The host orchestrator 142 may identify the access levels of the memory pages associated with virtualized resource B 126. The host orchestrator 142 may select a portion of the memory pages as pre-copy data, based at least in part on the access levels. In various implementations, the host orchestrator 142 may select the memory pages with the highest access levels as at least a portion of the pre-copy data, and may select the memory pages with the lowest access levels as at least a portion of the post-copy data. Accordingly, the memory pages that are the most likely to be accessed during the post-copy process are pre-copied to the fourth remote host 122 during the migration of virtualized resource B 12, thereby limiting the amount of network resources of the tunnel 140 that would need to be allocated to access requests during the post-copy process.

Various virtualized resources within the environment 100 may be associated with block storage data. For instance, as illustrated in FIG. 1, at least one third local host 144 may store primary replica 146 and secondary replica 148 that comprise block storage data for virtualized resource A 124. The block storage data may be virtualized for virtualized resource A 124 via a client. The primary replica 146 may include a copy of the block storage data that the client forwards access requests, including read and write requests. Any write requests instructing changes to the block storage data are forwarded from the primary replica 146 to the secondary replica 148. Accordingly, the secondary replica 148 may remain an up-to-date copy of the block storage data despite any changes to the primary replica 146.

In various implementations, the block storage data may be transferred to one or more fifth remote hosts 152 in the first edge location 108, as part of the migration of virtualized resource A 124 to the first remote host 116. During the transfer, the client may be active on the first local host 112 and/or the first remote host 116. In various implementations, the block storage data may be multi-attached to the client on the first local host 112 and the client on the first remote host 116, simultaneously. The primary replica 146 can be simultaneously accessed (e.g., read, written, and/or modified) by the clients the first local host 112 and the first remote host 116 during migration of virtualized resource A 124. Thus, if there is some interruption in the external network(s) 106 and/or the tunnel 140 before virtualized resource A 124 is fully migrated from the first local host 112 to the first remote host 116, the migration of virtualized resource A 124 can be rolled back to the first local host 112, and the copy of the primary replica 146 can be used to restore the block storage data.

The controller 150 may be part of the cloud provider substrate(s) 102 within the availability zone 104. The controller 150 may receive and/or transmit control plane signaling throughout various elements within the environment 100. In various implementations, the controller 150 can be implemented by one or more software instances on one or more hosts (e.g., servers) within the cloud provider substrate(s) 102. The controller 150 may, in some cases, transmit control plane signaling to hosts that can be used to control virtualized resources occupying those hosts. In some cases, in which the controller 150 is transmitting s control plane message to one of the remote hosts in the first edge location 108 or the second edge location 110, the controller 150 may transmit the control plane message over a portion of the tunnel 140 reserved for control plane traffic. The tunnel 140 may accommodate control plane signaling from the cloud provider substrate(s) 102 to the edge locations 108 and 110, without accommodating control plane signaling from the edge locations 108 and 110 to the cloud provider substrate(s) 102. The control plane signaling transmitted by the controller 150 can be used to estimate utilization and/or usage levels of the virtualized resources occupying various hosts throughout the environment 100. For example, the controller 150 may generate and transmit utilization data corresponding to various virtualized resources throughout the environment 100 to the network orchestrator 132, which the network orchestrator 132 can use to schedule migrations.

Figure 2B:
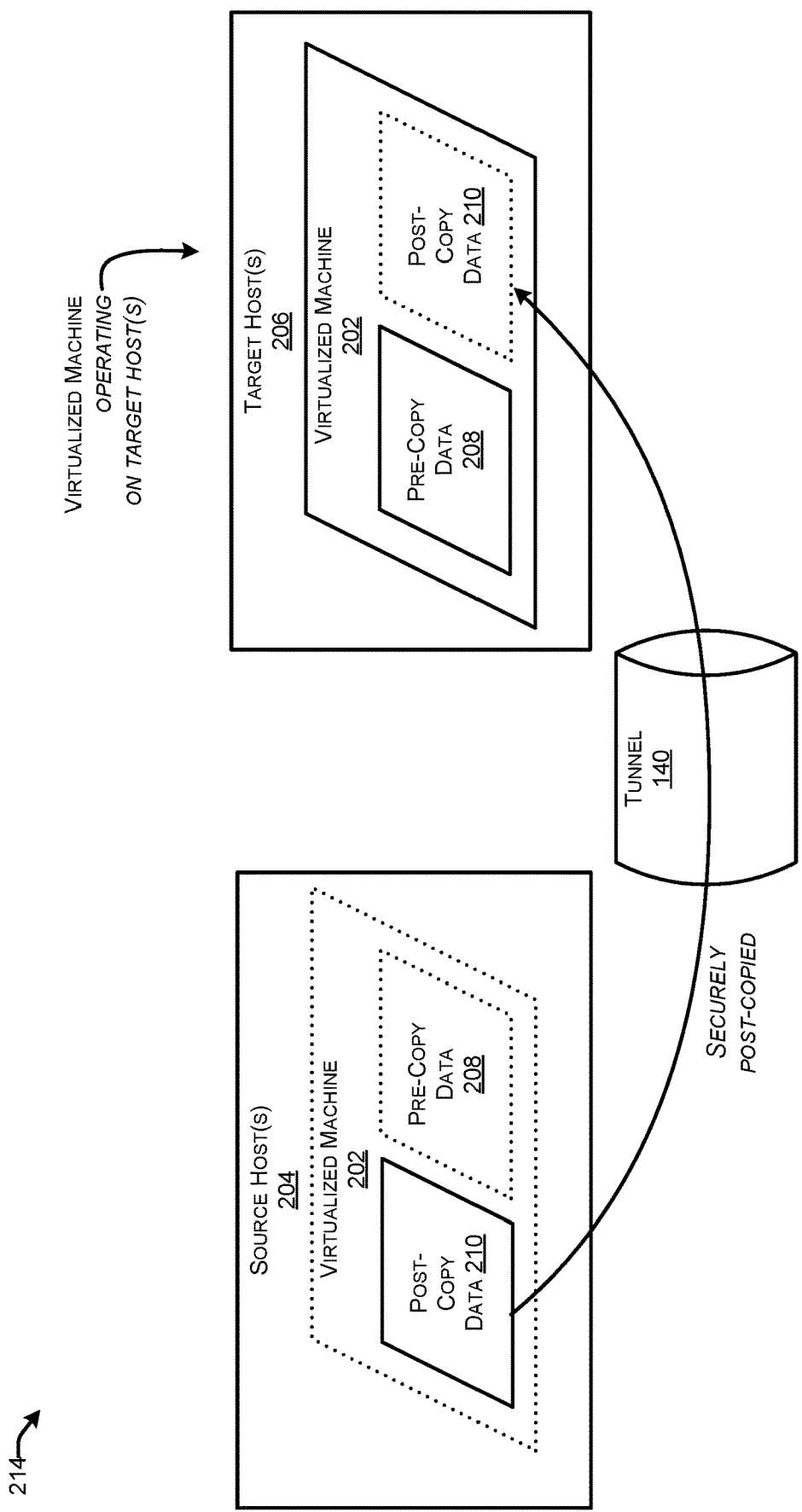
Figure 2C:
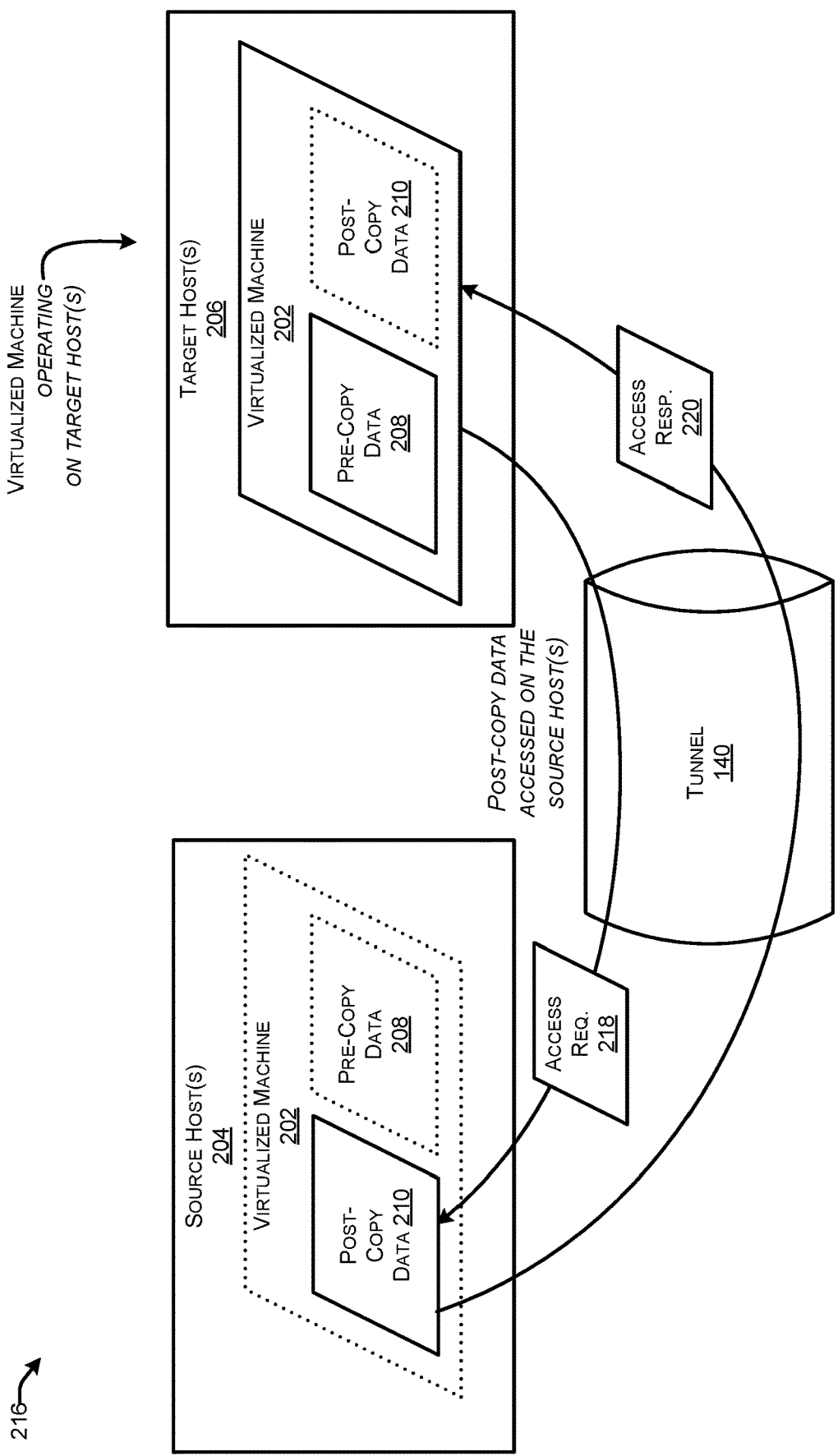

FIGS. 2A to 2C illustrate examples of environments for live-migrating a virtual machine 202 from at least one source host 204 to at least one target host 206. As illustrated in FIGS. 2A to 2C, the virtual machine 202 is migrated using the tunnel 140 described above with reference to FIG. 1. For the purposes of this discussion, a virtual machine ("VM") may also be referred to herein as a virtual resource ("VR").

In various implementations, the virtual machine 202 may be any one of virtualized resource A 124, virtualized resource B 126, or virtualized resource C 128, which are described above with reference to FIG. 1. In some examples, the virtual machine 202 may be operating a first source host among the source host(s) 204 and may be associated with a block storage volume that is stored on one or more second source hosts of the source host(s) 204. Data associated with the virtual machine 202 may include pre-copy data 208 and post-copy data 210.

In various examples, the source host(s) 204 can include any of the first local host 112, the second local host 114, the first remote host 116, the second remote host 118, the third remote host 120, the fourth remote host 122, the third local hosts 114, or the fifth remote hosts 148. In some instances, the target host(s) 206 can include any of the first local host 112, the second local host 114, the first remote host 116, the second remote host 118, the third remote host 120, the fourth remote host 122, the third local hosts 114, or the fifth remote hosts 148.

The source host(s) 204 and the target host(s) 206 may be separated by at least one external network (e.g., the external network(s) 106 described above with reference to FIG. 1). Accordingly, data transferred between the source host(s) 204 and the target host(s) 206 may be transmitted over the tunnel 140. The tunnel 140 may be used to securely transfer data over the external network(s).

FIG. 2A illustrates an example environment 200 of a pre-copy process. In the pre-copy process, operations of the virtual machine 202 (also referred to as a compute instance or simply an "instance") may be performed on the source host(s) 204. For example, the virtual machine 202 may utilize processing resources of the source host(s) 204 to perform operations.

As the virtual machine 202 is operating on the source host(s) 204, the source host(s) 204 may transfer the pre-copy data 208 to the target host(s) 206 over the tunnel 140. For example, the pre-copy data 208 may be encrypted and transmitted over the external network(s) via a secure tunneling protocol associated with the tunnel 140. In other words, the pre-copy data 208 may be pre-copied to the target host(s) 206. Once the pre-copy data 208 has been fully transferred to the target host(s) 206, the virtual machine 202 may begin to operate on the target host(s) 208.

The pre-copy data 208 can include various data associated with the virtual machine 202. In some cases, the pre-copy data 208 can include state information indicating a current state (e.g., a CMOS state) of the virtual machine 202 as it is operating on the source host(s) 204. In some cases, the pre-copy data 208 can include data including instructions for various operations of the virtual machine 202 (e.g., program instructions). According to some implementations, the pre-copy data 208 may include data stored in a local memory of the source host(s) 204, such as one or more memory pages associated with the virtual machine 202. For instance, the pre-copy data 208 can include one or more of the most accessed pages associated with the virtual machine 202. In some cases, the pre-copy data 208 can include data indicating a block storage volume, which may be stored on and/or transferred from one of the source hosts 204 that is different than the source host 204 actively performing operations of the virtual machine 202 during the pre-copy process.

In some cases, the pre-copy data 208 may be modified on the source host(s) 204 while the pre-copy data 208 is being transferred to the target host(s) 206. For instance, the virtual machine 202 may receive a write request to modify the pre-copy data 208 during the pre-copy process. The modifications to the pre-copy data 208 during the pre-copy process may be referred to as "interim changes." According to various implementations, a resource manager of the target host(s) 206 may track any changes to the pre-copy data 208 during the pre-copy process. Once the initial version of the pre-copy data 208 has been transferred to the target host(s) 206, additional data indicating to the interim changes may be transferred to the target host(s) 206. Accordingly, the target host(s) 206 may have an up-to-date version of the pre-copy data 208 at the conclusion of the pre-copy process.

In particular implementations, the pre-copy data 208, and any data corresponding to any interim changes, may be transmitted over a data plane tunnel within the tunnel 140. At least a portion of the communication resources of the tunnel 140 may be reserved for the data plane tunnel 210, which may transfer uplink and/or downlink data associated with the data plane. The tunnel 140 may include a VPN tunnel, in some cases. In some implementations, once the pre-copy data 208 has been fully copied to the target host(s) 206, the target host(s) 206 may transmit a confirmation message indicating that the pre-copy data 208 has been received by the source host(s) 204. In some cases, the target host(s) 206 may transmit a confirmation message to a network orchestrator, which may indicate that the pre-copy data 208 has been received by the source host(s) 204.

FIG. 2B illustrates an example environment 214 of a post-copy process. During the post-copy process, the virtual machine 202 may operate on the target host(s) 206. For instance, the virtual machine 202 may utilize processing resources of the target host(s) 206 to perform operations.

As the virtual machine 202 is operating on the target host(s) 206, the source host(s) 204 may transfer the post-copy data 210 to the target host(s) 206 over the data plane tunnel 112 within the tunnel 140. For example, the post-copy data 210 may be encrypted and transmitted over the external network(s) via a secure tunneling protocol associated with the tunnel 140. In some cases, the tunnel 140 may be a VPN tunnel. Accordingly, the post-copy data 210 may be post-copied to the target host(s) 206.

In some cases, the post-copy data 210 may be modified on the source host(s) 204 while the post-copy data 210 is being transferred to the target host(s) 206. For instance, the virtual machine 202 may receive a write request to modify the post-copy data 210 during the post-copy process. The modifications to the post-copy data during the pre-copy process may also be referred to as "interim changes." According to various implementations, a resource manager of the target host(s) 204 may track any changes to the post-copy data 210 during the post-copy process. Once the initial version of the post-copy data 210 has been transferred to the target host(s) 206, additional data indicating to the interim changes may be transferred to the target host(s) 206. Accordingly, the target host(s) 206 may have an up-to-date version of the post-copy data 210 at the conclusion of the post-copy process.

In some implementations, once the post-copy data 210 has been fully copied to the target host(s) 206, the target host(s) 206 may transmit a confirmation message indicating that the post-copy data 210 has been received by the source host(s) 204. In some cases, the target host(s) 206 may transmit a confirmation message to a network orchestrator, which may indicate that the post-copy data 210 has been received by the source host(s) 204.

FIG. 2C illustrates an example environment 216 for accessing the post-copy data 210 during the post-copy process. During the post-copy process, the virtual machine 202 may seek to access a portion of the post-copy data 210. However, the post-copy data 210 may not be available on the target host(s) 206. Accordingly, the virtual machine 202 operating in the target host(s) 206 may transmit an access request 218 for the portion of post-copy data 210 to the source host(s) 204. The access request 218 may be a read request, a write request, or the like. The access request 218 can be transmitted over a control plane tunnel in the tunnel 140, data. Accordingly, even in implementations in which the source host(s) 204 are part of an availability zone, the target host(s) 206 are part of an edge location, and the tunnel 140 only accommodates control plane signaling from an availability zone to an edge location, the access request 218 may nevertheless be transmitted using the two-way data plane portion of the tunnel 140.

If data remaining on the source host(s) 204 needs to be accessed during the post-copy process, the I/O requests may be transferred as a trigger expedited copy over the data plane. However, the I/O requests may essentially be control plane-type messages, such as control messages that are generated by a host or droplet, and not by control plane servers associated with the system.

In response to receiving the access request 218, the source host(s) 204 may transmit an access response 218 including the requested portion of post-copy data 210 to the virtual machine 202 operating in the target host(s) 206, host(s) 206. In various implementations, the access response 218 may be transmitted over the data plane portion of the tunnel 140. Because the access request 216 and the access response 218 are transferred over the tunnel 140, the access request 216 and the access response 218 may be encoded and transmitted over the external network(s) via the secure tunneling protocol associated with the tunnel 140.

In some cases, the tunnel 140 may include a limited amount of network resources, which can be expended by the pre-copy data 208 during the pre-copy process; and the post-copy data 210, the access request 216, and the access response 218 during the post-copy process. Accordingly, the post-copy process may utilize a greater amount of network resources of the tunnel 140 than the pre-copy process.

Figure 3:
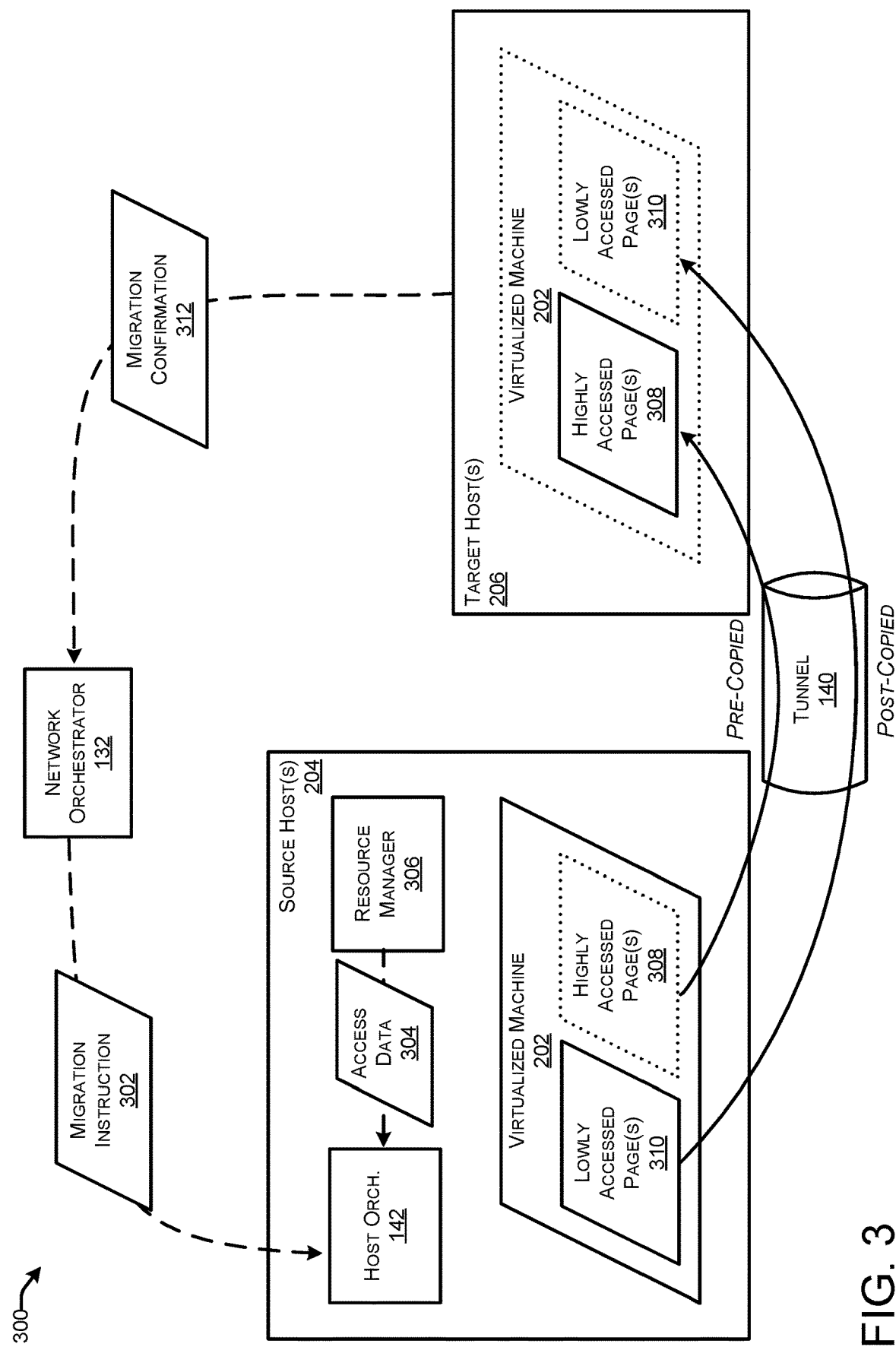
FIGS. 3 to 5 illustrate various techniques for selecting pre- and post-copy data for transfer during live migration over one or more external networks.
Figure 4:
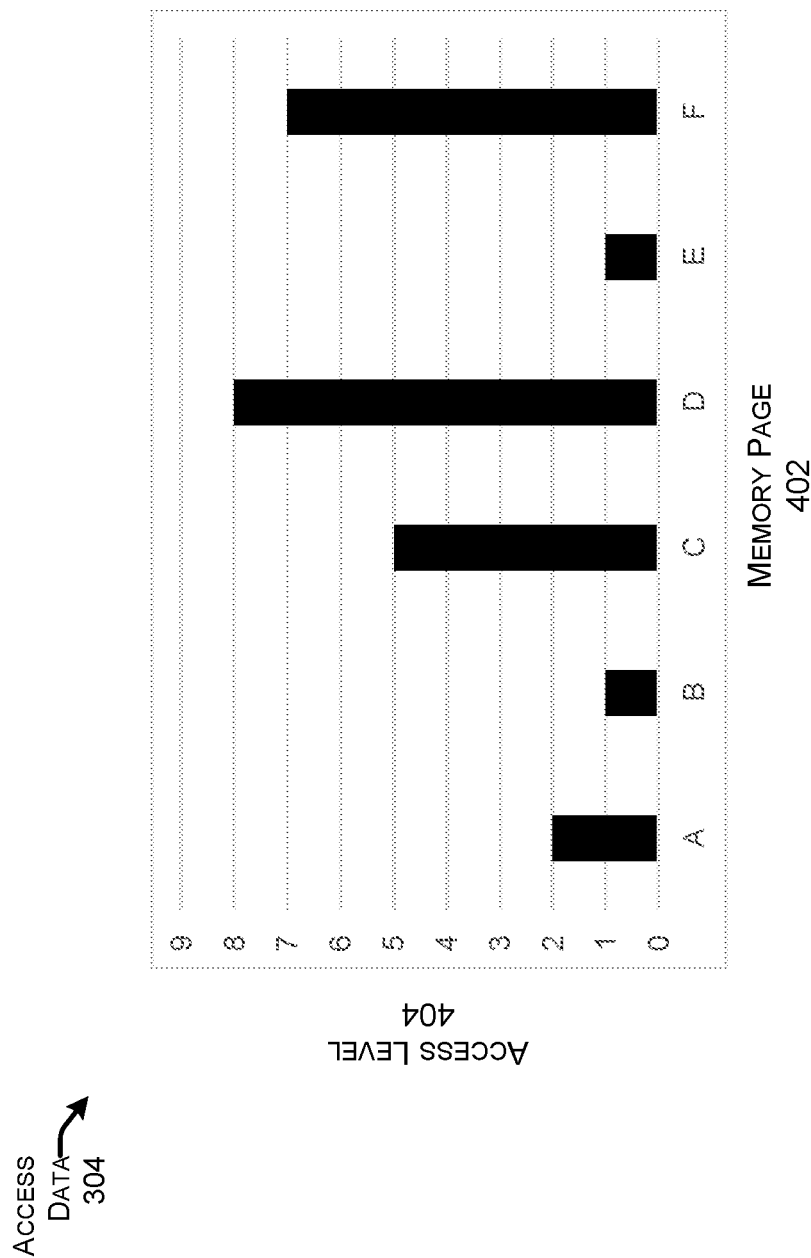
Figure 5:
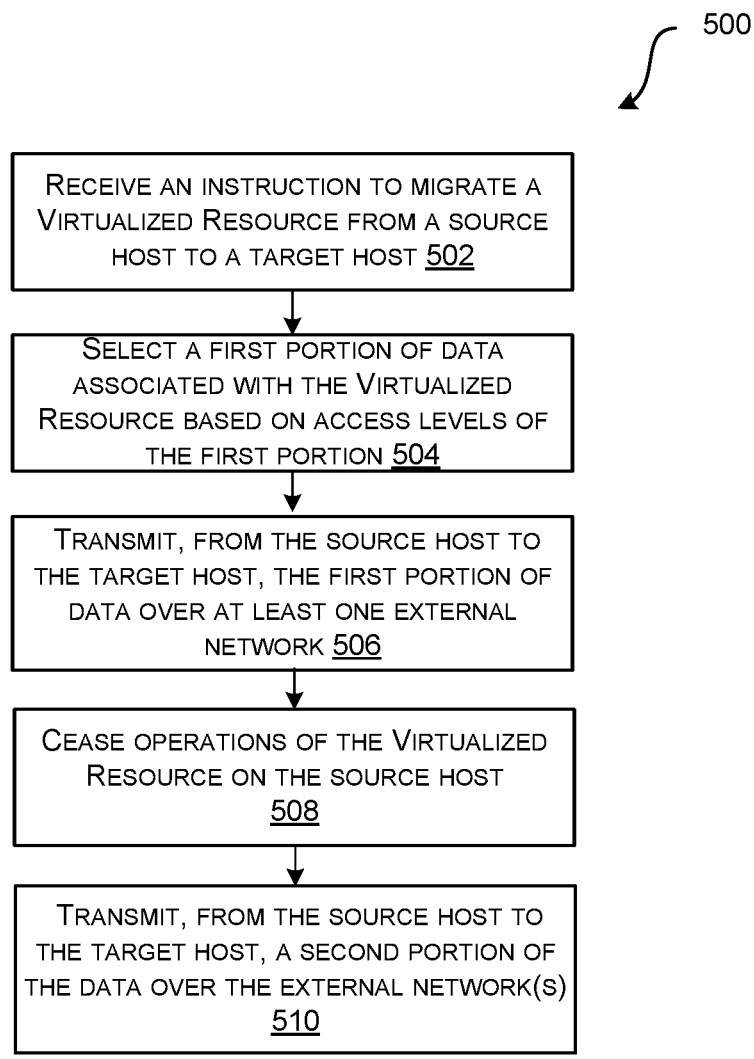

FIGS. 3 to 5 illustrate various techniques for selecting pre- and post-copy data for transfer during live migration over one or more external networks. In FIGS. 3 to 5, at least some of the solid arrows may represent the transfer of data plane traffic, and the dashed arrow may represent the transfer of control plane traffic and/or control-type traffic (e.g., signaling generated by a host that can be transferred over a secure tunnel, in some cases).

FIG. 3 illustrates an example environment 300 for allocating virtualized resource data into pre-copy data and post-copy data based on utilization levels of the virtualized resource data. As illustrated, FIG. 3 includes the network orchestrator 132, the tunnel 140, and the host orchestrator 142 described above with reference to FIG. 1. In addition, FIG. 3 includes the virtual machine 202, the source host(s) 204, and the target host(s) 206 described above with reference to FIGS. 2A to 2C.

As illustrated in FIG. 3, the network orchestrator 132 may transmit a migration instruction 302 to the host orchestrator 142 within the source host(s) 204. The migration instruction 302 may be a control plane message instructing the host orchestrator 142 and/or the source host(s) 204 to migrate the virtual machine 202 from the source host(s) 204 to the target host(s) 206 via the tunnel 140. In some cases, the migration instruction 302 may include a key (e.g., an RSA key) by which the source host(s) 204 can encode data (e.g., data associated with the virtual machine 202) for transfer over the tunnel 140. Although not illustrated in FIG. 3, in some implementations, the network orchestrator 132 may also transmit the key to the target host(s) 206, which may enable the target host(s) 206 to decode the data transmitted from the source host(s) 204. For instance, the network orchestrator 132 may receive, from a user device associated with the virtual machine 202, a request to migrate the virtual machine 202 from a data center comprising the source host(s) 204 to a data center comprising the target host(s) 204. According to some examples, the network orchestrator 132 may identify that a load of virtualized resources on the source host(s) 204 may be greater than a load of virtualized resources on the target host(s) 206 (e.g., according to a local datastore that the network orchestrator 132 utilizes to track virtualized resources and/or computing resources throughout the environment 300), and may therefore determine to migrate the virtual machine 202 in order to balance the virtualized resource load of the source host(s) 204 with the virtualized resource load of the target host(s) 206. In some cases, the migration instruction 302 may include an identifier of the target host(s) 206 and/or a slot within resources of the target host(s) 206 that is reserved for the virtual machine 202.

According to some implementations, the migration instruction 302 may specify a maximum threshold amount of data associated with the virtual machine 202 that is able to be pre-copied to the target host(s) 206 over the secure tunnel, and/or a maximum threshold amount of time that data can be pre-copied to the target host(s) 206. For instance, the maximum threshold amount of data can be one MB, one GB, ten GB, or some other amount of data. In some cases, the maximum threshold amount of time can refer to predetermined time period in which the network orchestrator 132 has scheduled transmission of pre-copy data associated with the virtual machine 202. The network orchestrator 132 may determine the maximum data threshold and/or the maximum time threshold according to network conditions of the tunnel 140. For instance, if the tunnel 140 is relatively congested, the maximum data threshold may be relatively low (e.g., 1 MB), whereas if the tunnel 140 is relatively uncongested, the maximum data threshold may be relatively high (e.g., 1 GB). According to some examples, if the tunnel 140 is relatively congested, the maximum time threshold may be relatively long (e.g., one minute), whereas if the tunnel 140 is relatively uncongested, the maximum time threshold may be relatively short (e.g., one second). Further, in addition to or alternatively to the available bandwidth of the tunnel 140, an amount of time or latency introduced by traversing the tunnel 140 can be a factor in determining a maximum threshold that still allows for uninterrupted access to the virtual machine, from the perspective of the end user. In some cases, the maximum data threshold or the maximum time threshold may be referred to as a "pre-copy threshold."

In some embodiments, the network orchestrator 132 may set the threshold amount of pre-copy data. For a slower network (e.g., higher latency, reduced throughput, reduced network bandwidth, etc.), longer pre-copy times may be tolerated. The bandwidth limitations of the network may be based on a corresponding congestion level, but a maximum pre-copy duration may be set. In some embodiments, EBS-related traffic may be prioritized over pre-copy and/or post-copy data.

In some cases, the network orchestrator 132 may select the maximum threshold based on the virtual machine 202 itself. For example, if the virtual machine 202 is a type of virtualized resource that utilizes relatively few host processing resources (e.g., has lower than a threshold CPU usage during a time interval), the maximum threshold may be relatively low (e.g., 1 MB), whereas if the virtual machine 202 is the type of virtualized resource that utilizes a relatively high amount of processing resources, the maximum threshold may be relatively high (e.g., 1 GB). In some cases, the host orchestrator 142 may identify the maximum threshold amount according to the type of the virtual machine 202.

Upon receiving the migration instruction 302, the host orchestrator 142 may proceed to select pre-copy data associated with the virtual machine 202. In various examples, the host orchestrator 142 may identify access data 304 indicating access levels of data associated with the virtual machine 202. As used herein, "accessing" data (or equivalent terminology) can refer to reading the data, writing the data, or a combination thereof. For example, the access levels may include access rates (e.g., number of times accessed over a time interval) of various memory pages within the data associated with the virtual machine 202. In some examples, the access levels may indicate how many times each memory page within the virtual machine 202 has been accessed within a predetermined time interval, such as the last hour, the last day, or some other length of time. As used herein, the terms "page," "memory page," or their equivalents, can refer to a unit of stored data. The access data 304 may be accessed from a resource manager 306 in the source host(s) 204. In some cases, the resource manager 306 may be a hypervisor configured to track and/or allocate resources within the source host(s) 204 to various virtualized resources, including the virtual machine 202. In various implementations in which the virtual machine 202 is associated with a block storage volume, a block storage client associated with the virtual machine 202 can track access requests to the block storage volume.

The host orchestrator 142 may identify, based on the access data 304, one or more highly accessed pages 308 within the data associated with the virtual machine 202. The highly accessed page(s) 308 may include one or more memory pages associated with the virtual machine 202. In some cases, a total amount of data within the highly accessed page(s) 308 may be no more than the maximum threshold. In some implementations, the highly accessed page(s) 308 may include one or more memory pages whose access amount(s) and/or rate(s) are greater than a particular threshold (e.g., accessed more than ten times within the last hour, accessed more than ten times within a time interval that is 24 hours prior to the time at which the virtual machine 202 will be migrated, or the like).

According to various implementations, the highly accessed page(s) 308 may be pre-copied to the target host 206 during live migration of the virtual machine 202. For instance, the highly accessed page(s) 308 may be transferred to the target host(s) 206 while the virtual machine 202 is operating on the source host(s) 204. The highly accessed page(s) 308 can be transferred over the tunnel 140, which may traverse one or more external networks. Once the highly accessed page(s) 308, and any other pre-copy data, are transferred to the target host(s) 206, the virtual machine 202 may begin operations on the target host(s) 206.

The data associated with the virtual machine 202 may also include one or more lowly accessed pages 310. The lowly accessed page(s) 310 may include memory pages associated with the virtual machine 202 that are excluded from the highly accessed page(s) 308. The lowly accessed page(s) 310 may be less likely to be accessed during migration than the highly accessed page(s) 308. Accordingly, the lowly accessed page(s) 310 may be post-copied to the target host(s) 206. The lowly accessed page(s) 310 may be transmitted from the source host(s) 204 to the target host(s) 206 over the tunnel 140 as the virtual machine 202 is operating on the target host(s) 206.

The target host(s) 206 may identify when the data associated with the virtual machine 202 has been fully transferred. For example, the target host(s) 206 may identify that the frequently accessed page(s) 306 and the infrequently accessed page(s) 308 have been successfully transferred to the target host(s) 206. Upon identifying that the data associated with the virtual machine 202 has been fully transferred to the target host(s) 206, the target host(s) 206 may transmit, to the network orchestrator 132, a migration confirmation 312. The migration confirmation 312 may indicate, to the network orchestrator 132, that the virtualized resource has been successfully migrated from the source host(s) 204 to the target host(s) 206. Although not illustrated in FIG. 3, in some cases, in response to receiving the migration confirmation 312, the network orchestrator 132 may instruct the source host(s) 204 to delete the virtualized resource data that remains stored on the source host(s) 204. For example, the network orchestrator 132 may cause the source host(s) 204 to delete the copies of the highly accessed page(s) 308 and/or the lowly accessed page(s) 310 that remain on the source host(s) 204. Although not illustrated in FIG. 3, in some cases, the target host(s) 206 may transmit, to the source host(s) 204, a confirmation that the virtualized resource has been successfully migrated. The confirmation sent to the source host(s) 204 may be in addition to, or alternative to, the migration confirmation 312, according to some implementations. In some cases, the source host(s) 204 may delete the virtualized resource data in response to receiving the confirmation from the target host(s) 206.

Although not illustrated in FIG. 3, in some cases, the network orchestrator 132 may be located in the same data center and/or availability zone as the source host(s) 204, or the same data center and/or availability zone as the target host(s) 206. That is, the network orchestrator 132 may be located in a different data center and/or availability zone than the target host(s) 206, or a different data center and/or availability zone than the source host(s) 204. Accordingly, at least one of the migration instruction 302 or the migration confirmation 312 may be transmitted over the tunnel 140. For instance, at least one of the migration instruction 302 or the migration confirmation 312 may be transmitted over a control plane tunnel within the tunnel 140. In some cases, one of the migration instruction 302 or the migration confirmation 312 can be transmitted over at least one internal network within a data center and/or availability zone.

FIG. 4 illustrates an example of the access data 304, which can be used to identify one or more memory pages of a virtualized resource as pre-copy data. In various examples, the access data can be generated by a resource manager of a host accommodating the virtualized resource, such as a hypervisor of the host.

In the example illustrated in FIG. 4, a virtualized resource may be associated with multiple pages 402, including pages A, B, C, D, E, and F. Further, each one of the pages 402 may be associated with a particular access level 404. For instance, page A may have an access level of 2, page B may have an access level of 1, page C may have an access level of 5, page D may have an access level of 8, page E may have an access level of 1, and page F may have an access level of 7.

The access levels 404 may be represented according to any of a variety of units. In some cases, each individual access level 404 may indicate a number of times one of the pages 402 has been accessed by the virtualized resource in a particular time period (e.g., one minute, one hour, one day, or some other time period). In some examples, each individual access level 404 may indicate a frequency that one of the pages 402 has been accessed by the virtualized resource in a particular time period (e.g., one minute, one hour, one day, or some other time period). In a variety of instances, the access levels 404 may indicate a likelihood that the pages 402 will be accessed during live migration.

At least some of the pages 402 may be selected as pre-copy data for live migration of the virtualized resource. In some implementations, one or more of the pages 402 with the highest access levels may be selected as the pre-copy data. According to particular examples, one or more of the pages 402 that have at least one access level 404 above a particular threshold may be selected as the pre-copy data. For instance, if the particular threshold is 3, pages C, D, and F may be selected as the pre-copy data, whereas pages A, B, and E may be designated as post-copy data. In some cases, the particular threshold can be identified by a network orchestrator and/or a host orchestrator.

In various examples, one or more of the pages 402 with the highest access levels that add up to less than a threshold amount of data may be selected as the pre-copy data. For instance, if each one of the pages includes one GB of data and the threshold amount of data is 2.5 GB, the two pages with the highest access levels, pages D and F, may be selected as the pre-copy data, whereas the remaining pages with the lowest access levels, pages A, B, C, and E, may be designated as post-copy data.

FIG. 5 illustrates an example process 500 for selecting pre-copy data according to access levels. In various examples, the process 500 can be performed by an entity including at least one of a source host (e.g., any of the source host(s) 204 described above with reference to FIGS. 2A to 2C and 3), a host orchestrator (e.g., the host orchestrator 142 described above with reference to FIGS. 1 and 3), or the like.

At 502, an instruction to migrate a virtualized resource from a source host to a target host may be received. The instruction may identify the virtualized resource and/or the target host. For example, the instruction may specify a unique identifier of the virtualized resource, a unique identifier of one or more resources of the source host in which the virtualized resource is occupying, or the like. In some examples, the instruction may indicate a unique identifier of the target host (e.g., an IP address of the target host). In some cases, the instruction may further specify a threshold amount of data to be pre-copied during the migration of the virtualized resource.

At 504, a first portion of data associated with the virtualized resource may be selected based on at least one access level of the data. In various implementations, the access level(s) of the data may refer to a level (e.g., a rate, an amount, etc.) that the data is read, written, or the like. The access level(s) may be provided by a resource manager (e.g., a hypervisor) of the source host, a block storage client associated with the source-host and/or the virtualized resource, or the like. In some cases, the first portion of the data can include a portion of the data with a relatively high access level. For example, the first portion can include one or more memory pages associated with the highest access levels among all memory pages associated with the virtualized resource. In some cases, an amount of the first portion can be no more than the threshold.

At 506, the first portion of the data may be transmitted from the source host to the target host over at least one external network. In various implementations, the external network(s) may include at least one public network, such as the Internet. Accordingly, the first portion of the data may be transmitted over at least one secure (data) tunnel traversing the external network(s).

At 508, operations of the virtualized resource on the source host may be ceased. In various implementations, operations of the virtualized resource may continue on the target host. That is, the virtualized resource may no longer utilize processing resources on the source host and may instead proceed to utilize processing resources of the target host.

At 510, a second portion of the data associated with the virtualized resource may be transmitted from the source host to the target host over the external network(s). The second portion of the data may include a remaining portion of the data that was not transmitted at 506. For example, the second portion of the data may include page(s) that have a relatively low utilization level, when compared to the page(s) in the first portion of the data.

Figure 6:
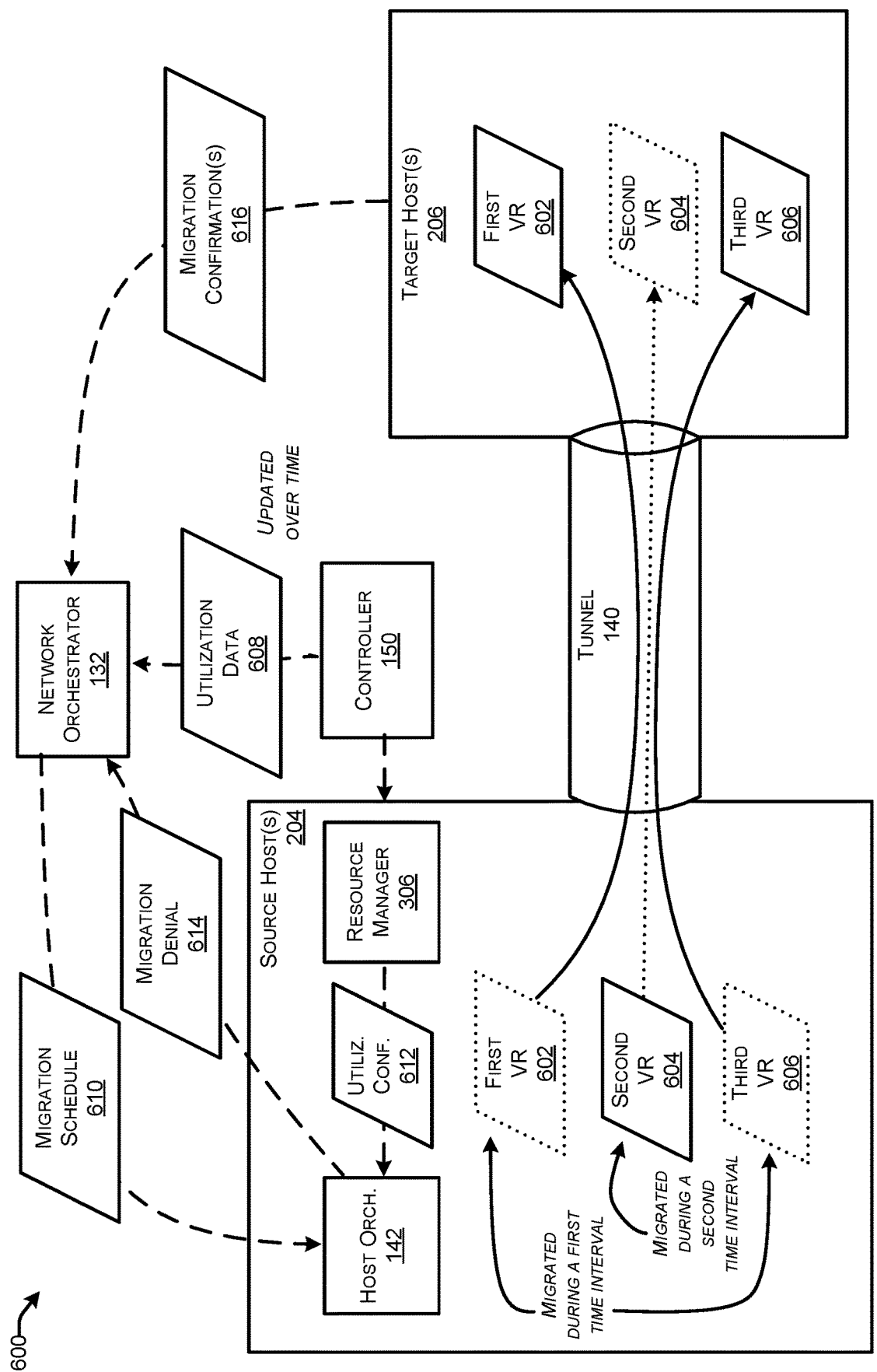

FIGS. 6 to 10 illustrate various example techniques for scheduling live migrations of virtualized resources to and/or from edge locations. FIG. 6 illustrates an example environment 600 for scheduling migrations of virtualized resources over one or more external networks. As illustrated, the environment 600 may include the network orchestrator 132, the host orchestrator 142, the tunnel 140, and the controller, which were first described above with reference to FIG. 1. In addition, the environment 600 may include the source host(s) 204 and target host(s) 206, which were first described above with reference to FIGS. 2A to 2C. Further, the environment 600 may include the resource manager 306, which was first described above with reference to FIG. 3.

In various implementations, the controller 150 may identify utilization levels of a first virtualized resource 602, a second virtualized resource 604, and a third virtualized resource 606 while they are hosted on the source host(s) 204. For example, the controller 150 may identify and/or estimate, based at least in part on control plane signaling forwarded from the controller 150 to the source host(s) 204, a number of I/O requests associated with the first virtualized resource 602, the second virtualized resource 604, the third virtualized resource 606 during a particular time interval (e.g., one minute, one hour, or some other time interval); CPU utilization levels of the first virtualized resource 602, the second virtualized resource 604, and the third virtualized resource 606, during the particular time interval; an amount of data associated with the first virtualized resource 602, the second virtualized resource 604, and the third virtualized resource 606; or the like. In some cases, the controller 150 may receive reports from the resource manager 306 corresponding to the utilization levels. The controller 150 may transmit, to the network orchestrator 132, utilization data 608 indicating the utilization levels of the first virtualized resource 602, the second virtualized resource 604, and the third virtualized resource 606. In some cases, the utilization of the first virtualized resource 602, the second virtualized resource 604, and the third virtualized resource 606 may change over time. Accordingly, the controller 150 may transmit updated utilization data 608 multiple times. For instance, the controller 150 may transmit updated utilization data 608 periodically (e.g., once every hour, once every day, or some other frequency).

The network orchestrator 132 may use the utilization data 608 to identify utilization trends of the first virtualized resource 602, the second virtualized resource 604, and the third virtualized resource 606. For example, the network orchestrator 132 may identify, based on the utilization data 608, that the first virtualized resource 602 has historically experienced a relatively low utilization level at a first time-of-day (e.g., during a first time interval that recurs over a 24-hour period of time) and has historically experienced a relatively high utilization at a second time-of-day and a third time-of-day. In some instances, the network orchestrator 132 may identify, based on the utilization data 608, that the second virtualized resource 604 has historically experienced a relatively high utilization level at the first time-of-day and the third time-of-day and has historically experienced a relatively low utilization level at the second time-of-day. The network orchestrator 132 may further identify, based on the utilization data 608, that the third virtualized resource 606 has historically experienced relatively low utilization levels at the first time-of-day and the third time-of-day, and has experienced a relatively high utilization level at the second time-of-day.

The network orchestrator 132 may generate a migration schedule 610 based on the utilization data 608. In some examples, the network orchestrator 132 may schedule migrations for virtualized resources at times when they are expected to have relatively low utilization levels. For instance, the network orchestrator 132 may schedule the migration of the first virtualized resource 602 during the first time-of-day (when the first virtualized resource 602 has previously had a relatively low utilization level), may schedule the migration of the second virtualized resource 604 during the second time-of-day (e.g., when the second virtualized resource 604 has previously had a relatively low utilization level), and may schedule the migration of the third virtualized resource 606 during the first time-of-day and/or the third time-of-day (e.g., when the third virtualized resource 606 has previously had relatively low utilization levels).

In some cases, the network orchestrator 132 may generate the migration schedule 610 based on network conditions of the tunnel 140, over which the first virtualized resource 602, the second virtualized resource 604, and the third virtualized resource 606 will be migrated. According to various implementations, the tunnel 140 may have a limited bandwidth. For example, a portion (e.g., a data plane tunnel) of the tunnel 140 reserved for virtualized resource migrations may only be able to transfer a predetermined amount of virtualized resource data (e.g., one MB per second, 1 GB per second, or some other data transfer rate) from the source host(s) 204 to the target host(s) 206 at a given time. The network orchestrator 132 may schedule various transmissions (e.g., virtualized resource migrations, etc.) over the tunnel 140, and may therefore track the amount of data scheduled for transfer over the portion of the tunnel 140 reserved for virtualized resource migrations as well as an available capacity for the transfer of data over the portion of the tunnel 140 reserved for virtualized resource migrations in a given time interval.

In some implementations, the network orchestrator 132 may estimate the available capacity over the portion of the tunnel 140 by performing a ping operation. In the ping operation, the network orchestrator 132 may transmit an echo request message from the primary availability zone to a target host in an edge location over the tunnel 140. The target host may, in response, transmit an echo response message from the edge location to the network orchestrator 132 in the primary availability zone over the tunnel 140. Based at least on a time at which the echo request message is transmitted and a time at which the echo response message is received (e.g., a round-trip-time of the echo request and the echo response, an end-to-end delay of the echo-request and the echo response, or the like), the network orchestrator 132 may be able to identify a latency of the tunnel 140. Alternatively, or in addition to the ping operations, the network orchestrator 132 may identify the latency of the tunnel 140 by benchmarking transfers of virtualized resource data through the tunnel 140. For example, the network orchestrator 132 may instruct a source host and/or a target host to notify the network orchestrator 132 when a specific amount of virtualized resource data (e.g., 1 GB) is initially transmitted by the source host and/or received by the target host. The network orchestrator 132 may identify the latency (e.g., time-dependent throughput) of the tunnel 140 based on the times at which the specific amount of virtualized resource data is transmitted and/or received.

Based on the latency of the tunnel 140, the network orchestrator 132 may be able to identify whether the tunnel 140 is congested or whether the tunnel 140 has available capacity for additional virtualized resource migrations. For instance, if the latency of the tunnel 140 at a particular time is less than a predetermined threshold latency (e.g., one millisecond, one second, or some other amount of time), the network orchestrator 132 may determine to schedule an additional virtualized resource migration during the particular time.

In some examples, the network orchestrator 132 may schedule migrations of the first virtualized resource 602, the second virtualized resource 604, and the third virtualized resource 606 based at least in part on the network conditions (e.g., available transmission capacity, latency, or the like) of the tunnel 140. For example, the network orchestrator 132 may schedule the migration of the first virtualized resource 602 during the first time interval, because that may be the only time interval at which the utilization level of the first virtualized resource 602 is expected to be relatively low. The third virtualized resource 606 may have a low utilization level during the first time interval or the third time interval. If, based on the network conditions of the tunnel 140, the network orchestrator 132 determines that there is a sufficient available capacity to migrate both the first virtualized resource 602 and the third virtualized resource 606 simultaneously during the first time interval, the network orchestrator 132 may schedule migrations of the first virtualized resource 602 and the third virtualized resource 606 during the first time interval.

In some implementations, the network orchestrator 132 may further schedule migrations of the first virtualized resource 602, the second virtualized resource 604, and the third virtualized resource 606 based on one or more conditions of the target host(s) 206. In some cases, each one of the target host(s) 206 may be able to receive no more than a threshold number (e.g., 1, 2, or some other number) of virtualized resource migrations at a particular time. The threshold number of virtualized resource migrations may be based at least in part on computing resources of the target host 206. Accordingly, the network orchestrator 132 may ensure that the migration schedule 610 does not indicate that more than the threshold number of virtualized resource migrations are scheduled for any of the target host(s) 206. For instance, if the network orchestrator 132 selects the same target host 206 to accommodate the first virtualized resource 602 and the third virtualized resource 606, the network orchestrator 132 may refrain from scheduling simultaneous migrations of the first virtualized resource 602 and the third virtualized resource 606, provided that the target host 206 may only receive a single migrated virtualized resource at one time.

In various examples, the network orchestrator 132 may schedule the migrations of the first virtualized resource 602, the second virtualized resource 604, and the third virtualized resource 606 based according to virtualized resource type. In various implementations, the network orchestrator 132 may schedule migrations of a first type of virtualized resources before migrations of a second type of virtualized resources. In some cases, the network orchestrator 132 may schedule the migration of virtualized resources that utilize and/or are reserved a greater amount of resources (e.g., processing resources) than virtualized resources that utilize and/or are reserved a smaller amount of resources. Accordingly, the network orchestrator 132 may prioritize the migrations of virtualized resources that are most likely to benefit from migration to a target data center. For example, the third virtualized resource 606 may be of a first type that utilizes a relatively large amount of processing resources and/or memory resources of the source host(s) 204, whereas the second virtualized resource 604 may be of a second type that utilizes a relatively small amount of processing resources and/or memory resources of the source host(s) 204. The network orchestrator 132 may schedule the migration of the third virtualized resource 606 prior to the migration of the second virtualized resource 604, because the third virtualized resource 606 may be more likely to utilize the advantageous resources (e.g., resources that provide lower latency communications, greater available capacity, or the like) of the target host(s) 206 than the second virtualized resource 604 as the virtualized resources are migrated to the target host(s) 206.

The network orchestrator 132 may transmit the migration schedule 610 to the host orchestrator 142. Although not illustrated in FIG. 6, in some cases, the network orchestrator 132 may transmit a portion of the migration schedule 610 corresponding to the first virtualized resource 602 to the host orchestrator 142 associated with a source host 204 that is accommodating the first virtualized resource 602, may transmit a portion of the migration schedule 610 corresponding to the second virtualized resource 604 to the host orchestrator 142 on the source host that is on the source host accommodating the second virtualized resource 604, and may transmit a portion of the migration schedule 610 corresponding to the third virtualized resource 606 to the host orchestrator 142 on the source host that is accommodating the third virtualized resource 606. The first virtualized resource 602, the second virtualized resource 604, and the third virtualized resource 604 are not necessarily accommodated on the same source hosts. However, for the sake of simplicity, this description presumes that the first virtualized resource 602, the second virtualized resource 604, and the third virtualized resource 604 are being migrated from the same source host(s) 204 to the same target host(s) 206.

In response to receiving the migration schedule 610, the host orchestrator 142 may determine whether to confirm the migration schedule 610. In some cases, by the time the utilization data 602 is generated and the migration schedule 608 is transmitted, the utilization levels of the first virtualized resource 602, the second virtualized resource 604, and the third virtualized resource 606 may have changed. For instance, the utilization data 608 may be indirectly estimated by the controller 150 due to control plane signaling between the controller 150 and the source host(s) 204, and may not reflect real-time utilization of the virtualized resources 602, 604, and 606. The resource manager 306 may nevertheless identify up-to-date utilization levels of the first virtualized resource 602, the second virtualized resource 604, and the third virtualized resource 606. Accordingly, the resource manager 306 may provide a utilization confirmation 612 to the host orchestrator 142, which may identify up-to-date utilization levels of the first virtualized resource 604 and the second virtualized resource 606.

In some cases, the migration schedule 608 may be inconsistent with the up-to-date utilization levels provided in the utilization confirmation 612. For instance, the network orchestrator 132 may predict that the first virtualized resource 602 has a relatively low utilization level during the first time period, and may schedule the migration of the first virtualized resource 602 during the first time period, but the utilization confirmation 612 may indicate that the first virtualized resource 602 actually has a relatively high utilization level (e.g., a CPU spike) during the first time period. Thus, migration of the first virtualized resource 602 during the first time period may be unsuitable.

If the host orchestrator 142 determines that the migration schedule 610 is inconsistent with the utilization confirmation 612, the host orchestrator 142 may transmit a migration denial 614 to the network orchestrator 132. The migration denial 612 may indicate, to the network orchestrator 132, that the initial schedule indicated in the migration schedule 610 was not accepted by the host orchestrator 142. The migration denial 614 may specify which virtualized resource migration needs to be rescheduled. For instance, if the schedule for the migration of the first virtualized resource 602 was unacceptable, the migration denial 614 may indicate that the migration of the first virtualized resource 602 should be rescheduled. Upon receiving the migration denial 614, the network orchestrator 132 may reschedule at least one of the migrations of the first virtualized resource 602, the second virtualized resource 604, or the third virtualized resource 606. The network orchestrator 132 may indicate the rescheduled migration(s) in a subsequent migration schedule 610, which may be transmitted to the host orchestrator 142.

In some implementations, the host orchestrator 142 may confirm that the migration schedule 610 is acceptable, based at least in part on the utilization confirmation 612. Although not illustrated in FIG. 6, the host orchestrator 142 may transmit a confirmation message to the network orchestrator 132 that indicates the migration schedule 610 was accepted. The host orchestrator 142 may migrate the first virtualized resource 602, the second virtualized resource 604, and the third virtualized resource 606 according to the migration schedule 610. For instance, if the migration schedule 610 indicates that the first virtualized resource 602 and the third virtualized resource 606 are to be migrated over the tunnel 140 during the first time interval, the host orchestrator 142 may migrate the first virtualized resource 602 and the third virtualized resource 606 over the tunnel 140 during the first time interval. If the migration schedule 610 indicates that the second virtualized resource 604 is to be migrated over the tunnel 140 during the second time interval, the host orchestrator 142 may migrate the second virtualized resource 604 over the tunnel 140 during the second time interval.

Upon identifying that any one of the first virtualized resource 602, the second virtualized resource 604, or the third virtualized resource 606 has been successfully migrated, the target host(s) 206 may transmit at least one migration confirmation 616 to the host orchestrator 132. In some cases, the target host(s) 206 may generate and transmit one migration confirmation 616 for each successfully migrated virtualized resource. The migration confirmation(s) 616 may indicate, to the network orchestrator 132, that the virtualized resource(s) (e.g., at least one of the first virtualized resource 602, the second virtualized resource 604, or the third virtualized resource 606) have been successfully migrated from the source host(s) 204 to the target host(s) 206. Although not illustrated in FIG. 6, in some cases, in response to receiving the migration confirmation(s) 616, the network orchestrator 132 may instruct the source host(s) 204 to delete the virtualized resource data that remains stored on the source host(s) 204.

In some cases, the network orchestrator 132 may be located in the same data center and/or availability zone as the source host(s) 204, or the same data center and/or availability zone as the target host(s) 206. That is, the network orchestrator 132 may be located in a different data center and/or availability zone than the target host(s) 206, or a different data center and/or availability zone than the source host(s) 204. Accordingly, at least one of the utilization data 608, the migration schedule 610, the migration denial 614, or the migration confirmation(s) 616 may be transmitted over the tunnel 140 (e.g., over a portion of the tunnel 140 reserved for control plane signaling). In some cases, at least one of the utilization data 608, the migration schedule 610, the migration denial 614, or the migration confirmation(s) 616 can be transmitted over at least one internal network within a data center and/or availability zone.

Figure 7A:
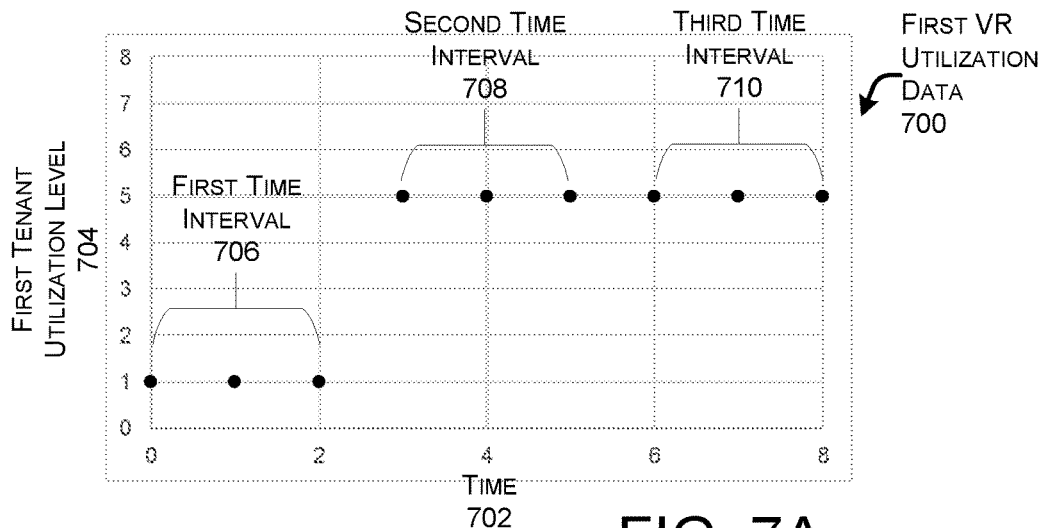
FIGS. 7A to 7C illustrate examples of utilization data of various virtualized resources, which may be used to schedule migrations of the virtualized resources over one or more external networks.
Figure 7B:
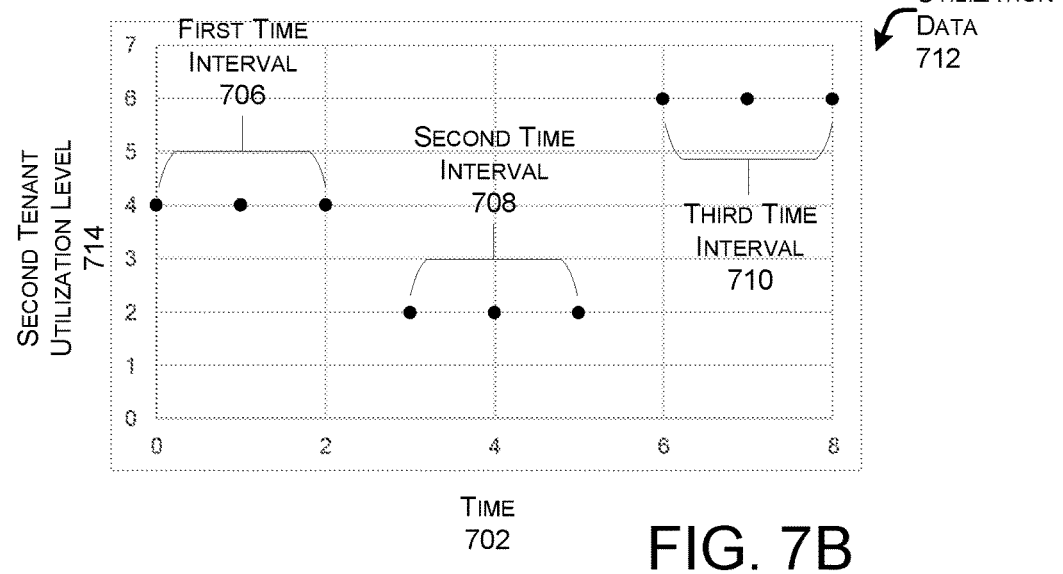
Figure 7C:
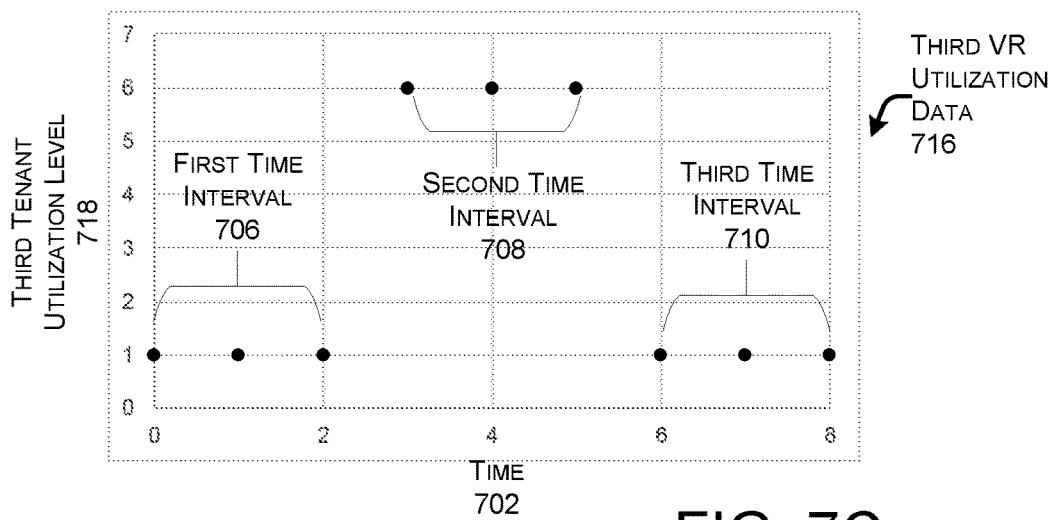

FIGS. 7A to 7C illustrate examples of utilization data of various virtualized resources, which may be used to schedule migrations of the virtualized resources over one or more external networks. In some implementations, FIGS. 7A to 7C depict examples of the utilization data 608 described above with reference to FIG. 6.

FIG. 7A illustrates an example of utilization data 700 of a first virtualized resource (e.g., the first virtualized resource 602 described above with reference to FIG. 6). As illustrated, the utilization data 700 can vary over time 702. According to some implementations, the time 702 axis can represent a previous or historical time interval. For example, the time 702 axis can represent hours during a periodic time-frame, such as a time-of-day within the 24-hour clock. In particular, the utilization levels 704 of the first virtualized resource may vary over time. The utilization levels 704 may represent an amount of utilization by the first virtualized resource of its source host(s). For instance, the utilization levels 704 may represent a CPU utilization of the first virtualized resource over time (e.g., a percentage of CPU resources of the host that were utilized by the first virtualized resource over time). As illustrated, the first virtualized resource may have a relatively low utilization level (e.g., 1) during a first time interval 706 that includes times 0-2, but may have a relatively high utilization level (e.g., 5) during a second time interval 708 that includes times 3-5 and a relatively high utilization level (e.g., 5) during a third time interval 710 that includes times 6-8.

FIG. 7B illustrates an example of utilization data 712 of a second virtualized resource (e.g., the second virtualized resource 604 described above with reference to FIG. 6). As illustrated, the utilization data 712 can vary over time 702. According to some implementations, the time 702 axis can represent a previous or historical time interval. For example, the time 702 axis can represent hours during a periodic time-frame, such as a time-of-day within the 24-hour clock. In particular, utilization levels 712 of the second virtualized resource may vary over time. The utilization levels 712 may represent an amount of utilization by the second virtualized resource of its source host(s). For instance, the utilization levels 712 may represent a CPU utilization of the second virtualized resource over time (e.g., a percentage of CPU resources of the host that were utilized by the second virtualized resource over time). As illustrated, the second virtualized resource may have a relatively high utilization level (e.g., 4) during the first time interval 706 that includes times 0-2, may have a relatively low utilization level (e.g., 2) during the second time interval 708 that includes times 3-5, and a relatively high utilization level (e.g., 6) during the third time interval 710 that includes times 6-8.

FIG. 7C illustrates an example of utilization data 716 of a third virtualized resource (e.g., the third virtualized resource 606 described above with reference to FIG. 6). As illustrated, the utilization data 716 can vary over time 702. According to some implementations, the time 702 axis can represent a previous or historical time interval. For example, the time 702 axis can represent hours during a periodic time-frame, such as a time-of-day within the 24-hour clock. In particular, utilization levels 718 of the third virtualized resource may vary over time. The utilization levels 718 may represent an amount of utilization by the third virtualized resource of its source host(s). For instance, the utilization levels 718 may represent a CPU utilization of the second virtualized resource over time (e.g., a percentage of CPU resources of the host that were utilized by the second virtualized resource over time). As illustrated, the third virtualized resource may have a relatively low utilization level (e.g., 1) during the first time interval 706 that includes times 0-2, may have a relatively high utilization level (e.g., 6) during the second time interval 708 that includes times 3-5, and a relatively low utilization level (e.g., 1) during the third time interval 710 that includes times 6-8.

In various implementations, the utilization data 700, 712, and 716 can be used to schedule the migrations of the first, second, and third virtualized resources during time intervals that will minimize disruptions to operations of the first, second, and third virtualized resources as much as possible. For example, because the utilization data 700 indicates that the first virtualized resource has a low utilization level during the first time interval 706, the migration of the first virtualized resource may be scheduled during a time interval that is equivalent to the first time interval 706 (e.g., scheduled during the same time-of-day as the first time interval 706). Because the utilization data 712 indicates that the second virtualized resource has a low utilization level during the second time interval 708, the migration of the second virtualized resource may be scheduled during a time interval that is equivalent to the second time interval 708 (e.g., scheduled during the same time-of-day as the second time interval 708). Because the utilization data 716 indicates that the third virtualized resource has a low utilization level during the first time interval 706 and the third time interval 710, the migration of the third virtualized resource may be scheduled during a time interval that is equivalent to the first time interval 706 (e.g., scheduled during the same time-of-day as the first time interval 706) and/or during a time interval that is equivalent to the third time interval 710 (e.g., scheduled during the same time-of-day as the third time interval 710). In implementations in which a secure tunnel used to transfer virtualized resource data during migrations can accommodate both the migrations of first virtualized resource and the third virtualized resource simultaneously, the migrations of the first virtualized resource and the third virtualized resource can be scheduled for the same time interval equivalent to the first time interval 706. However, if the secure tunnel cannot accommodate both the migrations of the first virtualized resource and the third virtualized resource simultaneously, the migration of the first virtualized resource may be scheduled during the time interval equivalent to the first time interval 706, and the migration of the third virtualized resource may be scheduled during the time interval equivalent to the third time interval 710.

Figure 8:
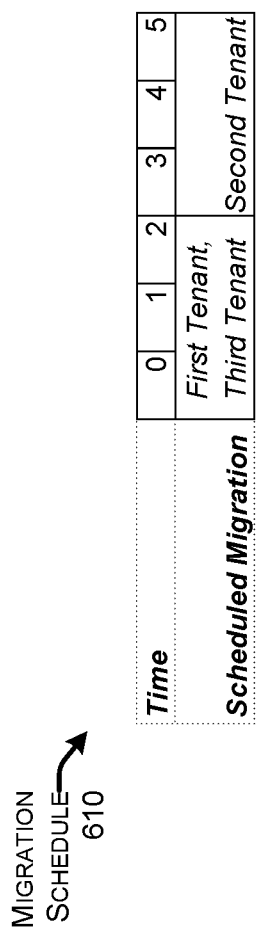

FIG. 8 illustrates an example of the migration schedule 610 based on utilization trends of various virtualized resources. For example, as described with reference to FIGS. 6 to 7C above, the first virtualized resource and the third virtualized resource may be scheduled for migration during the first time interval 706, whereas the second virtualized resource may be scheduled for migration during the second time interval 708. Accordingly, the virtualized resources can be migrated according to a schedule that minimizes impacts of the migrations on the virtualized resources. Further, the migrations can be scheduled in order to efficiently utilize network resources (e.g., network resources of the tunnel, e.g., tunnel 104, over which the virtualized resources are migrated).

Figure 9A:
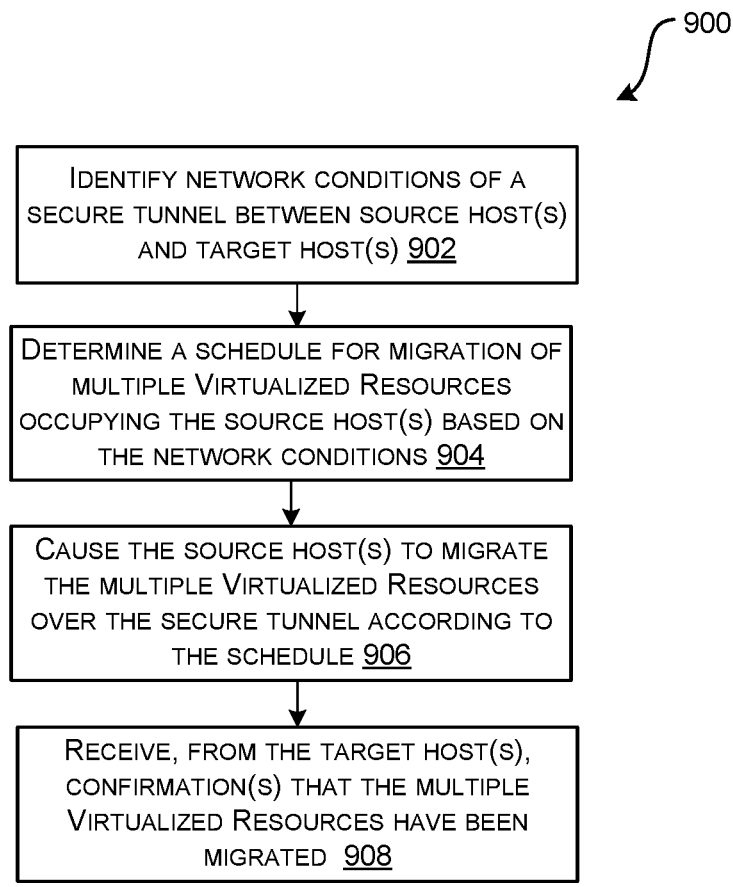
FIGS. 9A and 9B illustrate example processes for scheduling migrations of virtualized resources over a secure tunnel traversing one or more external networks.
Figure 9B:
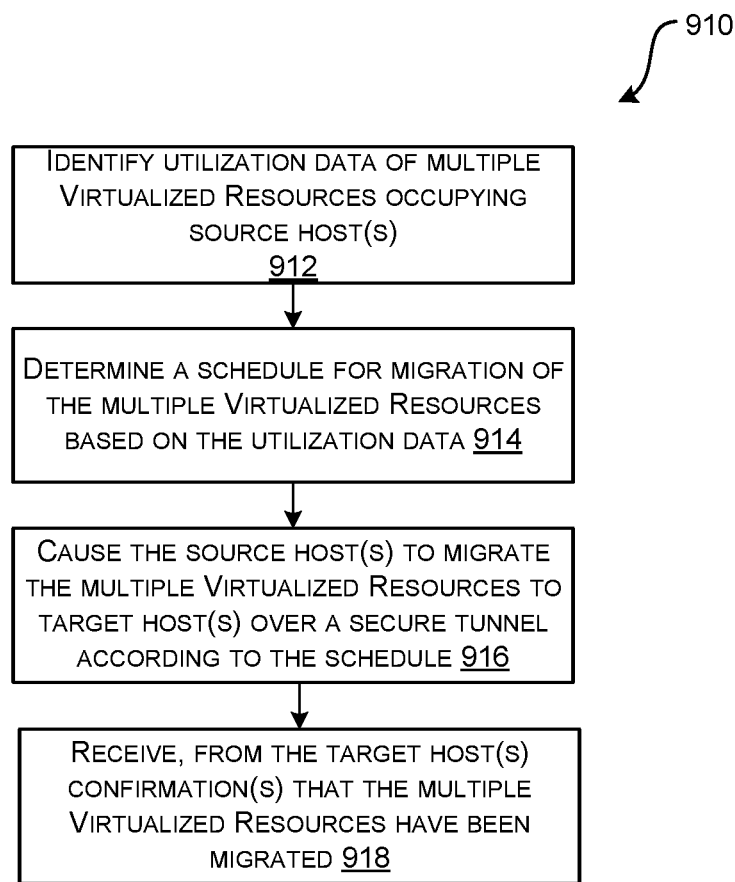

FIGS. 9A and 9B illustrate example processes for scheduling migrations of virtualized resources over a secure tunnel traversing one or more external networks. FIG. 9A illustrates an example process 900 for scheduling migrations of virtualized resources based on network conditions of the secure tunnel. In various implementations, the process 900 may be performed by a network orchestrator (e.g., the network orchestrator 132 first described above with reference to FIG. 1).

At 902, network conditions of a secure tunnel between one or more source hosts and one or more target hosts may be identified. In various implementations, the network conditions can be derived according to previously scheduled virtualized resource migrations over the secure tunnel. In some cases, ping messages (e.g., echo requests and/or echo responses) can be transmitted over the secure tunnel, in order to derive the network conditions.

At 904, a schedule for migration of multiple virtualized resources occupying the source host(s) may be determined based on the network conditions. In various implementations, if the network conditions indicate that the secure tunnel is relatively congested at a particular time, additional virtualized resource migrations may not be scheduled at the particular time. However, if the network conditions indicate that the secure tunnel is relatively uncongested at a particular time, additional virtualized resource migrations may be scheduled at the particular time.

At 906, the process 900 includes causing the source host(s) to migrate the virtualized resources over the secure tunnel according to the schedule. In various implementations, an instruction may be transmitted to the source host(s). The instruction may specify the schedule for the migrations. In response to receiving the instruction, the source host(s) may transmit data associated with the virtualized resources over the secure tunnel according to the schedule. As a result, the virtualized resources may be migrated to the target host(s).

At 908, at least one confirmation that the multiple virtualized resources have been migrated may be received. The confirmation(s) may be received from the target host(s).

FIG. 9B illustrates an example process 910 for scheduling migrations of virtualized resources based on utilization trends of the virtualized resources. In various implementations, the process 910 may be performed by a network orchestrator (e.g., the network orchestrator 132 first described above with reference to FIG. 1).

At 912, utilization data of multiple virtualized resources occupying one or more source hosts may be identified. The utilization data may include various utilization levels of the multiple virtualized resources over time. In some cases, the utilization data may indicate utilization trends of the multiple virtualized resources over various times-of-day.

At 914, a schedule for migration of the multiple virtualized resources may be determined based on the utilization data. In various implementations, any one of the virtualized resources may be scheduled for migration during a time period in which the virtualized resource is likely to have a relatively low utilization level. The utilization level of the virtualized resource can be predicted based on the utilization trends. For instance, a virtualized resource may be scheduled for migration during a time interval corresponding to a time-of-day in which the virtualized resource has historically had a relatively low utilization level.

At 916, the process 900 includes causing the source host(s) to migrate the virtualized resources over the secure tunnel according to the schedule. In various implementations, an instruction may be transmitted to the source host(s). The instruction may specify the schedule for the migrations. In response to receiving the instruction, the source host(s) may transmit data associated with the virtualized resources over the secure tunnel according to the schedule. As a result, the virtualized resources may be migrated to the target host(s).

At 918, at least one confirmation that the multiple virtualized resources have been migrated may be received. The confirmation(s) may be received from the target host(s).

Figure 10:
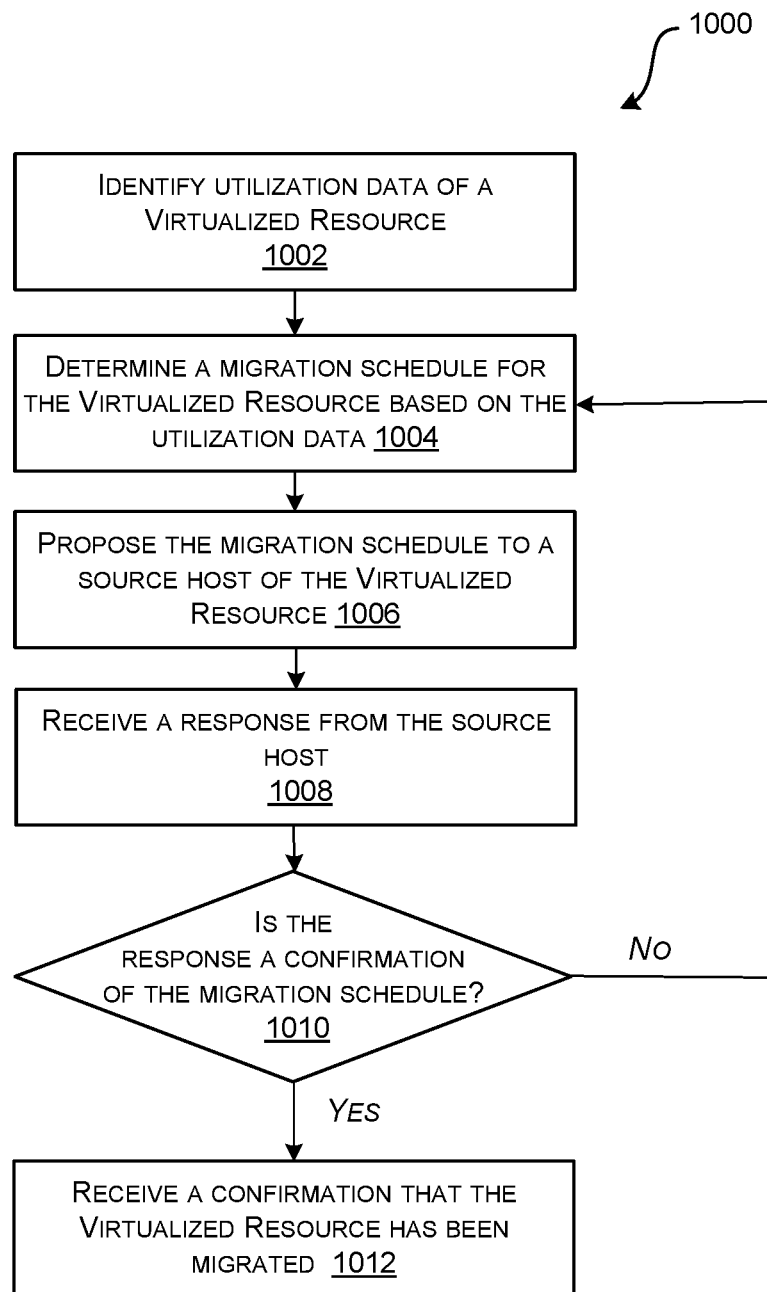

FIG. 10 illustrates an example process 1000 for scheduling a virtualized resource migration. In various implementations, the process 1000 may be performed by a network orchestrator (e.g., the network orchestrator 132 first described above with reference to FIG. 1).

At 1002, utilization data of a virtualized resource may be identified. The utilization data may indicate usage trends (e.g., trends in CPU usage, access requests, or the like) of the virtualized resource over time. In some cases, the utilization data can indicate usage levels of the virtualized resource over a periodic time period, such as a day. For instance, the utilization data can indicate historic usage of the virtualized resource at various times-of-day. The utilization data can be derived from control plane signaling associated with a source host of the virtualized resource.

At 1004, a migration schedule for the virtualized resource may be determined based on the utilization data. In various implementations, the virtualized resource may be scheduled for migration during a time at which the virtualized resource is expected to have a relatively low utilization level. For instance, the virtualized resource may be scheduled for a time corresponding to a time-of-day at which the virtualized resource has historically had a low utilization level.

At 1006, the migration schedule may be proposed to a source host of the virtualized resource. In various examples, the migration schedule may be included in an instruction to migrate the virtualized resource to a target host. The migration schedule may indicate a proposed time interval for migration of the virtualized resource At 1008, a response may be received from the source host. The response may be based on the proposed migration schedule. At 1010, the process 1000 may include determining whether the response is a confirmation of the migration schedule.

If the response is determined to be a rejection of the migration schedule at 1010, the process 1000 may return to 1004. For instance, the source host may confirm whether the utilization level of the virtualized resource during the proposed time interval is relatively low (e.g., a value less than a utilization threshold value). In some examples, the source host may confirm the utilization level based on records maintained by a hypervisor. If the source host determines that the utilization level is relatively high (e.g., a value equal to or greater than the utilization threshold value), the source host may transmit a rejection in the response. However, if the response is determined to be a confirmation of the migration, the process 1000 may proceed to 1006. At 1006, a confirmation that the virtualized resource has been migrated may be received.

Figure 11A:
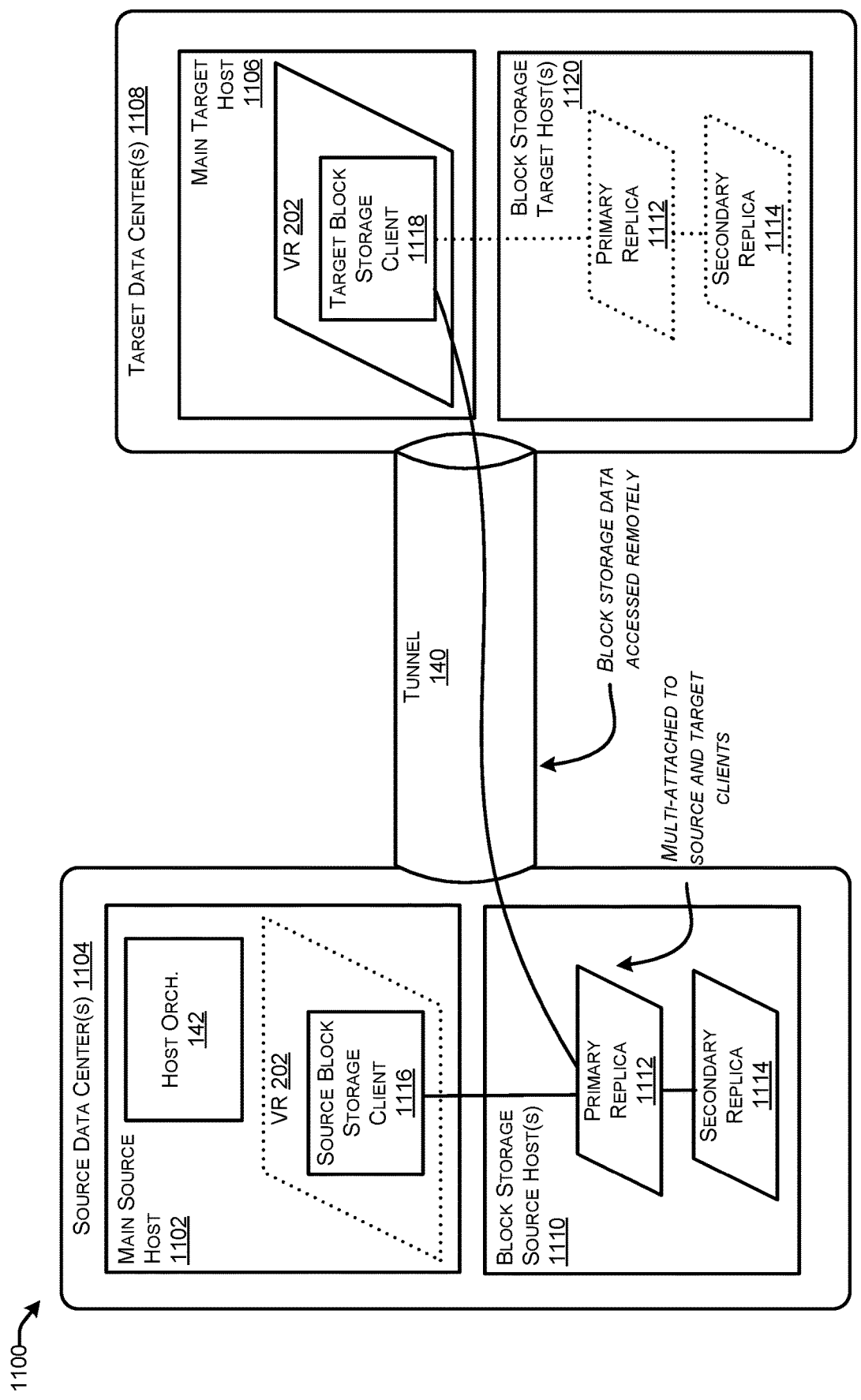
FIGS. 11A and 11B illustrate example environments for ensuring that block storage data is retained in the event that migration is interrupted.
Figure 11B:
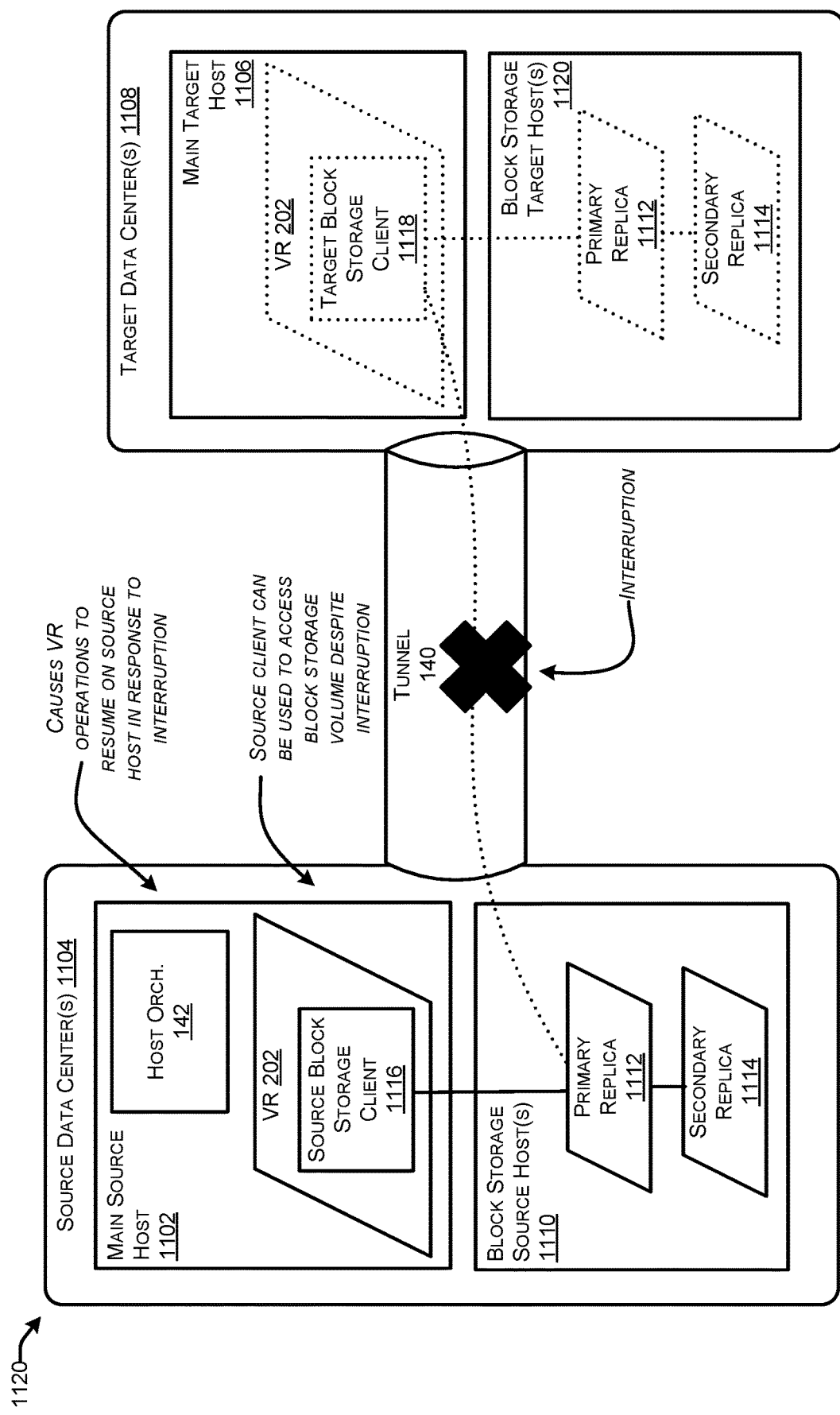

FIGS. 11A and 11B illustrate example environments for ensuring that block storage data is retained in the event that migration is interrupted. FIG. 11A illustrates an example environment 1100 in which a block storage volume is multi-attached to at least two clients, simultaneously, during live migration. The environment 1100 may include implementations of the tunnel 140 and the host orchestrator 142, which were first described above with reference to FIG. 1, as well as implementations of the virtual machine 202, which was first described above with reference to FIG. 2. Although the clients are described herein within the example context of enabling communications between a virtual machine instance and a volume, it will be appreciated that the described techniques can apply to containers as well. A container, as referred to herein, packages up code and all its dependencies so an application (also referred to as a task, pod, or cluster) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers. Accordingly, a virtual resource connected to a volume through a client can include virtual machines and/or containers.

The virtual machine 202 may be live migrated, via the tunnel 140, from a source host 1102 in a data center among one or more source data centers 1104 to a target host 1106 in a data center among one or more target data centers 1108. In various implementations, each one of the source host 1102 or the target host 1106 could be any of the first local host 112, the second local host 114, the first remote host 116, the second remote host 118, the third remote host 120, or the fourth remote host 112, which are described above with reference to FIG. 1. Further, each one of the source data center(s) 1104 or the target data center(s) 1108 could be any of the cloud provider substrate(s) 102, the first edge location 108, or the second edge location 110, which are described above with reference to FIG. 1. According to various implementations, communications between the source data center(s) 1104 and the target data center(s) 1108 may traverse the tunnel 140. In some cases, the tunnel 140 can traverse one or more external networks (e.g., the external network(s) 106 described above with reference to FIG. 1), which may include at least one public network (e.g., the Internet).

The virtual machine 202 may be associated with a block storage volume, which may include block storage data that is stored across one or more block storage source hosts 1110. For example, the block storage source host(s) 1110 may include up to sixteen individual servers that each store at least a portion of the block storage data. In various implementations, the block storage volume includes a primary replica 1112 and a secondary replica 1114. As used herein, the terms "replica" and "replica node," can refer to software and/or hardware configured to store and/or manage block storage data. In some examples, each one of the primary replica 1112 and the secondary replica 1114 can include a complete copy of the block storage data. Accordingly, if one of the primary replica 1112 or the secondary replica 1114 is destroyed and/or inaccessible, the other one of the primary replica 1112 or the secondary replica 1114 can be used to recover the block storage data.

During live migration, the virtual machine 202 may initially operate on the source host 1102 as pre-copy data associated with the virtual machine 202 is transferred to the target host 1106 (e.g., over the tunnel 140). While operations of the virtual machine 202 are performed on the source host 1102 (e.g., during the transfer of the pre-copy data), the virtual machine 202 may access the block storage data via a source block storage client 1116. The source block storage client 1116 may virtualize the block storage volume for the virtual machine 202. The block storage client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance. In some implementations, at least a subset of virtualization management tasks may be performed at one or more offloading cards so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management, input/output virtualization, instance health monitoring, and the like. In various implementations, virtual machine 202 may access the block storage data via the source block storage client 1116. For instance, the block storage client 1116 may forward access requests (e.g., I/O requests, read requests, write requests, or the like) for the block storage data from the virtual machine 202 to the primary replica 1112. Accordingly, the source block storage client 1116 enables the virtual machine 202 to access the block storage data in the primary replica 1112.

The source block storage client 1116 may be attached to the primary replica 1112. As used herein, a client and a block storage replica can be "attached" when the client can directly access (e.g., read or write) the data in the block storage replica. In various implementations, the block storage replica (e.g., a server associated with the block storage replica) may locally store, or may communicate with another network element (e.g., a network orchestrator, such as the network orchestrator 132, or controller, such as the controller 150) that locally stores, lease information indicating that the client and the block storage replica are attached. According to some implementations, the block storage replica may refrain from responding to access requests from sources (e.g., other clients) that are not identified as attached to the block storage replica in the lease information. In some cases, the client may locally store, or may communicate with another network element (e.g., a network orchestrator, such as the network orchestrator 132, or controller, such as the controller 150) that locally stores, lease information indicating that the client and the block storage replica are attached. In some cases, the client may be enabled to forward access requests to the block storage replica using the lease information. For example, the lease information that is accessible by the client may include routing information and/or security keys that enables the client to forward access requests to the attached block storage replica.

Referring back to FIG. 11A, the source block storage client 1116 may directly read the block storage data in the primary replica 1112. In some cases, the source block storage client 1116 may write and/or otherwise modify the block storage data in the primary replica 1112. The source block storage client 1116, however, may refrain from directly reading, writing, and/or otherwise modifying the block storage data in the secondary replica 1114. To ensure that the secondary replica 1114 is updated with any modifications to the primary replica 1112 (e.g., updated with any data written to the primary replica 1112 by the source block storage client 1116), any modifications to the data stored in the primary replica 1112 may be distributed to the secondary replica 1114. Accordingly, the secondary replica 1114 may store the same data as the primary replica 1112.

In some cases, the primary replica 1112 may be detached from the source block storage client 1116 and the secondary replica 1114 may be attached to the source block storage client 1116 as the new primary replica. For instance, a host accommodating the primary replica 1112 may lose power and the data in the primary replica 1112 may be inaccessible to the source block storage client 1116. When the primary replica 1112 is inaccessible, a recovery process may be initiated. During the recovery process, access requests (e.g., read requests, write requests, or the like) for the block storage data from the source block storage client 1116 may be routed to the secondary replica 1114, rather than the primary replica 1112. Thus, the secondary replica 1114 may be designated as the new primary replica. Further, to ensure that any future problems with the new primary replica do not result in loss of the block storage data, a new secondary replica may be generated in the block storage source host(s) 1110. In some cases, the new secondary replica may be generated by copying the block storage data into a new set of memory resources in the block storage source host(s) 1110. Alternatively, because the block storage data may already be stored in the decommissioned primary replica 1112, in some cases, the decommissioned primary replica 1112 may be re-designated as the new secondary replica.

Once the pre-copy data is transferred to the target host 1106 during live migration, operations of the virtual machine 202 may be ceased on the source host 1102, and the operations may resume on the target host 1106. To ensure that the virtual machine 202 can continue to access the block storage data in the primary replica 1112 while operations of the virtual machine 202 resume on the target host 1106, the pre-copy data may include data associated with a block storage client. Accordingly, a target block storage client 1118 may be established on the target host 1106, which may enable the virtual machine 202 to access the block storage data as the virtualized resource operates on the target host 1106.

After operations of the virtual machine 202 resume on the target host 1106, post-copy data associated with the virtual machine 202 may be transferred over the tunnel 140. In various implementations, the block storage data in the primary replica 1112 and the secondary replica 1114 may be at least a portion of the post-copy data transferred over the tunnel 140 after the virtualized resource operations resume on the target host 1106, or may be at least transmitted simultaneously as the virtualized resource operations are performed on the target host 1106. The block storage data in the primary replica 1112 and the secondary replica 1114 may be transferred from the block storage source host(s) 1110 to one or more block storage target hosts 1120 in the target data center(s) 1108. In some cases, the block storage data may be transferred from the block storage source host(s) 1110 to the block storage target host(s) 1120 over the tunnel 140. For instance, the host orchestrator 142 and/or a network orchestrator (e.g., the network orchestrator 132) may cause the block storage source host(s) 1110 to transfer the block storage data to the block storage target host(s) 1120 over the tunnel 140. For instance, the host orchestrator 142 and/or the network orchestrator may transmit a key to the block storage source host(s) 1110 and/or the block storage target host(s) 1120 by which data transferred over the tunnel 140 can be encoded and/or decoded. In some cases, the block storage data may be routed through the source host 1102 and/or the target host 1106 during post-copy.

Before the block storage data in the primary replica 1112 and the secondary replica 1114 is fully transferred to the block storage target host(s) 1120 in the target data center(s) 1108, the target block storage client 1118 may access the block storage data in the primary replica 1112 occupying the block storage source host(s) 1110. Thus, the target block storage client 1118 may remotely access the block storage data in the block storage source host(s) 1110 by transmitting access requests for the block storage data over the tunnel 140. In some cases, the access requests may be transmitted through the tunnel 140 at a higher priority than other transmissions (e.g., transfers of virtualized resource data) through the tunnel 140. For example, the target block storage client 1118 may transmit a read request for at least a portion of the block storage data over the tunnel 140 to the primary replica 1112 in the block storage source host(s) 1110, and the primary replica 1112 may transmit portion of the block storage data specified in the read request to the target block storage client 1118 over the tunnel 140. In some examples, the block storage client 1118 may transmit a write request to change at least a portion of the block storage data over the tunnel 140 to the primary replica 1112 in the block storage source host(s) 1110, and the primary replica 1112 may modify the portion of the block storage data in response to receiving the write request.

In various implementations, the primary replica 1112 may be attached to the source block storage client 1116 and the target block storage client 1118, simultaneously. That is, the primary replica 1112 may be "multi-attached" to the source block storage client 1116 and the target block storage client 1118. Each one of the source block storage client 1116 and the target block storage client 1118 may be configured to independently read, write, or otherwise modify the primary replica 1112.

Several mechanisms can be implemented in order to ensure that the primary replica 1112 can be multi-attached to the source block storage client 1116 and the target block storage client 1118 at the same time. In various implementations, a health check mechanism can be utilized to prevent unnecessarily designating the secondary replica 1114 as the primary replica due to the multi-attachment of the source block storage client 1116 and the target block storage client 1118.

For example, in some cases, if the target block storage client 1118 causes the secondary replica 1114 to be predesignated as a new primary replica, the source block storage client 1116 may not be attached to the new primary replica, and may not be able to access the block storage data. This may, in turn, cause the source block storage client 1116 to designate a different new primary replica (e.g., the original primary replica 1112, or some other secondary replica stored in the block storage source host(s) 1110), which may be inaccessible by the target block storage client 1118. In some embodiments, in order to avoid such unnecessary flips (e.g., re-designations) between primary and secondary replicas or a situation of continuous flipping between primary and secondary nodes, a health check application programmatic interface (API) may be implemented on the primary replica 1112 and/or the secondary replica 1114.

For example, in some embodiments, the secondary replica 1114, prior to initiating a transition to the new primary replica in response to a connect request from the target block storage client 1118, may send a request to a health check API of the primary replica 1112. If the primary replica 1112 replies with health information indicating that the primary replica 1112 is healthy, the secondary replica 1114 may refrain from initiating a transition/failover and may refrain from designating itself as the new primary replica. However, if the primary replica 1112 fails to response in a threshold amount of time or responds with health information indicating that the primary replica 1112 is unhealthy, the secondary replica 1114 may proceed with initiating a transition/failover to assume the role of the new primary replica.

In some embodiments, the primary replica 1112 may be considered "healthy" when the primary replica 1112 remains attached to at least one client (e.g., the source block storage client 1116 and/or the target block storage client 1118). In some embodiments, the primary replica 1112 may be considered "healthy" when the primary replica 1112 remains connected to a majority of clients associated with the block storage volume (e.g., a majority of a group of clients multi-attached to the primary replica 1112, which may include the source block storage client 1116 and the target block storage client 1118). In some embodiments, the primary replica 1112 may be considered "healthy" when the primary replica 1112 remains connected to a client (e.g., the source block storage client 1116 or the target block storage client 1118), among multi-attached clients, generating a greatest volume of I/O traffic (e.g. read requests and write requests). In some embodiments, other considerations may be used to determine whether the primary replica 1112 is healthy.

In some embodiments, a transition/failover may comprise a "flip" transition (e.g. the primary replica 1112 and/or the secondary replica 1114 change roles) or a failover transition (e.g. promotion of the secondary replica 1114 to the role of primary replica and appointment of a replacement secondary replica). In some embodiments, whether a "flip" transition or failover is to be performed may be determined based on a health of a current primary replica (e.g., the primary replica 1112) determined based on health check information received from a health check API of the current primary replica. Accordingly, the source block storage client 1116 and the target block storage client 1118 can initiate transition/failover.

In various examples, a peer confirmation mechanism can be used to ensure that the source block storage client 1116 and/or the target block storage client 1118 read and/or modify up-to-date versions of the block storage data stored in the primary replica 1112. According to various implementations, the primary replica 1112 and the secondary replica 1114 may each store a group key (e.g., a sequence of numbers, letters, or the like) associated with the block storage volume. Each time the primary replica 1112 and/or the secondary replica 1114 is modified, the primary replica 1112 and the secondary replica 1114 may update the group key. Furthermore, other changes (e.g., the demotion of the primary replica 1112 to a secondary replica, the promotion of the secondary replica 1114 to a primary replica, or the like) to the primary replica 1112 and/or the secondary replica 1114 may change the group key. For instance, one of the primary replica 1112 or the secondary replica 1114 may modify the group key and distribute the modified group key to the other one of the primary replica 1112 or the secondary replica 1114. When the primary replica 1112 receives an access request from the source block storage client 1116 or the target block storage client 1118, the primary replica 1112 may confirm that the group key stored by the primary replica 1112 matches the group key stored by the secondary replica 1114, prior to performing actions (e.g., reads, writes, or the like) in response to the access request. However, if the primary replica 1112 determines that the group key stored by the primary replica 1112 is different than the group key stored by the secondary replica 1114, the primary replica 1112 may refrain from responding to the access request. This key-based verification process can ensure that the primary replica 1112 does not service access requests to one of the clients 1116 or 1118 when the secondary replica 1114 has been designated as the new primary replica by the other one of the clients 1116 or 1118. Accordingly, each one of the source block storage client 1116 and the target block storage client 1118 may access the same designated primary replica, even before one of the clients 1116 or 1118 identifies that a new primary replica has been designated by the other client 1116 or 1118.

In general, once the virtual machine 202 is operating on the target host 1106, the primary replica 1112 is primarily accessed by the target block storage client 1118, rather than the source block storage client 1116. However, the source block storage client 1116 may remain configured to access the primary replica 1112 during the post-copy process. For example, the primary replica 1112 may include lease information that enables the primary replica 1112 to accept and/or respond to access requests from both the source block storage client 1116 and the target block storage client 1118, even if the primary replica 1112 may only receive access requests from the target block storage client 1118 as the virtual machine 202 is operating on the target host 1106. In some cases, the source block storage client 1116 and the target block storage client 1118 may each include lease information that enables each one of the source block storage client 1116 and the target block storage client 1118 to forward access requests to the primary replica 1112. For example, the source block storage client 1116 and the target block storage client 1118 may store routing information and/or at least one security key that enables the access requests to be received and parsed by the primary replica 1112.

FIG. 11B illustrates an example environment 1120 for rolling back migration in response to a network interruption during the post-copy process. In various implementations, the tunnel 140 may become interrupted as the post-copy data of the virtual machine 202 is transferred from the source data center(s) 1104 to the target data center(s) 1108. In some cases, the interruption may be due to an outage occurring in one or more external networks that the tunnel 140 traverses. For example, the target data center(s) 1108 may be disconnected from the Internet due to a power outage. In some instances, the interruption may be due to a Denial of Service (DoS) attack on the target data center(s) 1108.

The interruption in the tunnel 140 may prevent the virtual machine 202 from accessing the post-copy data over the tunnel 140. In particular implementations, the interruption may prevent the target block storage client 1118 from accessing the primary replica 1112 on the block storage source host(s) 1110. Accordingly, the interruption may prevent the virtual machine 202 from accessing at least some of the data associated with the virtual machine 202, which may interfere with the functionality of the virtual machine 202.

According to various implementations of the present disclosure, the migration of the virtual machine 202 can be "rolled back" in response to the interruption in the tunnel 140. In various cases, the pre- and post-copy data associated with the virtual machine 202 may remain stored on the source host 1102 and the block storage host(s) 1110 of the source data center(s) 1104 when the interruption occurs. Accordingly, the operations of the virtual machine 202 may be resumed on the source host 1102 when the tunnel 140 is interrupted.

Furthermore, the source block storage client 1116 in the source host 1102 may remain attached to the primary replica 1112. Accordingly, despite the interruption in the tunnel 140, the virtual machine 202 may still be able to access the block storage data in the primary replica 1112 using the source block storage client 1116. In some examples, if the source block storage client 1116 did not remain attached to the primary replica 1112 during the post-copy process, the interruption may have caused the virtual machine 202 to become disconnected from the primary replica 1112 as the operations of the virtual machine 202 resumed on the source host 1102. However, in various implementations of the present disclosure, due to the fact that the source block storage client 1116 remains attached to the primary replica 1112 during the post-copy process, the block storage data in the primary replica 1112 can remain accessible to the virtual machine 202 after operations of the virtualized resource are rolled back to the source host 1102.

In various cases, the host orchestrator 142 of the source host 1102 may be at least partly responsible for rolling back migration of the virtual machine 202. According to some examples, another entity within the source data center(s) 1104 may be responsible for rolling back migration of the virtualized resource. The host orchestrator 142 may identify that the tunnel is interrupted 140. For example, the host orchestrator 142 may transmit, over the tunnel 140, periodic health check requests to the target host 1106 in the target data center(s) 1108 and the target host 1106 may transmit, over the tunnel 140, health check responses to the source host 1102 in response to receiving the health check requests. If the host orchestrator 142 identifies that a threshold amount of time (e.g., one millisecond, ten milliseconds, or some other time period) after transmitting a health check request has expired without having received a corresponding health check response, the host orchestrator 142 may identify that the tunnel 140 has been interrupted. In some cases, the host orchestrator 142 may identify that the tunnel 140 has been interrupted in response to the source host 1102 receiving an Internet Control Message Protocol (ICMP) time exceeded message in response to transmitting, via the tunnel 140, a packet carrying post-copy data that is addressed to the target host 1106 and/or the block storage target host(s) 1120. The interruption may prevent at least a portion and/or fraction of the post-copy data to be transferred to the target host 1106 and/or the block storage target host(s) 1120.

In response to identifying that the tunnel 140 has been interrupted, the host orchestrator 142 may cause the source host 1102 to resume operations of the virtual machine 202 on the source host 1102. In some cases, the host orchestrator 142 may communicate with a centralized network entity (e.g., a network orchestrator, such as the network orchestrator 132) that the operations of the virtual machine 202 are to be resumed on the source host 1102. Once the virtual machine 202 resumes operations on the source host 1102, the virtual machine 202 can utilize the source block storage client 1116 to access the block storage data in the primary replica 1112.

According to various implementations, migration of the virtualized resource may be resumed once the interruption in the tunnel 140 is resolved. For instance, the host orchestrator 142 may identify that the interruption to the tunnel 140 has been resolved, cause the virtual machine 202 to resume operations on the target host 1106, and may cause the virtualized resource data (e.g., the remaining fraction and/or portion of the post-copy data) to continue to be transferred to the target data center(s) 1108. Once the virtualized resource data has been fully transferred to the target host 1106 and the block storage target host(s) 1120, the virtual machine 202 may be fully migrated to the target data center(s) 1108. Once the host orchestrator 142 identifies that the virtual machine 202 has been fully migrated to the target data center(s) 1108, the host orchestrator 142 may cause the source host 1102 and the block storage source host(s) 1110 to delete the remaining copy of the virtualized resource data stored in the source data center(s) 1104.

Figure 12A:
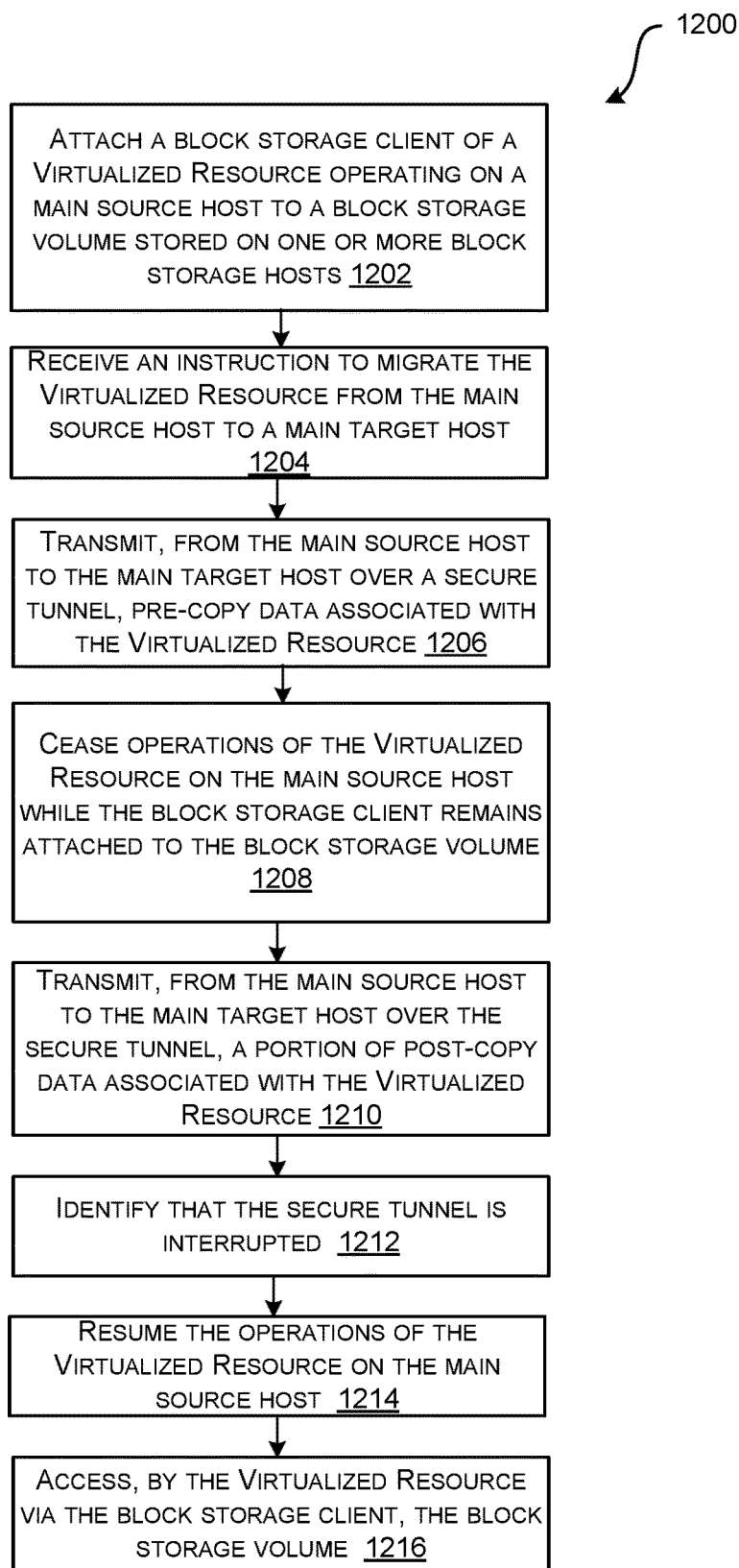
FIGS. 12A and 12B illustrates an example processes for ensuring that block storage data is retained in the event that migration is interrupted.

FIG. 12A illustrates an example process 1200 for ensuring that block storage data is retained in the event that migration is interrupted. In various implementations, the process 1200 can be performed by an entity including a source host (e.g., the source host 1102 described above with reference to FIGS. 11A and 11B), a host orchestrator (e.g., the host orchestrator 142), or the like.

At 1202, the process 1200 may include attaching a block storage client of a virtualized resource operating on a source host to a block storage volume stored on one or more block storage hosts. The block storage volume may be stored in a primary replica and at least one secondary replica. According to various implementations, the block storage volume may include a primary replica and at least one secondary replica. Each one of the primary replica and the secondary replica(s) may store a copy of data associated with the block storage volume (also referred to as "block storage data"). The source block storage client may read, write, and/or modify the data in the primary replica. Any modifications to the data in the primary replica may be distributed to the copies in the secondary replica(s).

At 1204, an instruction to migrate the virtualized resource from the source host to a target host may be received. In some implementations, the virtualized resource may be operating on the source host. In some cases, a migration instruction may be received from a network orchestrator. The migration instruction may include, for instance, a key for encoding data. In some cases, the source host and the target host may be located in different data centers that are separated via one or more external networks (e.g., the Internet). For instance, at least one of the source host or the target host may be located in an edge location. The primary replica and the secondary replica(s) may be located in the same data center and/or availability zone.

At 1206, pre-copy data associated with the virtualized resource may be transmitted from the source host to the target host over a secure tunnel. In various implementations, the pre-copy data can include highly accessed memory pages associated with the virtualized resource, state information associated with the virtualized resource, instructions for performing virtualized resource operations, and the like. The secure tunnel may include a VPN, in some cases. According to some examples, the source host may encode the pre-copy data using the key before transmitting the pre-copy data over the secure tunnel. In some cases, the secure tunnel may traverse the external network(s).

At 1208, operations of the virtualized resource may be ceased on the source host while the block storage client running on the source host remains attached to the block storage volume. In addition, a block storage client running on the target host can be simultaneously attached to the volume, so that the virtual machine running on the target host can also access the data of the volume. In some cases, upon receiving a confirmation that the pre-copy data has been transferred to the target host, the source host may cease the operations of the virtualized resource. The operations of the virtualized resource may be immediately resumed on the target host, target At 1210, a portion of post-copy data associated with the virtualized resource may be transmitted from the source host to the target host over the secure tunnel. The "portion" of post-copy data may also be referred to as a "fraction," in some cases. The post-copy data can include a remaining portion of state and memory data associated with the virtualized resource that is not included in the pre-copy data.

In various implementations of the present disclosure, the target host may include another block storage client that is associated with the virtualized resource, and that may attach to the block storage volume remotely over the secure tunnel.

As described herein, each host may have one or more clients that run (for example on an offload card of the host) to connect virtualized resources to remote, virtualized volumes. Accordingly, the block storage volume may be multi-attached to at least two different block storage clients, including the block storage client at the source host and the block storage client at the target host. Although some examples herein present the live migration in the context of being between a cloud region and an edge location, the disclosed use of multi-attach techniques for reading volume data can be applied to any migration, including migrations that occur entirely within a region or even a single data center, in order to provide for uninterrupted access to the volume data in the case of VM rollback.

At 1212, the process 1200 may include identifying that the secure tunnel has been interrupted, or that the migration has otherwise failed to complete. In some cases, the source host may identify the interruption in the secure tunnel by identifying that the source host can no longer transmit the post-copy data to the target host. For instance, the source host may receive an ICMP time exceeded message in response to attempting to transmit at least one data packet containing post-copy data to the target host. In some cases, a migration failure notification may be generated due to another problem, and transmitted either to the source host or a host implementing a portion of the control plane.

At 1214, the operations of the virtualized resource may be resumed on the source host due to the failure of the migration, referred to as "VM rollback" herein. In various implementations, migration of the virtualized resource may be rolled back to the source host. Various data associated with the virtualized resource may be stored and/or available to the source host, which enables the operations of the virtualized resource to resume on the source host. The operations of the virtualized resource may be ceased on the target host, in various implementations.

At 1216, the virtualized resource may access, via the block storage client, the block storage volume. Despite the interruption in the secure tunnel, the virtualized resource may nevertheless access the block storage volume using the block storage client on the source host due to retaining its attachment via the disclosed multi-attach techniques. Accordingly, the virtualized resource may utilize the block storage volume immediately after rollback (without the delay of acquiring a new lease), or at other stages during live migration even when the interruption prevents the transmission of data across the secure tunnel.

Although not illustrated in FIG. 12A, in some cases, the entity performing the process 1200 may determine that the interruption has been resolved. For instance, the target host may be reconnected to the source host via the secure tunnel. At this point, live migration of the virtualized resource may be resumed. The operations of the virtualized resource may be ceased on the source host and may be resumed on the target host. Any remaining portion of the post-copy data may be transferred to the target host (and, in the case of the block storage volume, one or more block storage hosts in the same data center and/or availability zone as the target host. The target host may confirm, to the source host (and, in some cases, a network orchestrator) that the virtualized resource has been successfully migrated. The virtualized resource data in the source host, as well as the block storage volume in the block storage hosts, may be deleted. Accordingly, the resources supporting the virtualized resource and/or the block storage volume in the source host and/or the block storage hosts may be reallocated for another purpose (e.g., hosting a different virtualized resource) in the network environment.

Figure 12B:
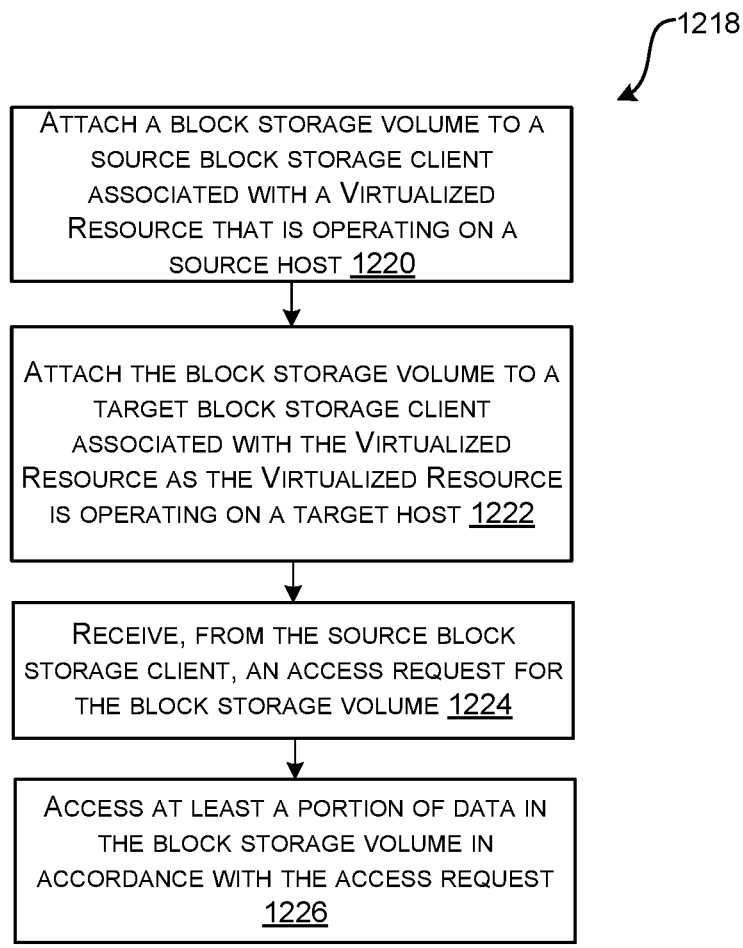

FIG. 12B illustrates an example process 1218 for ensuring that block storage data is retained in the event that migration is interrupted. In various implementations, the process 1218 can be performed by an entity including a block storage source host (e.g., one of the block storage source host(s) described above with reference to FIGS. 11A and 11B), a primary replica (e.g., the primary replica 1112 described above with reference to FIGS. 11A and 11B), or the like.

At 1220, a block storage volume may be attached to a source block storage client associated with a virtualized resource that is operating on a source host. According to various implementations, the block storage volume may be associated with a primary replica and at least one secondary replica. Each one of the primary replica and the secondary replica(s) may store a copy of data associated with the block storage volume (also referred to as "block storage data"). The source block storage client may read, write, and/or modify the data in the primary replica. Any modifications to the data in the primary replica may be distributed to the copies in the secondary replica(s). In various implementations, the block storage volume (stored in the primary replica and/or the secondary replica(s)) may be included in multiple block storage hosts in the same data center and/or availability zone as the source host. Accordingly, the source block storage client and at least one host storing the block storage volume may communicate via at least one internal network associated with the data center and/or availability zone, and may not communicate over a public network that may be particularly vulnerable to outages, like the Internet. When the source block storage client is attached to the block storage volume, the data in the block storage volume may be accessible (e.g., read, written, and/or otherwise modified) by the source block storage client.

At 1222, the block storage volume may be attached to a target block storage client associated with the virtualized resource as the virtualized resource is operating on a target host. In various implementations, the block storage volume may be attached (e.g., "multi-attached") to both the source block storage client and the target block storage client, simultaneously. For example, the primary replica of the block storage volume may respond to access requests from both the source block storage client and/or the target block storage client. In various implementations, operations of the virtualized resource may be transferred to the target host during a live migration process. For instance, 1222 may occur when the live migration process switches between a pre-copy stage and a post-copy stage.

In various implementations, at least one host (e.g., a host associated with the primary replica) storing the block storage volume may be connected to the target host via a secure tunnel that traverses one or more external networks. In some cases, the secure tunnel may experience an interruption and/or outage. The host(s) storing the block storage volume may be unable to communicate with the target block storage client during the interruption. For instance, the host(s) storing the block storage volume may identify the interruption in response to attempting, and failing, to transmit data (e.g., a portion of data in the block storage volume in response to a read request from the target block storage client) to the block storage client. However, the block storage volume may remain attached to the source block storage client. Accordingly, the data in the block storage volume may remain accessible via the source block storage client during the interruption. In some cases, the data that was unable to be transmitted to the target block storage client may be transmitted to the source block storage client, in anticipation of a virtualized resource associated with both block storage clients to resume operations on the source host.

At 1224, an access request for the block storage volume may be received from the source block storage client. The access request from the source block storage client may be received while the interruption is occurring. The access request may be an I/O request, a read request, a write request, some combination thereof, or some other request by which the data stored in the block storage volume can be requested and/or modified.

Figure 13:
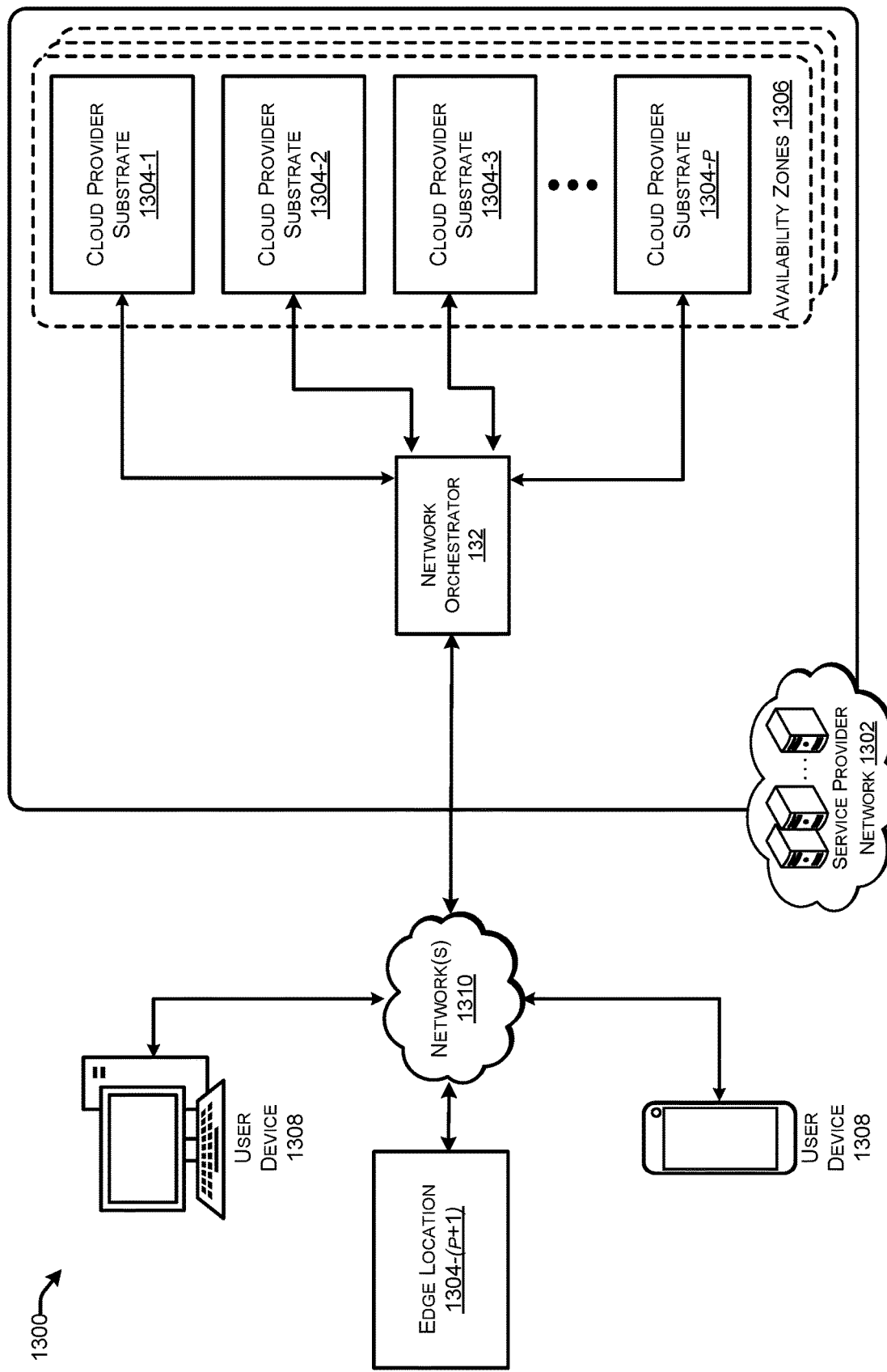
FIG. 13 is a system and network diagram showing an illustrative operating environment that includes a service provider network, which can be configured to implement aspects of various functionalities described herein.

At 1226, at least a portion of data in the block storage volume may be accessed in accordance with the access request. For instance, if the access request is a read request specifying the portion of data in the block storage volume, the portion of data may be retrieved from the primary replica and returned to the source block storage client. In some examples, if the access request is a write request specifying a change to the portion of data in the block storage volume, the portion of data may be modified accordingly in the copy of the data that is stored in the primary replica, and may also be modified accordingly in the copy of the data that is stored in the secondary replica. Accordingly, the FIG. 13 is a system and network diagram showing an illustrative operating environment 1300 that includes a service provider network 1302, which can be configured to implement aspects of various functionalities described herein. The service provider network 1302 can provide computing resources, like Virtual Machine (VM) instances and storage, on a permanent or an as-needed basis.

Among other types of functionality, the computing resources provided by the service provider network 1302 may be utilized to implement various services described above. For instance, the computing resources provided by the service provider network 1302 can include various types of computing resources, such as data processing resources like VM instances, data storage resources, networking resources, data communication resources, network services, and the like. In some cases, the computing resources are provided via servers within the service provider network 1302.

Each type of computing resource provided by the service provider network 1302 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, and/or other types of programs. Data storage resources can include file storage devices, block storage devices, and the like. The service provider network 1302 can also be configured to provide other types of computing resources not mentioned specifically herein.

The computing resources provided by the service provider network 1302 may be enabled in some implementations by one or more cloud provider substrates 1304-1 to 1304-p, wherein p is a positive integer. In addition, at least one edge location 1304-(p+1) may be located outside of the service provider network 1302. The data center(s) 1304-1 to 1304-(p+1) might be referred to herein singularly as "a data center 1304" or in the plural as "the data centers 1304"). The data centers 1304 are facilities utilized to house and operate computer systems and associated components. The data centers 1304 can include redundant and backup power, communications, cooling, and security systems. At least some of the data centers 1304 can also be located in geographically disparate locations, or regions. One region may include multiple availability zones 1306. A region can be defined as a geographical area in which the cloud provider network 1302 clusters data centers 1304. Each region can include two or more availability zones 1306 connected to one another via a private high-speed network, for example a fiber communication connection. An availability zone can refer to an isolated failure domain including one or more data center facilities with separate power, separate networking, and separate cooling from those in another availability zone. In some cases, availability zones 1306 within a region may be positioned far enough away from one other that the same natural disaster should not take more than one availability zone 1306 offline at the same time. One illustrative embodiment for a data center 1304 that can be utilized to implement the technologies disclosed herein will be described below with regard to FIG. 14.

Various user devices 1308 that utilize the service provider network 1302 may access the computing resources provided by the service provider network 1302 over any wired and/or wireless network(s) 1310, which can be a Wide Area Network (WAN), such as the Internet, an intranet or an Internet Service Provider (ISP) network or a combination of such networks. In some cases, network(s) 1310 may include a cloud-based network. In some examples, without limitation, a user device 1308 operated by a client of the service provider network 1302 may be utilized to access the service provider network 802 by way of the network(s) 1310. It should be appreciated that a Local Area Network (LAN), the Internet, or any other networking topology known in the art that connects the data centers 1304 to remote clients and other users can be utilized. It should also be appreciated that combinations of such networks can also be utilized.

In particular implementations, the user device 1308 may utilize resources of a source host in a first cloud provider substrate 1304-1 among the data centers 1304 via a virtualized resource hosted on the source host. For various reasons (e.g., to reduce communication latency), the virtualized resource may be migrated to a target host within the edge location 1304-(p+1). The network orchestrator 132 may be configured to facilitate live migration of the virtualized resource over at least one secure communication tunnel traversing the network(s) 1310.

In some cases, although not specifically illustrated in FIG. 13, at least a portion of the network orchestrator 132 can be hosted by one or more of the cloud provider substrates 1304. For instance, the network orchestrator 132 may be hosted by one of the data centers 1304 in relatively close geographical proximity to the user device 1308. In some cases, the network orchestrator 132 may be configured to migrate multiple virtualized resources between multiple servers, some of which may be located in the same availability zone 1306, and may be hosted by one of the data centers 1304 in the same availability zone 1306 as the servers.

Figure 14:
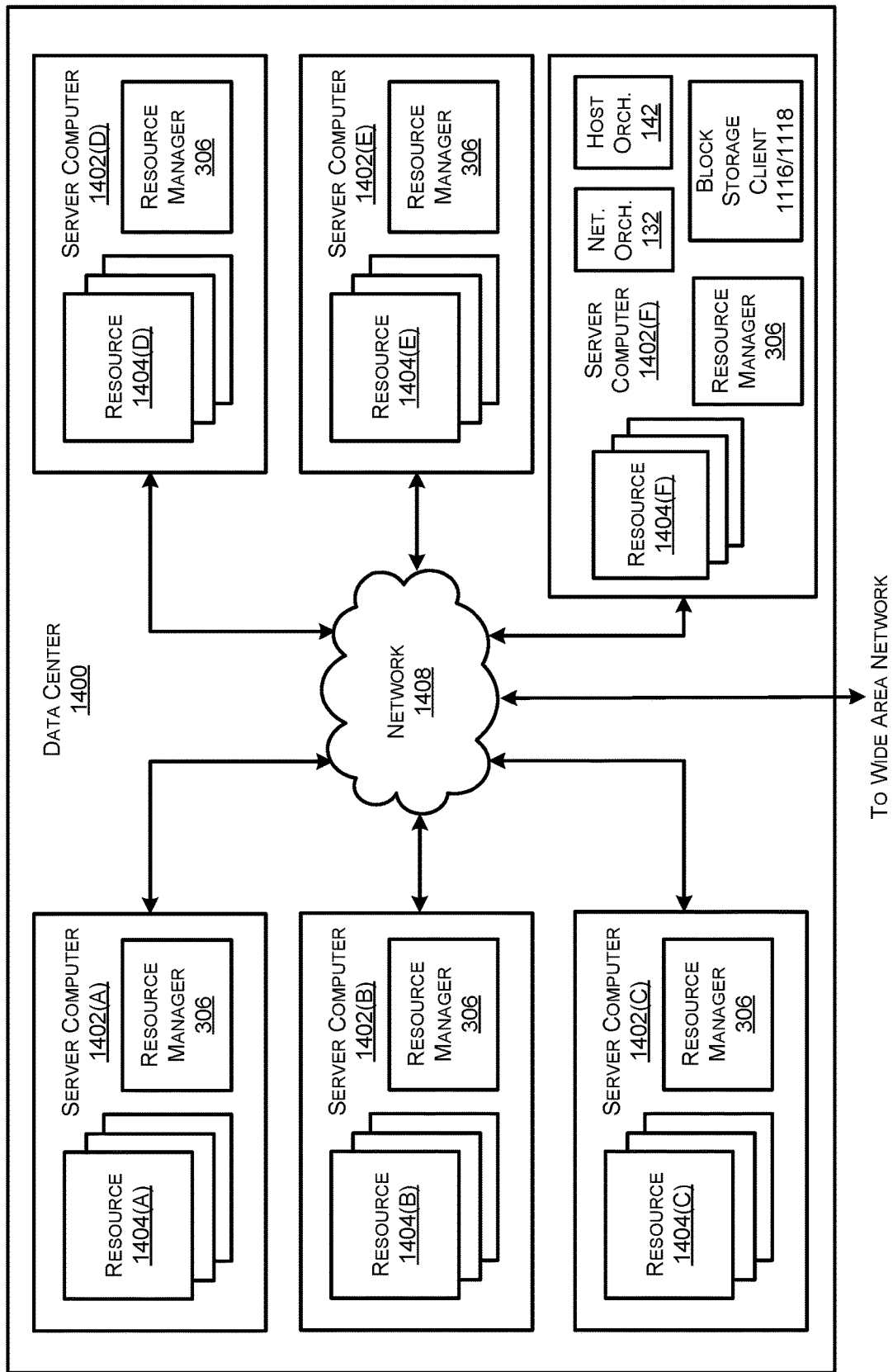
FIG. 14 is a computing system diagram illustrating a configuration for a data center that can be utilized to implement aspects of the technologies disclosed herein.

FIG. 14 is a computing system diagram illustrating a configuration for a data center 1400 that can be utilized to implement aspects of the technologies disclosed herein. The example data center 1400 shown in FIG. 14 includes several server computers 1402(A)-1402(F) (which might be referred to herein singularly as "a server computer 1402" or in the plural as "the server computers 1402") for providing computing resources 1404(A)-1404(F). In some examples, the resources 1404 and/or server computers 1402 may include, be included in, or correspond to, the computing resource network 1302 described above with reference to FIG. 13.

The server computers 1402 can be standard tower, rackmount, or blade server computers configured appropriately for providing the computing resources described herein (illustrated in FIG. 14 as the computing resources 1404(A)-1404(F)). As mentioned above, the computing resources provided by the service provider network 1302 can be data processing resources such as Virtual Machine (VM) instances or hardware computing systems, database clusters, computing clusters, storage clusters, data storage resources, database resources, networking resources, and others. Server computers 1402 in the data center 1400 can also be configured to provide network services and other types of services.

The server computers 1402 (i.e., server computers 1402(A)-1402(F)) can also be configured to execute a resource manager 1406 capable of instantiating and/or managing the computing resources. In the case of VM instances, for example, the resource manager 1406 can be a hypervisor or another type of program configured to enable the execution of multiple VM instances on a single server computer 1402.

At least one of the servers 1402 (i.e., server computer 1402(F)) may further execute a network orchestrator 132, a host orchestrator 142, and a block storage client. The network orchestrator 132 and/or the host orchestrator 142 may facilitate live migration of virtualized resources (e.g., the VM instances) to and from computing resources 1404 over an external Wide Area Network (WAN). The block storage client may be used to virtualize block storage volumes located stored on other servers 142 within the data center 1400.

In the example data center 1400 shown in FIG. 14, an appropriate network 1412 is also utilized to interconnect the server computers 1402(A)-1402(F). It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1304-1 to 1304-$p$ (described above with reference to FIG. 13), between each of the server computers 1402(A)-1402(F) in the data center 1400. It should be appreciated that the configuration of the data center 1400 described with reference to FIG. 14 is merely illustrative and that other implementations can be utilized.

Server computer 1402(F) can execute some or all of the software components described above. For example, and without limitation, the server computer 1402(F) can implement the network orchestrator 132, the host orchestrator 142, and/or the block storage client 150. The server computer 1402(F) can also be configured to execute other components and/or to store data for providing some or all of the functionality described herein. In this regard, it should be appreciated that the services illustrated in FIG. 14 as executing on the server computer 1402(F) can execute on many other physical or virtual servers in the data centers 1304 in various embodiments.

Figure 15:
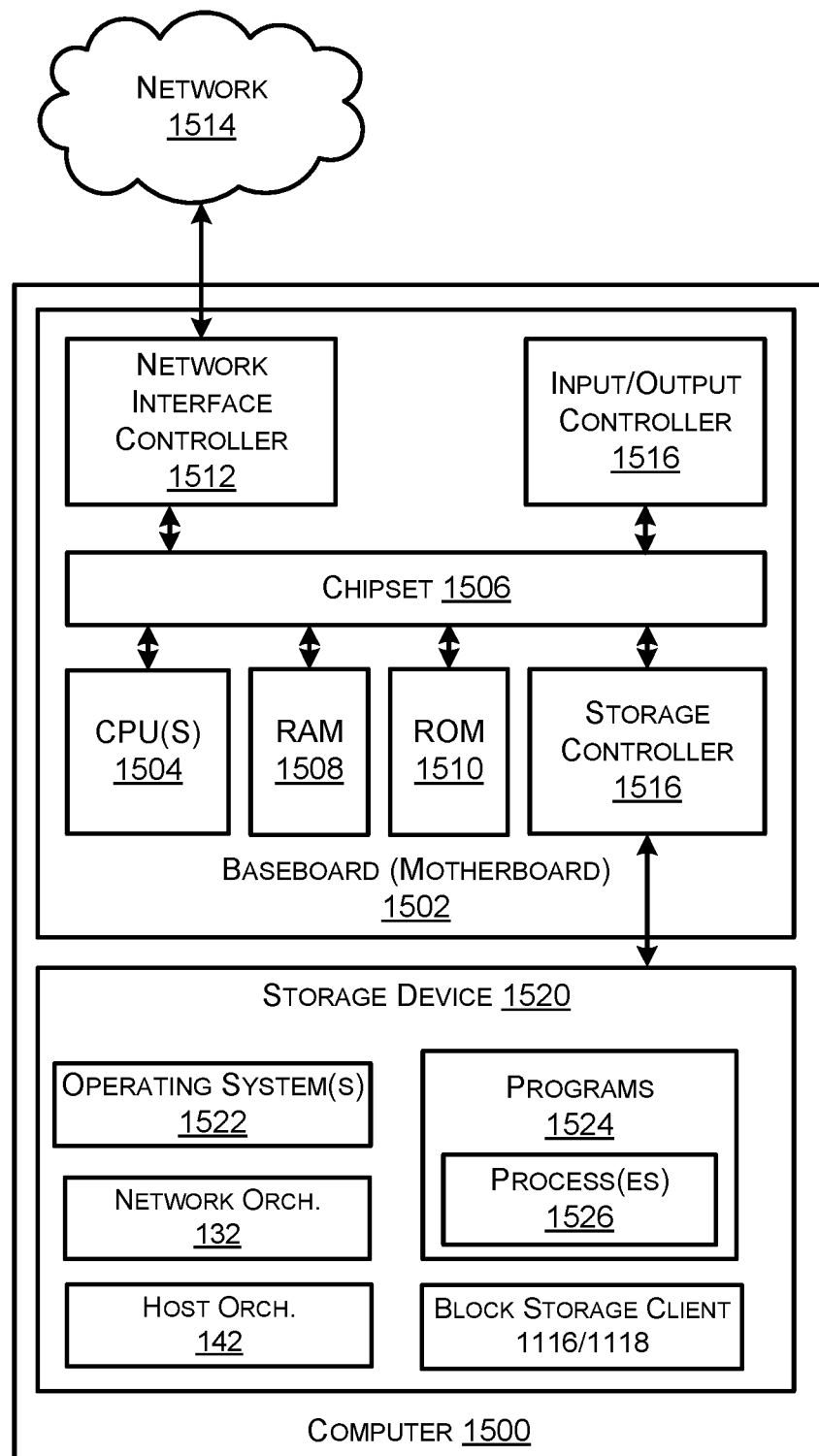
FIG. 15 is a computer architecture diagram showing an illustrative computer hardware architecture for implementing a computing device that can be utilized to implement aspects of the various technologies presented herein.

FIG. 15 is a computer architecture diagram showing an illustrative computer hardware architecture for implementing a computing device that can be utilized to implement aspects of the various technologies presented herein. The computer architecture shown in FIG. 15 illustrates a conventional server computer, workstation, desktop computer, laptop, tablet, network appliance, e-reader, smartphone, or other computing device, and can be utilized to execute any of the software components presented herein.

The computer 1500 includes a baseboard 1502, or "motherboard," which is a printed circuit board to which a multitude of components or devices can be connected by way of a system bus or other electrical communication paths. In one illustrative configuration, one or more Central Processing Units (CPUs) 1504 operate in conjunction with a chipset 1506. The CPUs 1504 can be standard programmable processors that perform arithmetic and logical operations necessary for the operation of the computer 1500.

The CPUs 1504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1506 provides an interface between the CPUs 1504 and the remainder of the components and devices on the baseboard 1502. The chipset 1506 can provide an interface to a RAM 1508, used as the main memory in the computer 1500. The chipset 1506 can further provide an interface to a computer-readable storage medium such as a Read-Only Memory (ROM) 1510 or Non-Volatile RAM ("NVRAM") for storing basic routines that help to startup the computer 1500 and to transfer information between the various components and devices. The ROM 1510 or NVRAM can also store other software components necessary for the operation of the computer 1500 in accordance with the configurations described herein.

The computer 1500 can operate in a networked environment using logical connections to remote computing devices and computer systems through a network 1514. In various implementations, the network 1514 can include at least one of a cloud-based network, a Local Area Network (LAN), or a Wide Area Network (WAN). The chipset 1506 can include functionality for providing network connectivity through a Network Interface Controller (NIC) 1512, such as a gigabit Ethernet adapter. The NIC 1512 is capable of connecting the computer 1500 to other computing devices over the network 1514. It should be appreciated that multiple NICs 1512 can be present in the computer 1500, connecting the computer 1500 to other types of networks and remote computer systems.

The computer 1500 can also include one or more input/output controllers 1018 for receiving and processing input from a number of input devices, such as a keyboard, a mouse, a touchpad, a touch screen, an electronic stylus, or other type of input device. Similarly, an I/O controller 1516 can provide output to a display, such as a computer monitor, a flat-panel display, a digital projector, a printer, or other type of output device.

The computer 1500 can include and/or be connected to a mass storage device 1520 that provides non-volatile storage for the computer. The mass storage device 1520 can store one or more operating systems 1522, programs 1524 (e.g., instructions 1526 for performing various operations), as well as the network orchestrator 132, the host orchestrator 142, the block storage client 150, and data (e.g., data associated with a virtualized resource), which have been described in greater detail herein. The mass storage device 1520 can be connected to the computer 1500 through a storage controller 1516 connected to the chipset 1506. The mass storage device 1520 can consist of one or more physical storage units. The storage controller 1516 can interface with the physical storage units through a Serial Attached SCSI (SAS) interface, a Serial Advanced Technology Attachment (SATA) interface, a Fiber Channel (FC) interface, or other type of interface for physically connecting and transferring data between computers and physical storage units.

The computer 1500 can store data on the mass storage device 1520 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1520 is characterized as primary or secondary storage, and the like.

For example, the computer 1500 can store information to the mass storage device 1520 by issuing instructions through the storage controller 1516 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1500 can further read information from the mass storage device 1520 by detecting the physical states or characteristics of one or more particular locations within the physical storage units.

In addition to the mass storage device 1520 described above, the computer 1500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1500. In some examples, the operations performed by the service provider network 1302 described above with reference to FIG. 13, and or any components included therein, may be supported by one or more devices similar to computer 1500. Stated otherwise, some or all of the operations performed by the service provider network 1302, and or any components included therein, may be performed by one or more computer devices 1500 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, Erasable Programmable ROM (EPROM), Electrically-Erasable Programmable ROM (EEPROM), flash memory or other solid-state memory technology, Compact Disc ROM (CD-ROM), Digital Versatile Disk (DVD), High Definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1520 can store an operating system 1522 utilized to control the operation of the computer 1500. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1520 can store other system or application programs and data utilized by the computer 1500.

In one embodiment, the mass storage device 1520 or other computer-readable storage media is encoded with computer-executable instructions which, when loaded into the computer 1500, transform the computer from a general-purpose computing system into a special-purpose computer capable of implementing the embodiments described herein. These computer-executable instructions transform the computer 1500 by specifying how the CPUs 1504 transition between states, as described above. According to one embodiment, the computer 1500 has access to computer-readable storage media storing computer-executable instructions which, when executed by the computer 1500, perform the various processes described above with regard to FIGS. 1 to 12. The computer 1500 can also include computer-readable storage media having instructions stored thereupon for performing any of the other computer-implemented operations described herein.

It will be appreciated that the computer 1500 might not include all of the components shown in FIG. 15, can include other components that are not explicitly shown in FIG. 15, or might utilize an architecture completely different than that shown in FIG. 15.

Further, in some implementations, the computer 1500 may correspond to a server configured to host one or more virtualized resources at a time. In some cases in which the computer 1500 is a sever currently hosting a virtualized resource, data associated with the virtualized resource may be stored in the storage device 1520. Other architectures may be used to implement the described functionalities and are also intended to be within the scope of this disclosure. Furthermore, although specific distributions of responsibilities are defined above for purposes of discussion, the various functions and responsibilities might be distributed and divided in different ways, depending on circumstances.

Figure 16:
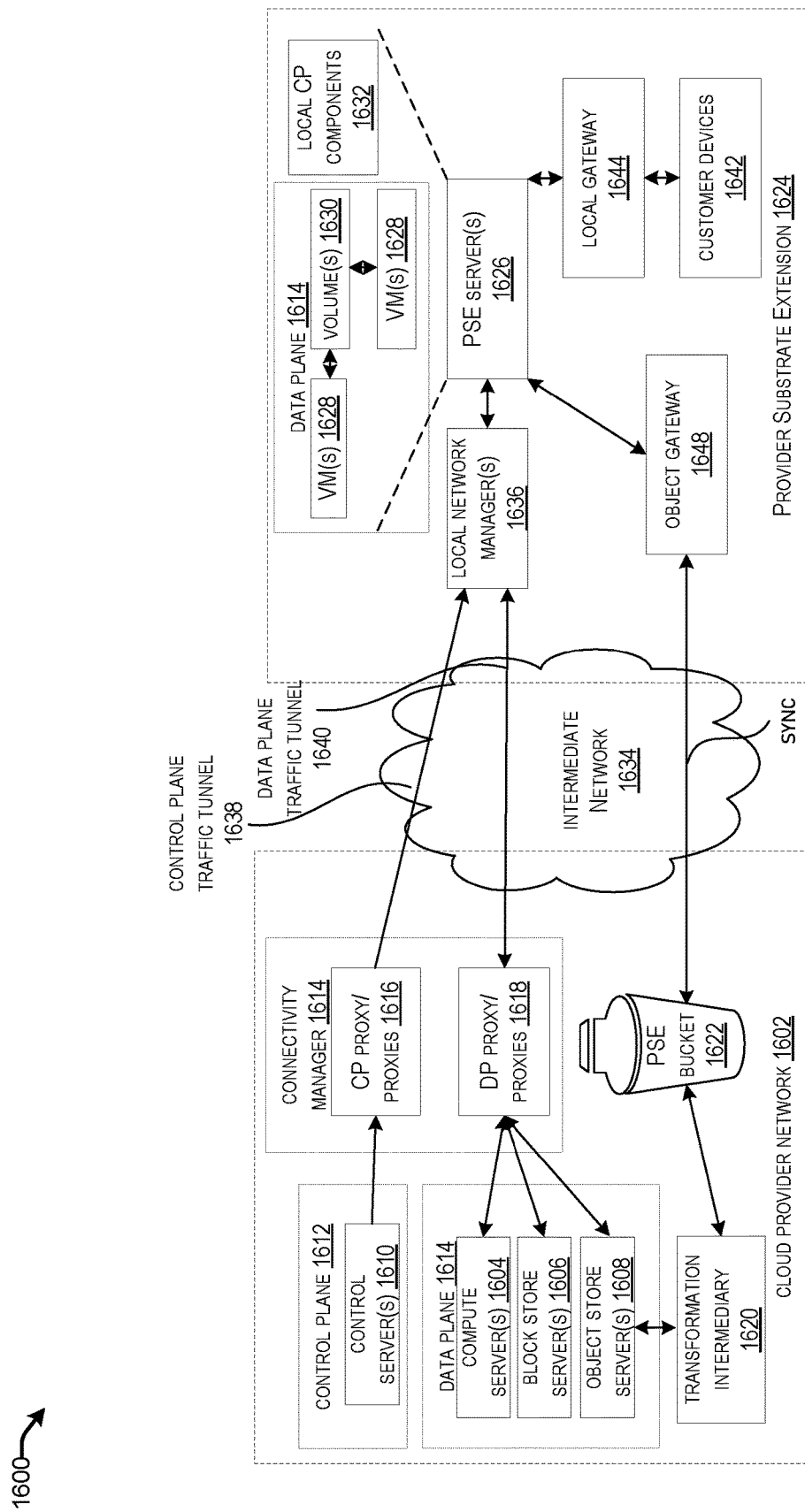
FIG. 16 illustrates an exemplary system including a cloud provider network and further including various provider substrate extensions of the cloud provider network according to some embodiments.

FIG. 16 illustrates an example environment 1600 of a cloud provider network 1602 and a provider substrate extension of the cloud provider network, according to some embodiments. A cloud provider network 1602 (sometimes referred to simply as a "cloud") refers to a pool of network-accessible computing resources (such as compute, storage, and networking resources, applications, and services), which may be virtualized or bare-metal. The cloud 1602 can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network, or the like) and the hardware and software in cloud provider data centers that provide those services.

The cloud provider network 1602 can provide on-demand, scalable computing platforms to users through a network, for example allowing users to have at their disposal scalable "virtual computing devices" via their use of the compute servers 1604 (which provide compute instances via the usage of one or both of CPUs and GPUs, optionally with local storage) and block store servers 1606 (which provide virtualized persistent block storage for designated compute instances). These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, Application Programming Interface (API), software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An API refers to an interface and/or communication protocol between a client and a server, such that if the client makes a request in a predefined format, the client should receive a response in a specific format or initiate a defined action. In the context of the cloud provider network 1602, APIs provide a gateway for customers to access cloud infrastructure by allowing customers to obtain data from or cause actions within the cloud provider network 1602, enabling the development of applications that interact with resources and services hosted in the cloud provider network. APIs can also enable different services of the cloud provider network 1602 to exchange data with one another. Users can choose to deploy their virtual computing systems to provide network-based services for their own use and/or for use by their customers or clients.

A cloud provider network can be formed as a number of regions 1602, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network). Transit Centers (TC) are the primary backbone locations linking customers to the cloud provider network 1602, and may be co-located at other network provider facilities (e.g., Internet service providers, telecommunications providers, or the like). Each region can operate at least two TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers.

The cloud provider network 1602 can include a physical network (e.g., sheet metal boxes, cables, rack hardware) referred to as the substrate. The substrate of the cloud provider network 1602 can be considered as a network fabric containing the physical hardware that runs the services of the provider network 1602, and can include networking devices such as routers, switches, network address translators (NATs), and so on, as well as the physical connections among the devices. The substrate may be isolated from the rest of the cloud provider network 1602, for example it may not be possible to route from a substrate network address to an address in a production network that runs services of the cloud provider, or to a customer network that hosts customer resources.

The cloud provider network 1602 can also include an overlay network of virtualized computing resources (e.g., compute instances, block store volumes, data objects such as snapshots and machine images, file storage, databases) that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., Virtual Private Clouds (VPCs), security groups, or the like). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server 1604, a block store server 1606, an object store server 1608, a control server 1610) can have an IP address in the substrate of the cloud provider network 1602. Hardware virtualization technology can enable multiple operating systems to run concurrently on a host computer, for example as VMs on a compute server. A virtual machine monitor (VMM) (e.g., a hypervisor and/or a resource manager), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 1602. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network 1602 for routing packets between endpoints.

As illustrated, the traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 1612 distributed across and implemented by one or more control servers 1610. Control plane traffic generally includes administrative operations, such as establishing isolated virtual networks for various customers, monitoring resource usage and health, identifying a particular host or server at which a requested compute instance is to be launched, provisioning additional hardware as needed, and so on. Data plane components 1614 include customer resources (e.g., computing instances, containers, block storage volumes, databases, file storage, or the like) that are implemented on physical resources (e.g., the compute server(s) 1604, the block store server(s) 1606, the object store server(s) 1608, or the like) of the provider network. Data plane traffic generally includes non-administrative operations such as transferring data to and from the customer resources.

The control plane components 1612 can be implemented on a separate set of servers (e.g., the control server(s) 1610) from the data plane servers (e.g., the compute server(s) 1604, the block store server(s) 1606, and the object store server(s) 1608), and control plane traffic and data plane traffic may be sent over separate/distinct networks. In some embodiments, control plane traffic and data plane traffic can be supported by different protocols. In some embodiments, messages (e.g., packets) sent over the provider network 1602 include a flag (e.g., in a packet header) to indicate whether the traffic is control plane traffic or data plane traffic. In some embodiments, a payload of a message may be inspected to determine the message's type (e.g., whether the message is a control plane message or a data plane message). Other techniques for distinguishing traffic types are possible.

As illustrated in FIG. 16, the data plane components 1614 can include the compute server(s) 1604, which may be bare metal (e.g., single tenant) or may be virtualized by a hypervisor to run multiple VMs (sometimes referred to as "instances") for one or more customers. These compute servers 1604 can support a virtualized computing service (also known as an elastic compute service, a virtual machines service, a computing cloud service, a compute engine, or cloud compute) of the provider network. The provider may offer virtual compute instances (e.g., virtualized resources) with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane components 1612 can also include one or more block store servers 1606, which can include persistent storage for storing volumes of customer data as well as software for managing these volumes. These block store servers 1606 can support a managed block storage service of the provider network 1602. The block store servers 1606 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from one GB to one terabyte TB (or more) in size, are made of one or more blocks stored on the block store servers 1606. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the provider network 1602, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "access operations," "input output operations," or "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane components 1614 can also include one or more object store servers 1608, which represent another type of storage within the cloud provider network 1602. The object storage servers 1608 include one or more servers on which data is stored as objects within resources referred to as buckets, and can be used to support a managed object storage service of the cloud provider network 1602. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers 1608 distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

The cloud provider network 1602 may also include a connectivity manager 1616, which may include at least one control plane proxy 1616 and at least one data plane proxy 1618. The cloud provider network 1602 may also include a transformation intermediary 1620 associated with a Provider Substrate Extension (PSE) bucket 1622. The proxies 1614 and 1616, transformation intermediary 1620, and PSE bucket 1622 depicted in the cloud provider network 1602 may be provisioned in a particular region or availability zone of the cloud provider network 1602 in response to the creation of a substrate extension, and are described in further detail below.

Some customers may desire to use the resources and services of the cloud provider network 1602, but for various reasons (e.g., latency in communications with customer devices, legal compliance, security, or other reasons) prefer for these resources and services to be provisioned within their own network, for example on premises of the customer. The technology described herein enables a piece of the cloud provider network—referred to herein as an "customer network," "edge location(s)," "provider substrate extension," or PSE 1624—to be provisioned within the customer's network. A customer may access their PSE 1624 via the cloud provider substrate 1602 or their own network, and may use the same APIs to create and manage resources in the PSE 1624 as they would use to create and manage resources in the region.

The PSE 1624 may be pre-configured, e.g. by the provider network operator, with the appropriate combination of hardware with software and/or firmware elements to support various types of computing-related resources, and to do so in a manner that mirrors the experience of using the provider network 1602. For example, one or more PSE servers 1626 can be provisioned by the cloud provider within the customer network. As described above, the provider network 1602 may offer a set of predefined instance types, each having varying types and quantities of underlying hardware resources. Each instance type may also be offered in various sizes. In order to enable customers to continue using the same instance types and sizes in their PSE 1624 as they do in the region, any of the PSE servers 1626 can be heterogeneous servers. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the PSE server 1626, meaning while other VMs are still running and consuming other capacity of the PSE server 1626. This can improve utilization of resources within the PSE 1624 by allowing for better packing of running instances on physical hosts, and also provides a seamless experience regarding instance usage across the region and PSE 1624.

As illustrated, the PSE servers 1626 can host one or more VMs 1628. The customer can use these VMs 1628 to host containers, which package up code and all its dependencies so an application can run quickly and reliably from one computing environment to another. In addition, the PSE servers 1626 may host one or more data volumes 1630, if desired by the customer. In the region, such volumes 1630 may be hosted on dedicated block store servers. However, due to the possibility of having a significantly smaller capacity in the PSE 1624 than in the region, the PSE 1624 may omit such dedicated block store servers. Accordingly, the block storage service may be virtualized in the PSE 1624, such that one of the VMs 1628 runs the block store software and stores the data of the volume. Similar to the operation of the block storage service in the region, the volumes within a PSE may be replicated for durability and availability. The volumes may be provisioned within their own VPC within the PSE 1624. The VMs 1624 and any volumes collectively make up an extension of the provider network data plane 1614 within the PSE 1624.

The PSE servers 1626 may, in some implementations, host certain local control plane components 1632, for example components that enable the PSE 1624 to continue functioning if there is a break in the connection back to the region 1602. Examples of these control plane components 1632 include a migration manager that can move the VMs 1628 between the PSE servers 1626 if needed to maintain availability, a key value data store that indicates where volume replicas are located, and a local VM placement component that can respond to requests for new VMs made via the customer network. However, generally the control plane components 1632 for the PSE 1624 will remain in the region, in order to allow the customer to use as much capacity of the PSE 1624 as possible. At least some of the VMs 1628 that are set up at the PSE 1624, and associated higher-level services that use such VMs as building blocks, may continue to function even during periods of time when connectivity to the provider network substrate network 1602, e.g., connectivity of an intermediate network 1634, is temporarily disrupted in some embodiments.

Server software may be designed by the cloud provider to run on the substrate network 1602, and this software may be enabled to run unmodified in a PSE 1624 by using one or more local network managers 1636 to create a private replica of the substrate network within the PSE (a "shadow substrate"). The local network manager(s) 1636 can run on the PSE servers 1626 and bridge the shadow substrate with the customer's on-premise network, for example by acting as a VPN endpoint between the PSE 1624 and the proxies 1616 and 1618 provisioned in the cloud provider substrate, and by implementing the mapping service (for traffic encapsulation and decapsulation) to relate data plane traffic (from the DP proxies 1618) and control plane traffic (from the CP proxies 1616) to the appropriate droplet. By implementing a local version of the provider network's substrate-overlay mapping service, resources in the PSE 1624 can seamlessly communicate with resources in the cloud provider substrate network 1602. In multi-rack PSEs 1624, inter-rack communications can go through the local network managers 1636, with local network managers 1636 maintaining open tunnels to one another. The local network managers 1636 may be collocated on the PSE servers 1626, may run on separate cards of the PSE server 1626 (e.g., an offload card), or can be installed as their own servers separate from the compute hosts. In some implementations, a single local network manager 1636 can perform these actions for all hosts in the PSE 1624. In other implementations, each host in the PSE 1624 may have a dedicated local network manager 1636.

PSEs 1624 can require secure networking tunnels 1638 and 1640 from the customer network to the cloud provider substrate 1602 in order to operate, for example to maintain security of customer data when traversing the intermediate network 1634, which may be the Internet. These tunnels 1638 and 1640 are composed of virtual infrastructure components including VPCs, CP proxies and DP proxies (which may be implemented as containers running on compute instances), and substrate network interfaces. Every host in the PSE 1624 can require at least two tunnels, one control plane traffic tunnel 1638 for CoAP control plane traffic and one data plane traffic tunnel 1640 for encapsulated data plane traffic. The connectivity manager 1614 manages the cloud provider region-side lifecycle of these tunnels 1624 and 1638 and their components, for example provisioning them automatically when needed and maintaining them in a healthy operating state.

Each CP proxy 1616 can be provisioned in the cloud provider network 1602 to represent particular host(s) in the PSE 1624. The CP proxy 1616 is an intermediary between the substrate in the cloud provider network 1602 and the shadow substrate in the PSE 1624. The CP proxy 1616 maintains a VPN tunnel to the local network manager 1636 in the PSE 1624. CP proxies 1616 can be implemented as compute instances that have a network interface in the substrate and an additional network interface in a VPC. CP proxies 1616 can implement VPN tunnels (e.g., control plane traffic tunnel 1638) back to the cloud provider region, instance traffic NATing to/from customer networks, and participates in the CoAP proxy path. CP proxies 1616 provide infrastructure for tunneling management API traffic destined for PSE hosts out of the region substrate and to the remote location of the PSE 1624. The software implemented within the CP proxies 1616 ensures that only well-formed API traffic leaves from and returns to the substrate. CP proxies 1616 provide a mechanism to expose remote devices (within the PSE 1624 in a customer facility) on the cloud provider substrate 1602, while still protecting substrate security materials (e.g., Geographic Information System (GIS) keys, Global Trading System (GTS) tokens) from leaving datacenters of the cloud provider network 1602. The one-way control plane traffic tunnel 1638 imposed by the CP proxies 1616 also importantly prevents any (potentially compromised) devices from making calls back to the substrate of the cloud provider network 1602. CP proxies 1616 may be instantiated one-for-one with the PSE servers 1626, or may be able to manage control plane traffic for multiple PSE servers 1626 in the same PSE 1624.

Each DP proxy 1618 can also be provisioned in the cloud provider network 1602 to represent particular host(s) in the PSE 1624. The DP proxy 1618 acts as a shadow or anchor of the host, and can be used by services within the cloud provider network 602 to monitor health of the host (including its availability, used/free compute and capacity, used/free storage and capacity, and network bandwidth usage/availability). The DP proxy 1618 also allows VPCs to span the PSE 1624 and a public region of the cloud provider network 1602, by acting as a proxy for at least one of the PSE server(s) 1626 in the region. Each DP proxy 1618 can be implemented as a packet-forwarding compute instance or container. As illustrated, each DP proxy 1618 can maintain a data plane traffic tunnel 1640 (e.g., a VPN tunnel) with the local network manager 1636 that manages the PSE server 1626 that the DP proxy 1618 represents. This tunnel 1640 can be used to send data plane traffic between the PSE 1624 and the region of the cloud provider network 1602. Data plane traffic flowing between the PSE 1624 and the substrate of the cloud provider network 1602 can be passed through DP proxies 1618 associated with that PSE 1624. For data plane traffic flowing from the PSE 1624 to the substrate of the cloud provider network 1602, DP proxies 1618 can receive encapsulated data plane traffic, validate it for correctness, and allow it to enter into the substrate of the cloud provider network 1602. DP proxies 1618 can forward encapsulated traffic from the substrate of the cloud provider network 1602 directly to the PSE 1624. If a DP proxy 1618 receives any control plane traffic from the PSE 1624, it will drop the traffic so that it does not enter the substrate of the cloud provider network 1624. Regarding control plane traffic flowing from the region of the cloud provider network 1602 to the PSE 1624, DP proxies 1618 can delegate non-encapsulated traffic (e.g., control plane traffic) to the appropriate CP proxy 1616 based on substrate IP address. Beneficially, this enforces the one-way secure tunnel between the CP proxies 1616 and the local network manager 1636 for control plane traffic, protecting the substrate of the cloud provider network 1602 against any potentially malicious control traffic flowing in from the PSE 1624, but still allowing the customer to send control signals into the PSE 1624 via the substrate of the cloud provider network 1602 (e.g., to provision VMs in the PSE 1624, create volumes in the PSE 1624, attach these VMs to these volumes, to deprovision any resources in the PSE 1624, and to configure networking for PSE resources).

In at least some embodiments, a local network manager 1636 may initiate the automated establishment of (or at least participate in the automated establishment of) secure network connectivity with the proxies 1616 and 1618 established at one or more data centers within the cloud provider network 1602. After connectivity has been established between the local network manager 1636 and the proxies 1616 and 1618 at the data center(s) of the cloud provider network 1602, the customer may issue commands to instantiate the VMs 1628 (and/or perform other operations using virtual machines) that use PSE resources, in a manner analogous to the way in which such commands would be issued with respect to VMs that use only provider network resources. From the perspective of the customer, the functionality of the cloud provider network 1602 may now seamlessly be utilized using local resources within the PSE 1624 (as well as resources located in the data centers of the cloud provider network 1602, if desired). The VMs 1628 set up on a PSE server 1626 at the PSE 1624 may communicate (e.g., with the help of the network manager 1636, which may perform address translation and/or other encapsulation protocol-related processing) both with customer devices 1642 located on the customer's computing network in various embodiments, as well as with other VMs that are set up in the data centers of the cloud provider network 1602, as desired.

A local gateway 1644 can be implemented to provide network connectivity between resources running on the PSE servers 1626 and customer devices 1642 on the customer's network, in order to take advantage of the reduced latency and other benefits of having cloud provider hardware installed in the customer network. The customer can configure the local gateway by issuing API calls to an interface of the cloud provider network 1602 which results in control plane commands being sent to the PSE 1624. The customer can establish communications between instances hosted by the PSE 1624 and the customer devices 1642 via the local gateway 1644. The customer devices 1642 can include any on-premise or mobile devices that have access to the customer network, for example robotic devices, manufacturing devices, medical equipment, mobile phones, or other computing devices connected to the customer network.

There may be circumstances that necessitate the transfer of data between an object storage service hosted on the object store server(s) 1608 and the PSE 124. For example, the object storage service may store machine images used to launch VMs, as well as snapshots representing point-in-time backups of volumes. An object gateway 1648 can be provider on a PSE server 1626 or a specialized storage device, and provides customers with configurable, per-bucket caching of object storage bucket contents in their PSE to minimize the impact of PSE-region latency on the customer's workloads. The object gateway 1648 can also temporarily store snapshot data from snapshots of volumes in the PSE 1624 and then sync with the object store servers 1608 in the region of the cloud provider network 1602 when possible. The object gateway 1648 can also store machine images that the customer designates for use within the PSE 1624 or on the customer's premises. In some implementations, the data within the PSE 1624 may be encrypted and/or encoded with a unique key, and the cloud provider can limit keys from being shared from the region to the PSE 1624 for security reasons. Accordingly, data exchanged between the object store servers 1608 and the object gateway 1648 may require encoding, decoding, encryption, decryption, and/or reencryption in order to preserve security boundaries with respect to encryption keys. The transformation intermediary can perform these operations, and a PSE bucket 1622 can be created (on the object store servers 1608) to store snapshot and machine image data using the PSE encryption key.

In the manner described above, the PSE 1624 forms an edge location, in that it provides the resources and services of the cloud provider network 1602 outside of a traditional cloud provider data center and geographically closer to the customer devices 1642. An edge location, as referred to herein, can be structured in several ways. In some implementations, an edge location can be an extension of the substrate of the cloud provider network 1602 including a limited quantity of capacity provided outside of an availability zone (e.g., in an edge location or other facility of the cloud provider that is located close to a customer workload and that may be distant from any availability zones). Such edge locations may be referred to as "local zones" (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more.

In some implementations, an edge location may be an extension of the substrate of the cloud provider network 1602 formed by one or more servers located on-premise in a customer or partner facility, wherein such server(s) communicate over the intermediate network 1634 (e.g., a secure channel (such as a VPN) over a publicly-accessible network such as the Internet, or in some cases a direct private connection (such as a fiber network connection)) with a nearby availability zone or region of the cloud provider network 1602. This type of substrate extension located outside of cloud provider network 1602 data centers can be referred to as an "outpost" of the cloud provider network 1602. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone (e.g., the control plane 1612 of the cloud provider network 1602). As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

The environment and individual elements described herein may of course include many other logical, programmatic, and physical components, of which those shown in the accompanying figures are merely examples that are related to the discussion herein.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A system comprising:
a first virtualization host located in a region of a cloud provider network; and
a second virtualization host located in an edge location connected to the region of the cloud provider network via an intermediary network,
wherein the first visualization host comprises at least one processor, and at least one memory storing (i) multiple memory pages associated with a virtual machine; and (ii) instructions that, when executed by the at least one processor, cause the at least one processor to perform operations comprising:
receiving a request to migrate the virtual machine from the first virtualization host to the second virtualization host;
identifying usage levels of the multiple memory pages, the usage levels including a first number of times that the virtual machine has accessed a first memory page of the multiple memory pages during a time interval, a second number of times that the virtual machine has accessed a second memory page of the multiple memory pages during the time interval, and a third number of times that the virtual machine has accessed a third memory page of the multiple memory pages during the time interval;
identifying, based on the request, a pre-copy threshold;
determining that the third memory page has a higher usage than the second memory page by determining that the third number of times is greater than the second number of times;
determining that a total amount of data stored in a group of memory pages comprising the first memory page and the third memory page is less than or equal to the pre-copy threshold;
selecting the group of memory pages in pre-copy data;
transmitting, over a secure tunnel traversing the intermediary network, the pre-copy data from the first visualization host to the second virtualization host;
in response to transmitting the pre-copy data, ceasing operations of the virtual machine on the first visualization host; and
in response to ceasing operations of the virtual machine on the first visualization host, initiating operations of the virtual machine on the second virtualization host and transmitting, over the secure tunnel, the second memory page from the first virtualization host to the second virtualization host.

2. The system of claim 1, the request being a first request, wherein the operations further comprise:
in response to ceasing the operations of the virtual machine on the first visualization host, receiving, at the first visualization host from the second visualization host, a second request to read a portion of the second memory page; and
in response to receiving the second request, transmitting, over the secure tunnel, the portion of the second memory page to the second visualization host.

3. The system of claim 1, the request being a first request, wherein the operations further comprise:
in response to transmitting the second memory page, receiving a second request to delete the first memory page and the second memory page; and
in response to receiving the second request, deleting the first memory page and the second memory page from the at least one memory.

4. A method comprising:
identifying a request to migrate a virtualized resource from a first host to a second host;
determining that a first portion of data associated with the virtualized resource comprises at least one first page that has been accessed by the virtualized resource a greater number of times during a time period than at least one second page of a second portion of the data;
determining that an amount of data comprising the first portion is less than a pre-copy threshold;
transmitting, over at least one public network, the first portion from the first host to the second host;
in response to transmitting the first portion, ceasing one or more operations of the virtualized resource on the first host; and
in response to ceasing the one or more operations of the virtualized resource on the first host, transmitting, over the at least one public network, the second portion from the first host to the second host.

5. The method of claim 4, wherein transmitting the first portion over the at least one public network comprises transmitting the first portion over a secure tunnel traversing the at least one public network.

6. The method of claim 5, further comprising:
determining the pre-copy threshold based at least in part on a bandwidth of the secure tunnel.

7. The method of claim 6, wherein determining the pre-copy threshold based on a bandwidth of the secure tunnel comprises:
determining a maximum pre-copy duration; and
determining the pre-copy threshold based at least in part on the maximum pre-copy duration and the bandwidth of the secure tunnel.

8. The method of claim 4, wherein transmitting the first portion comprises:
generating an encoded first portion of the data by encoding the first portion using a key; and
transmitting the encoded first portion over a secure tunnel traversing the at least one public network.

9. The method of claim 4, further comprising:
in response to ceasing the one or more operations of the virtualized resource on the first host, receiving, from the second host over a data tunnel traversing the at least one public network, a request to read a page among the second portion;
retrieving a third portion of the data from the page in accordance with the request; and
transmitting, to the second host over the data tunnel, the third portion.

10. The method of claim 4, wherein transmitting the first portion from the first host to the second host comprises:
receiving a request for an interim change of the first portion;
performing the interim change on a copy of the first portion stored by the first host; and
transmitting, from the first host to the second host, an indication of the interim change.

11. The method of claim 4, wherein transmitting, over the at least one public network, the first portion from the first host to the second host comprises transmitting the first portion from a first data center to a second data center, at least one of the first data center or the second data center being an edge location.

12. The method of claim 4, further comprising:
determining a time period during which transmission of the first portion is scheduled; and
determining the pre-copy threshold based at least in part on the time period.

13. The method of claim 4, further comprising:
determining a type of the virtualized resource, the type being characterized by at least one of processing resources of the virtualized resource, memory resources of the virtualized resource, storage resources of the virtualized resource, or network resources of the virtualized resource; and
determining the pre-copy threshold based at least in part on the type of the virtualized resource.

14. The method of claim 13, wherein the type comprises at least one of a number of Central Processing Units (CPUs) associated with the virtualized resource, a type of the CPUs associated with the virtualized resources, or a configuration of CPUs associated with the virtualized resource.

15. One or more computer-readable media storing one or more computer-executable instructions that, when executed by one or more processors, cause the one or more processors to perform operations comprising:
receiving a request to migrate a virtualized resource from a first host to a second host, wherein one of the first host and the second host is located in a region of a cloud provider network and an other of the first host and the second host is located in an edge location connected to the region of the cloud provider network via an intermediary network;

determining a bandwidth of a secure tunnel connecting the region to the edge location over the intermediary network;

determining a pre-copy threshold based at least in part on the bandwidth;

determining that a first memory page associated with the virtualized resource has been accessed by the virtualized resource a greater number of times during a time period than a second memory page associated with the virtualized resource;

identifying first data to pre-copy and second data to post-copy, the first data comprising the first memory page, an amount of the first data being less than or equal to the pre-copy threshold, the second data comprising the second memory page; and migrating the virtualized resource from the region to the edge location by sending the first data over the secure tunnel while the virtualized resource continues to operate on the first host, and sending the second data over the secure tunnel while the virtual machine operates on the second host.

16. The system of claim 15, wherein the secure tunnel traverses at least one public network.

17. The system of claim 15, wherein migrating the virtualized resource comprises:
    encoding the first data using a key; and
    transmitting the first data over the secure tunnel traversing a public network.

18. The system of claim 15, wherein the operations further comprise:
    ceasing operations of the virtualized resource on the first host;
    receiving, from the second host over the secure tunnel, a request to read the second memory page among;
    retrieving third data from the second memory page in accordance with the request; and
    transmitting, to the second host over the secure tunnel, the third data.

19. The system of claim 15, wherein the operations further comprise:
    receiving a request for an interim change of the first memory page;
    performing the interim change on a copy of the first memory page stored by the first host; and
    transmitting, from the first host to the second host, an indication of the interim change.

20. The system of claim 15, wherein the first data and the second data include a common memory page.

* * * * *